US012673413B2

(12) United States Patent
Ranade et al.

(10) Patent No.: US 12,673,413 B2
(45) Date of Patent: Jul. 7, 2026

(54) APPARATUS AND METHOD FOR AUTOMATED TEACHING OF LOCATIONS IN LABORATORY AUTOMATION EQUIPMENT

(71) Applicant: HIGHRES BIOSOLUTIONS, INC., Beverly, MA (US)

(72) Inventors: Raj Ranade, Reading, MA (US); Ian Locke, Methuen, MA (US); Nigel Cochran, Stoneham, MA (US); Allie Rishmany, Beverly, MA (US); Tyler Dendas, Beverly, MA (US); Ulysses Gilchrist, Reading, MA (US)

(73) Assignee: HIGHRES BIOSOLUTIONS, INC., Beverly, MA (US)

( * ) Notice: Subject to any disclaimer, the term of this patent is extended or adjusted under 35 U.S.C. 154(b) by 144 days.

(21) Appl. No.: 18/590,590

(22) Filed: Feb. 28, 2024

(65) Prior Publication Data

US 2024/0293929 A1    Sep. 5, 2024

Related U.S. Application Data

(60) Provisional application No. 63/487,758, filed on Mar. 1, 2023.

(51) Int. Cl.
*B25J 9/16* (2006.01)
*B25J 9/00* (2006.01)
*B25J 19/02* (2006.01)

(52) U.S. Cl.
CPC .......... *B25J 9/0081* (2013.01); *B25J 9/0009* (2013.01); *B25J 9/1669* (2013.01); *B25J 19/027* (2013.01)

(58) Field of Classification Search
CPC ...... B25J 9/0081; B25J 9/0009; B25J 9/1669; B25J 19/027; B25J 9/1692; B25J 9/1679; G01N 35/0099; G01N 35/1011
See application file for complete search history.

(56) References Cited

U.S. PATENT DOCUMENTS

| | | | | |
|---|---|---|---|---|
| 2006/0047363 A1* | 3/2006 | Farrelly | ........... | G01N 35/00722 |
| | | | | 700/245 |
| 2019/0241375 A1 | 8/2019 | Guarracina et al. | | |
| 2019/0277870 A1 | 9/2019 | Kluckner et al. | | |

OTHER PUBLICATIONS

International Search Report for application No. PCT/US24/17893 dated May 27, 2024.

* cited by examiner

*Primary Examiner* — Bao Long T Nguyen
(74) *Attorney, Agent, or Firm* — Perman & Green, LLP

(57) ABSTRACT

An automatic teaching system for an automated laboratory, the automatic teaching system comprising, a frame having a specimen holder station, a robot transport mounted to the frame and having a drive with at least one degree of freedom and a movable end effector for action with a specimen holder, wherein at least one of the specimen holder station and the movable end effector have a reference base, an electromagnetic distance sensor connected to the movable end effector in a predetermined location on at least one of the robot transport and the specimen holder station relative to the reference base, a fixture with a predetermined geometric pattern formed of discriminant features, variant in at least two dimensions, characterizing the predetermined geometric pattern and registrable by the electromagnetic distance sensor and, a controller operably coupled to the robot transport and communicably connected to the electromagnetic distance sensor to register sensor signals embodying distances.

26 Claims, 21 Drawing Sheets

PROVIDE AUTOMATED LABORATORY 1800

POSITION FIXTURE 1810

REGISTER SENSOR SIGNALS 1820

DETERMINE HOLDING STATION REFERENCE LOCATION 1830

PROVIDE AUTOMATED LABORATORY 1700

POSITION FIXTURE 1710

REGISTER SENSOR SIGNALS 1720

DETERMINE HOLDER STATION REFERENCE LOCATION 1730

1

APPARATUS AND METHOD FOR AUTOMATED TEACHING OF LOCATIONS IN LABORATORY AUTOMATION EQUIPMENT

CROSS-REFERENCE TO RELATED APPLICATIONS

This application is a non-provisional of and claims the benefit of U.S. provisional patent application No. 63/487,758 filed on Mar. 1, 2023, the disclosure of which is incorporated herein by reference in its entirety.

BACKGROUND

1. Field

The present disclosure generally relate to life sciences equipment, and more particularly, to automated handling and processing of life sciences processing equipment.

2. Brief Description of Related Developments

Laboratory automation typically integrates several automated devices using a robot. The robot is disposed external to the automated devices and transports laboratory items (e.g., samples, trays, etc.) between the automated devices. Laboratory automation may also include automation within a device, a non-limiting example of which is a liquid handler.

As is understood, there is always variability between different laboratory automation (and machines in general, even if of the same type and model) due to machining and manufacturing tolerances/differences. As such, alignment and teaching is performed for each machine so that automation operates as intended where the teaching and alignment is performed with respect to reference locations of the machine. The robot is typically taught pick and place locations to effect the transfer of laboratory items; however, the teaching processes is labor intensive, sensitive to variations induced by human input, and subjective based on the human performing the teaching.

With respect to liquid handlers, the teaching process, and the required accuracy thereof, is compounded when the number of pipette tips and sample wells increase. For example, samples are typically held in standardized SBS (Society for Biomolecular Screening) well plates (see as non-limiting examples, ANSI SLAS 1-2004 (R2012 through ANSI SLAS 4-2004 (R2012))) or other non-standardized well plates/holders. As the density (i.e., number) of wells increases on a plate having a predetermined size, the accuracy of the liquid handler must increase to ensure that the pipette tips thereof enter the correct well and manipulate fluids properly. Here, to achieve the desired accuracy the pipetting head module (which has the pipette tips thereon) of the liquid handler is to be properly aligned with the well plate, the well plate being held on a deck of the liquid handler. If the reference locations (which identify pick and place locations) are not taught properly, or not taught to within the capabilities of the robot (i.e., a levelness of the robot, an accuracy of the robot, roll/pitch/yaw of a sample holding station/labware nest, etc.) scientific samples may be damaged or lost.

It would be advantageous to have an automated teach apparatus for laboratory automation that substantially eliminates or limits human input in the teach process so that the teach process is repeatable and performed in less time compared to human teaching. It would also be advantageous to have an automated teach apparatus that automatically confirms/verifies the teach points prior to processing samples.

BRIEF DESCRIPTION OF THE DRAWINGS

The foregoing aspects and other features of the present disclosure are explained in the following description, taken in connection with the accompanying drawings, wherein.

DETAILED DESCRIPTION

Figures 1, 1A:
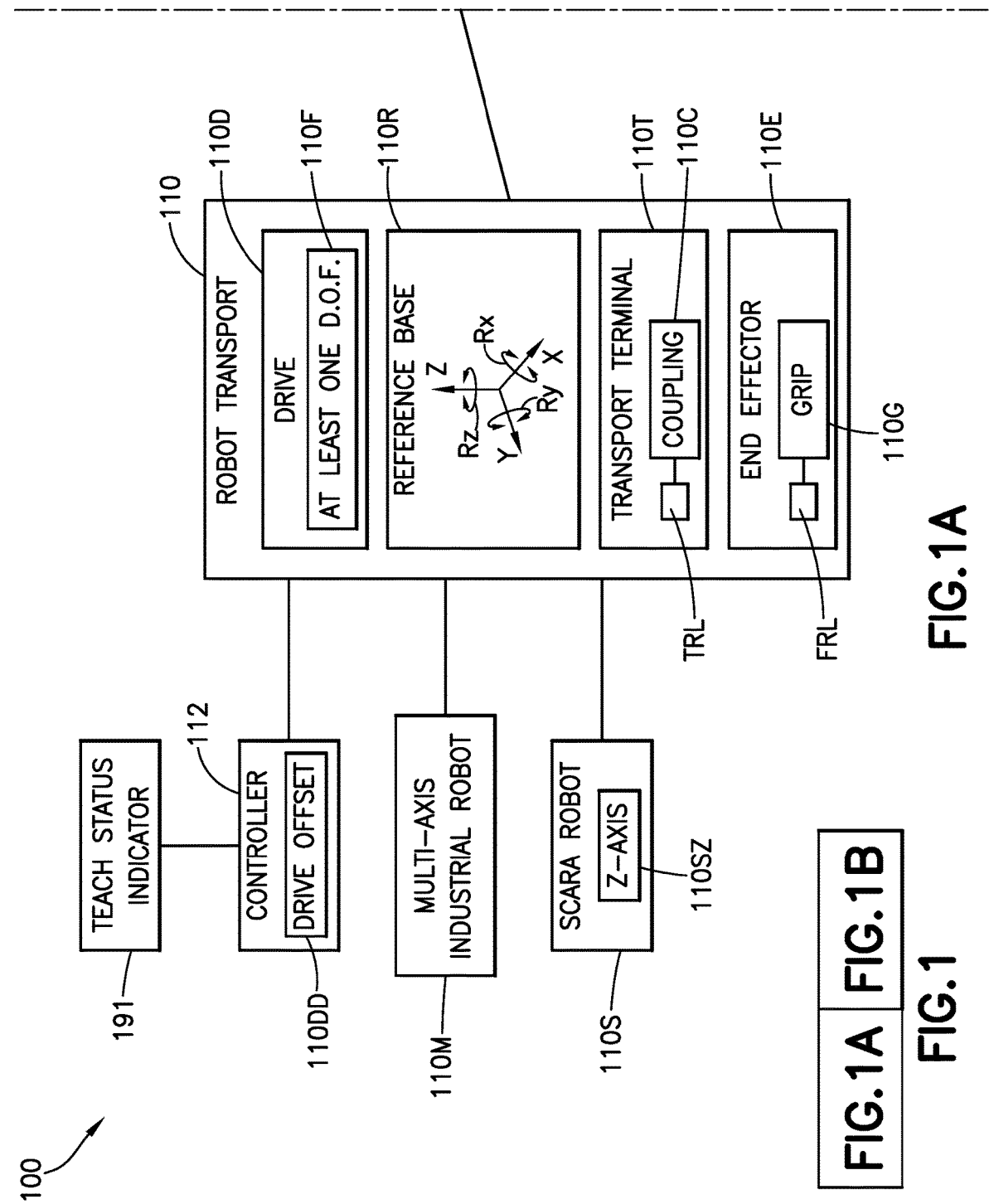
FIG. 1 (Comprising as 1A-1B) is a schematic illustration of an automated teaching system in accordance with aspects of the present disclosure.
Figure 1B:
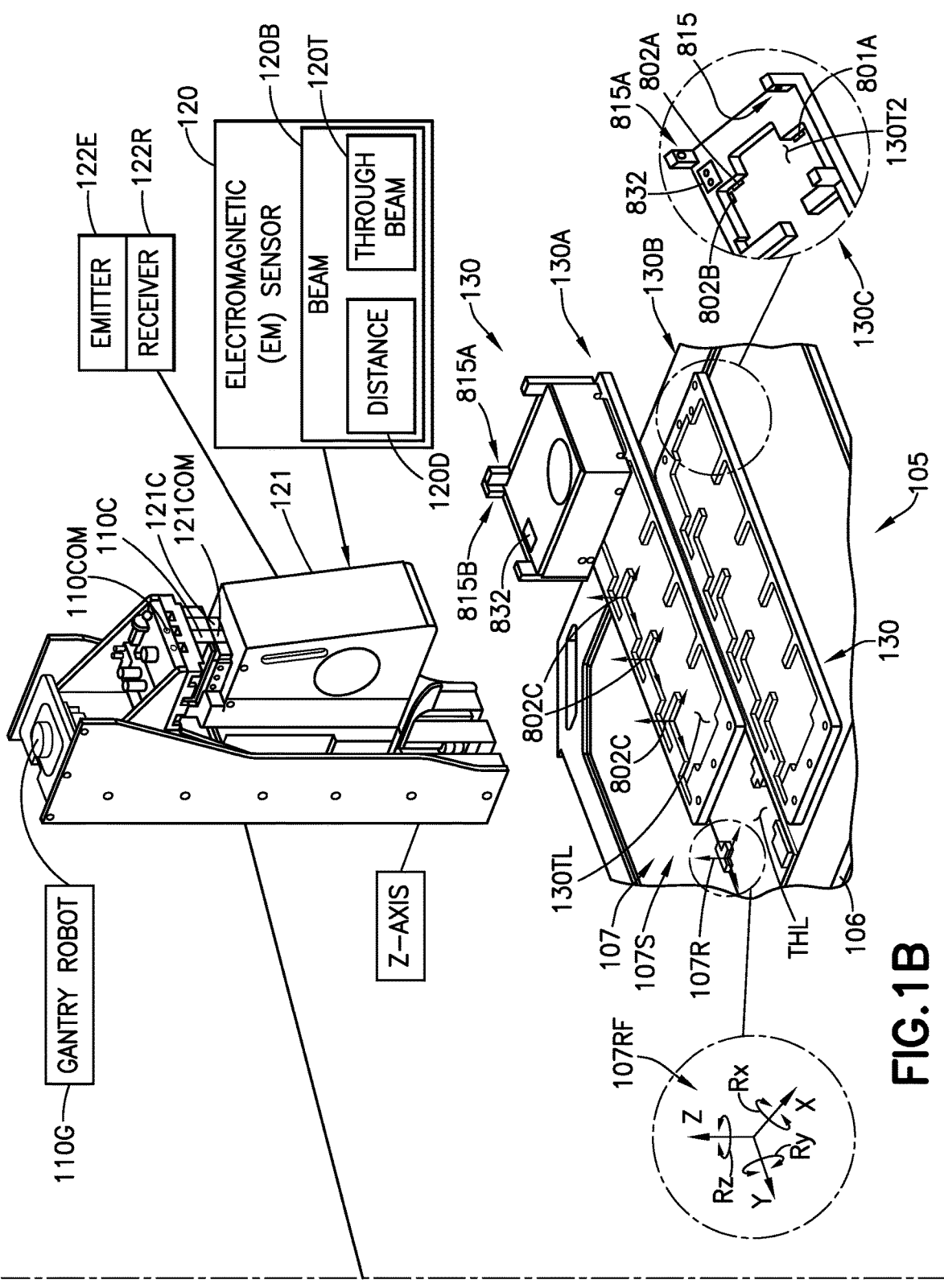

FIG. 1 (Comprising FIG. 1A-1B) schematically illustrates an exemplary automated teaching system 100 in accordance with aspects of the present disclosure. Although the aspects of the present disclosure will be described with reference to the drawings, it should be understood that the aspects of the present disclosure can be embodied in many forms. In addition, any suitable size, shape or type of elements or materials could be used.

The automated teaching system 100 provides for automated teaching of a robot and validation (e.g., alignment, levelness, validity of taught locations, etc.) of hardware setup within an operation window for processing samples. Here, the automated teaching system 100 may be employed to teach a robot the reference locations and physical alignment of laboratory equipment upon installation of the laboratory equipment and/or at any suitable time thereafter (e.g., the aspects of the present disclosure provide for measuring and confirming orientation of the laboratory equipment as well as the X, Y, Z location of the laboratory equipment so that automated teaching system can confirm the location/positioning of the laboratory equipment is within as designed for build/installation specifications). The automated teaching system 100 may also be employed to measure, teach, and identify the SBS labware used within a laboratory system (e.g., the SBS labware such as trays and plates have known dimensions that can be measured with the sensors described herein and the pose of the SBS labware with the laboratory system can be taught). The validation of hardware setup may also be performed at any time (e.g., hardware validation may be performed with the automated teachings system at any suitable time, such as upon or after installation of the laboratory equipment. For example, the automated teaching system 100 may be employed to validate the hardware setup as part of a sample processing routine prior to sample handling, where if the hardware cannot be validated (i.e., a misalignment exists and automated re-teaching cannot be performed due to the misalignment) an operator is alerted, through any suitable tech status indicator, for rectification and processing of samples is paused until after rectification is effected.

The automated teaching system 100 employs a non-contact teaching methodology that employs non-contact sensors for automated teaching and hardware validation where the automated teaching system 100 provides the locations of tool features to a spatial positioning repeatability of about 0.02 mm or less. These non-contact sensors may be located anywhere within the automated teaching system 100 so long as the pose of the non-contact sensors is known/predetermined with respect to datums (e.g., reference locations/position from which the locations of features of the laboratory equipment are known as described herein) of the automated teaching system 100. As described herein, the automated teaching system 100 includes discriminant features having known characteristics and sensors located on-board one or more of a robot transport 110 and the device (of the automated laboratory equipment 105) whose reference locations are being taught. The automated teaching system 100 includes a controller 112 that is configured (i.e., programmed) with non-transitory computer program code that effects determination of the position and orientation of the reference locations relative to the robot transport 110, in the manner (s) described herein. As described herein, the automated teaching system 100 includes sensors disposed on one or more of a robot transport, fixtures of automated laboratory equipment, and at fungible laboratory device holding station 107 that effect non-contact teaching methodology described herein and the functions of teaching the position and confirming the in specification orientation of the robot transport, fixtures, and/or fungible laboratory device holding station 107 (as described herein) are performed regardless of whether the sensor(s) on the robot transport, fixtures of automated laboratory equipment, or at fungible laboratory device holding station 107 is/are employed alone or in combination.

The automated teaching system 100 includes an electromagnetic sensor 120 and a fixture 130. The electromagnetic sensor 120 is coupled to or otherwise held by the robot transport 110 so as to be positioned by the robotic transport 110. The fixture 130 is configured for placement at a teach location (e.g., such as a nest position that holds a well plate, end of arm tool, or any other suitable pick place location). The electromagnetic sensor 120 is moved by the robot transport 110 relative to the fixture 130 so as to identify discriminant features of the fixture 130, where the discriminant features have a predetermined spatial relationship with one or more reference locations (e.g., a holding (or holder) station reference location 107R such as of the teach location). The controller 112 receives sensor signals from the electromagnetic sensor 120 and resolves the one or more reference locations from the detection of the discriminant features so that the one or more reference locations are taught to the robot transport 110 in the coordinate system or reference base/frame 110R of the robotic transport 110.

Figure 22:
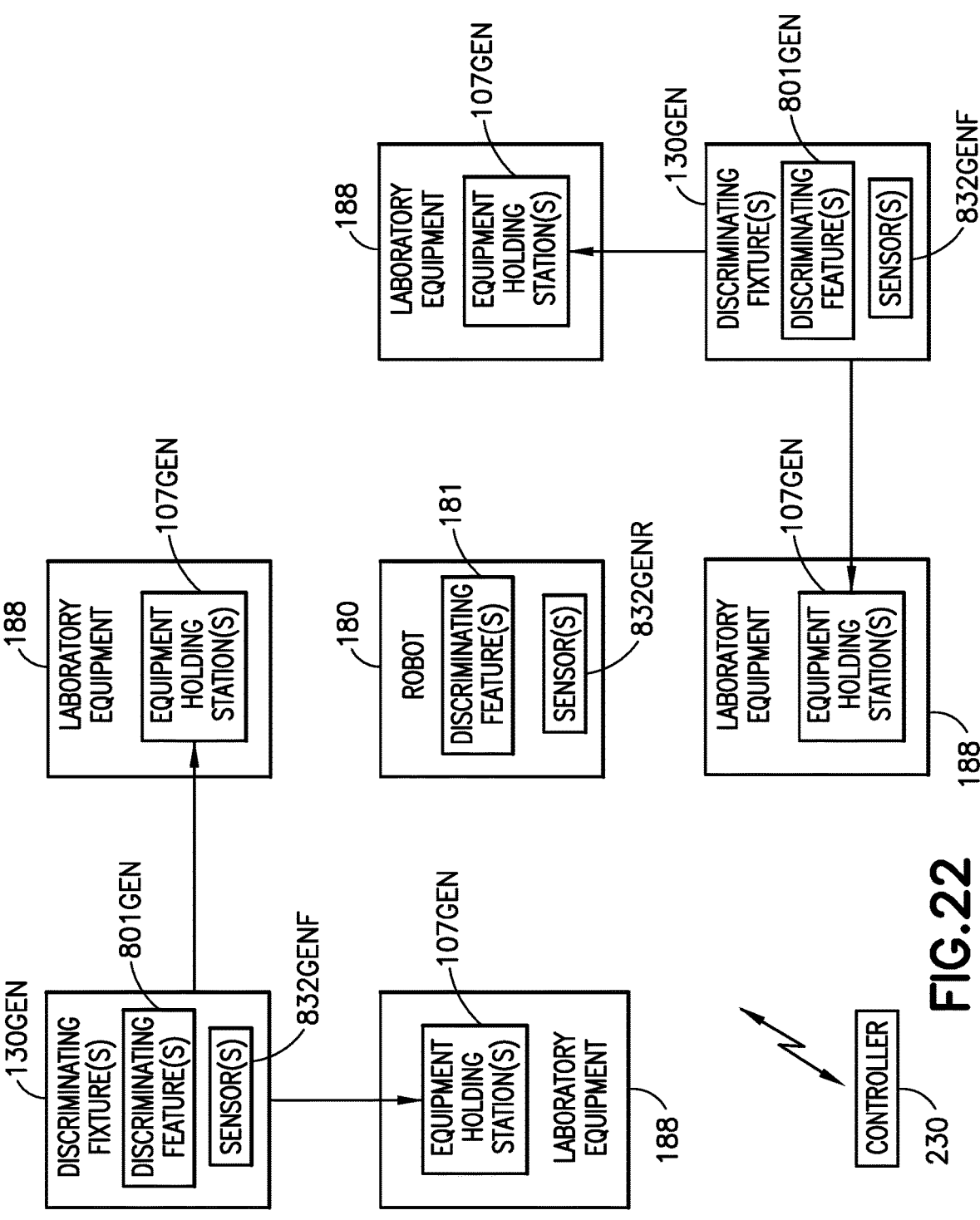
FIG. 22 is a schematic illustration of an exemplary laboratory facility incorporating the automated teaching system of FIG. 1 in accordance with aspects of the present disclosure.

The automated teaching system 100, in accordance with aspects of the present disclosure, may be applied to or otherwise integrated with any suitable robotic transport 110, including but not limited to those described herein. For example, the automated teaching system 100 may be employed with gantry robots 110G, SCARA (Selective Compliance Articulated Robot Arm) robots 110S (with or without a Z-motion axis 110SZ), and multi-axis industrial robots 110M (e.g., such as multi-axis robots having 4, 5, 6, or more axes). As an example, referring to FIG. 22, the robotic transport 180 (which may be one of, or a combination of, those robots noted above) may transport labware or other items (e.g., specimens, etc.) to and from any suitable laboratory equipment 188 disposed within the working envelope of the robotic transport 180. The robotic transport 180 includes one or more sensors 832GENR such as radiation sensors described herein. The robotic transport 180 may include any suitable discriminating features 181 (e.g., gripper fingers, tines, protrusions or any other suitable features that uniquely characterize a location and orientation, or pose of the robotic transport relative to the laboratory equipment 188).

The laboratory equipment may be labware storage units, labware processing units, specimen processing units or any other suitable labware equipment employed to handle/process labware and/or specimens. The laboratory equipment 188 include one or more respective equipment holding station (s) 107GEN configured to hold any suitable labware equipment (e.g., any suitable fixture, processing equipment, storage racks, sample holders, etc.) at a predetermined location of the laboratory equipment 188. One or more discriminating fixtures 130GEN are provided for placement at an equipment holding station 107GEN where the one or more discriminating fixtures 130GEN include discriminating features 801GEN that are registrable by the sensors 832GENR of the robotic transport 180 and uniquely characterize the different equipment holding stations 107GEN at which the discriminating fixture 130GEN in placed. The discriminating features 801GEN may be substantially similar to those described herein or any other suitable features that may be detected by any suitable sensor and effect unique characterization (e.g., location and orientation, or pose) of the equipment holding station 107GEN relative to, e.g., the robotic transport 180. The discriminating fixtures 130GEN may include one or more sensors 832GENF (e.g., radiation sensors similar to those described herein) that are configured to sense the discriminating features 181 of the robotic transport 180.

Any suitable controller, such as controller 230 is configured to determine and teach the relative poses of the laboratory equipment 188 to the robotic transport 180 (or vice versa) in a manner substantially similar to that described herein by sensing the discriminating features of one or more of the robotic transport 180 and the discriminating fixture (s) 130GEN.

Figure 2:
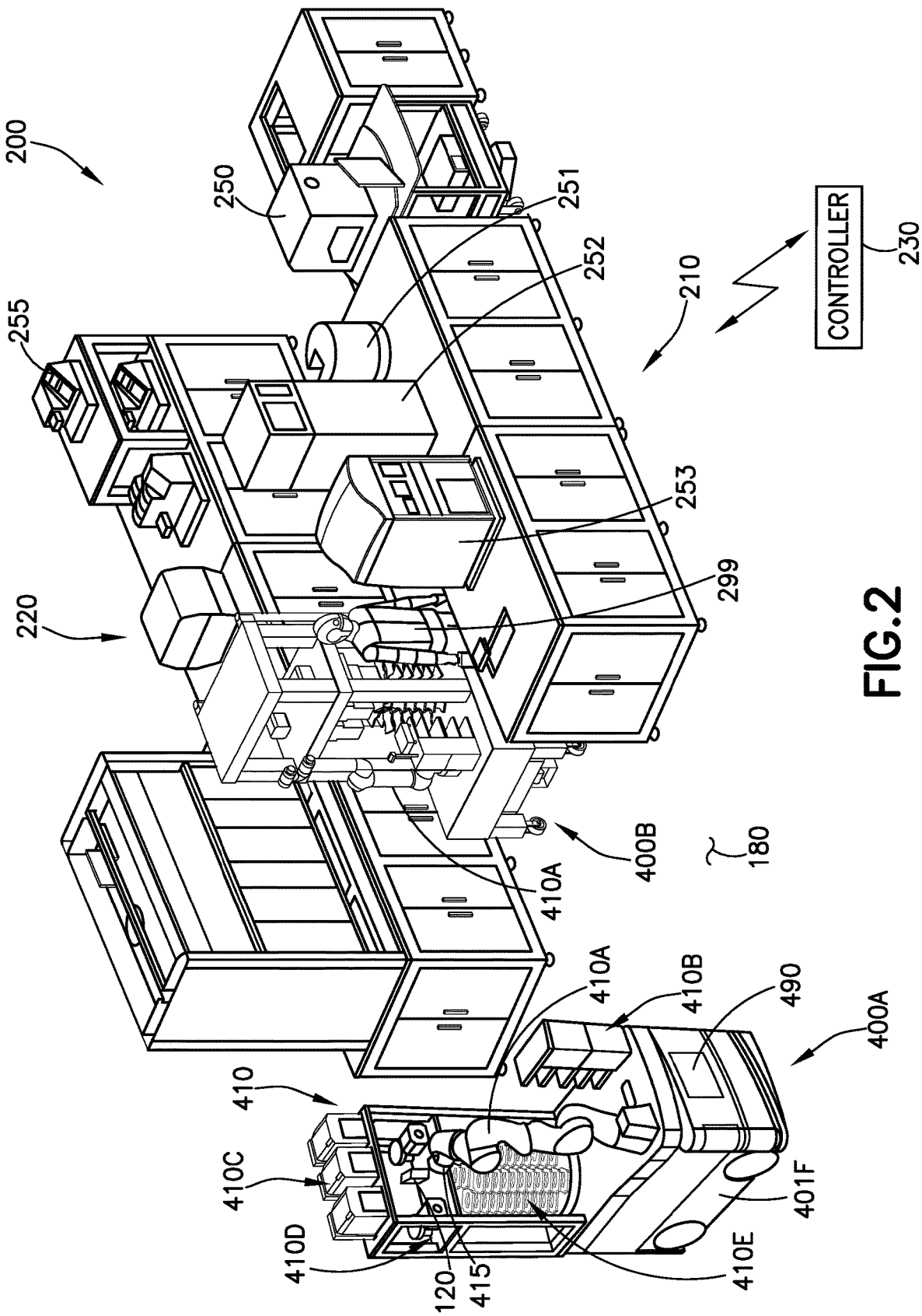
FIG. 2 is a schematic illustration of an exemplary laboratory facility incorporating the automated teaching system of FIG. 1 in accordance with aspects of the present disclosure.
Figure 3:
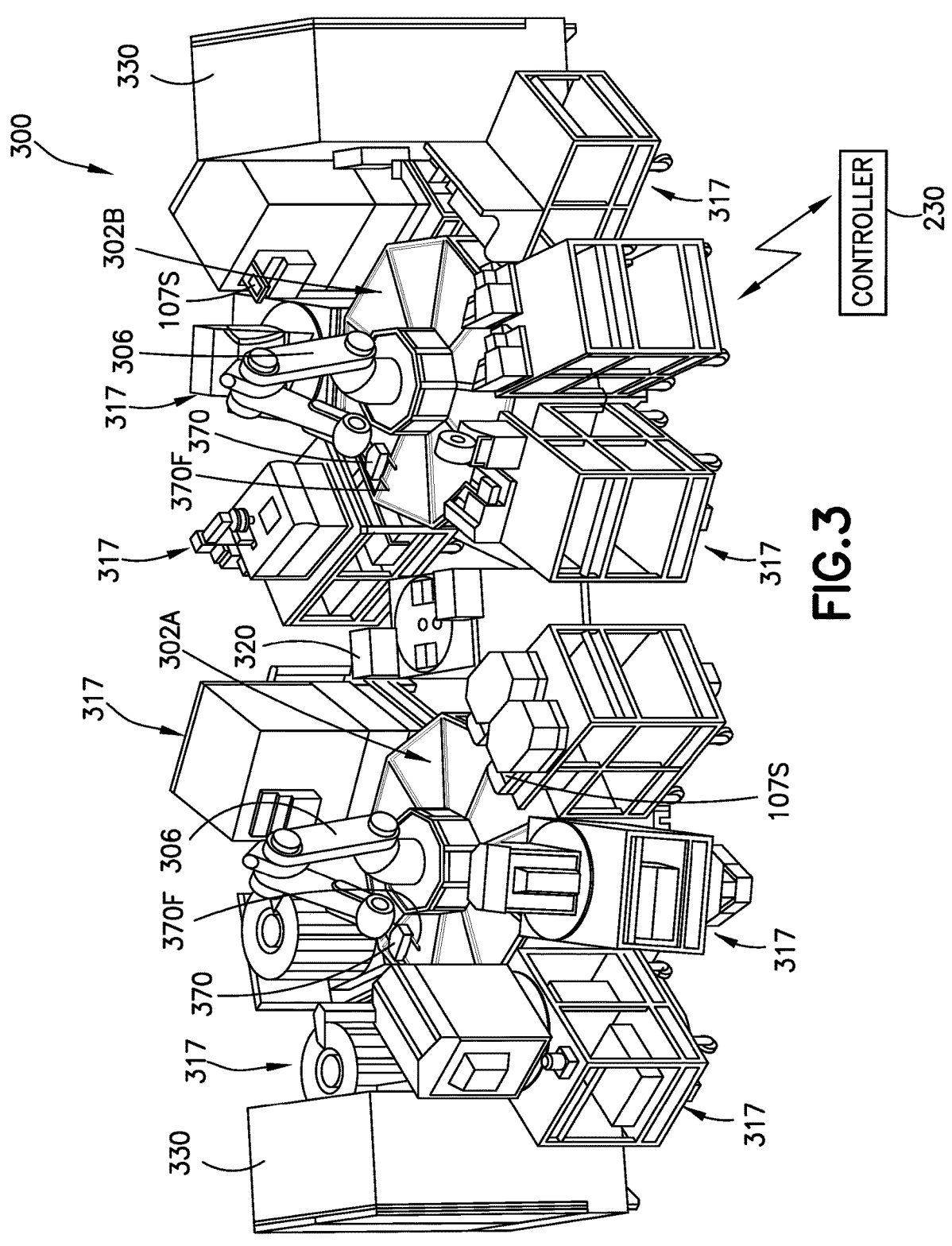
FIG. 3 is a schematic illustration of a laboratory processing station (which may be part of the exemplary laboratory facility of FIG. 2) incorporating the automated teaching system of FIG. 1 in accordance with aspects of the present disclosure.

As further examples, referring also to FIGS. 2 and 3, one or more of the robotic transport 110 may be included in the exemplary laboratory facility 200 and laboratory processing station 300 described herein.

The laboratory facility 200 may include at least one auto-navigating robotic processing vehicle 400A, 400B and at least one processing station 210, 220, suitable examples of which can be found in U.S. Pat. No. 10,955,430 issued on Mar. 23, 2021, the disclosure of which is incorporated herein by reference in its entirety. The at least one processing station 210, 220 may be a human operated processing station and/or an automated processing station. As described herein, the auto-navigating robotic processing vehicles 400A, 400B include a processing section 410 that has a number of different processing modules 410A-410G. Each of the different processing modules 410A-410G has a different predetermined laboratory processing function with a different predetermined function characteristic corresponding to the processing module 410A-410G. For example, the processing modules 410A-410G may include one or more robot arms 410A, a sample tray lid remover 410B, a pipetting head cartridge or module 417A-417C (see FIG. 4) held at a pipetting head dock location 410C (suitable examples of pipetting heads can be found in U.S. Pat. No. 9,623,405 issued on Apr. 18, 2017 the disclosure of which is incorporated herein by reference in its entirety), an end effector processing module 410D, a sample tray carousel 410E, a bar code scanner, a sample plate orientation module, and/or any other suitable sample processing equipment and/or tools.

The different processing modules 410A-410G and their respective functions are automatically selectable to effect, independent of or in combination with vehicle travel, a preprocess or a preprocess condition of laboratory samples and/or sample holders with respect to a process at the at least one processing station 210, 220. For example, preprocessing conditions that may be performed by the at least one auto-navigating robotic processing vehicle 400A, 400B include, but are not limited to, storage of sample trays, sample tray lids, transport and direct or indirect handoff of laboratory equipment (e.g., vacuum heads, brushes, Bunsen burners, microscopes, brooms, processing tools and/or fixtures, sample trays, etc.) to a human 299 (at a processing station 210, 220) and/or automated processing equipment at a processing station 210, 220 cleaning of an animal cage, laboratory table, etc., Examples of processes that may be performed by the at least one auto-navigating robotic processing vehicle 400A, 400B include, but are not limited to, removing a sealing film from a sample and/or sample tray, reading an identification of a sample and/or sample tray, etc., pipetting fluids, capping and decapping tubes. As an example, referring to FIGS. 2 and 4, the robot arm 410A is mounted to the carriage frame 401F and has a robot arm end 415 with at least one independent degree of freedom with respect to the carriage frame 401F. The robot arm 410A has an automatically selectable configuration with a number of different selectable robot arm process end effectors 415A, 415B, 415C (the electromagnetic sensor 120 being included as selectable in the number of different selectable robot arm process end effectors—see FIG. 2; while in other aspects an electromagnetic sensor may be integral with each end effector) for the robot arm end 415. Each of the number of different selectable robot arm process end effectors 120, 415A, 415B, 415C is held by an end effector processing module 410D of the carriage frame 401F, and is coupled and decoupled automatically to the robot arm end 415 on selection with a robot controller 490 effecting a change to the robot arm predetermined processing function. In one aspect, the robot arm 410A may be able to pick an end effector up at a processing station. Here, the number of different selectable robot arm process end effectors 120, 415A, 415B, 415C are configured so as to be interchangeably coupled to the robot arm end 415. The number of different selectable robot arm process end effectors 120, 415A, 415B, 415C allow the auto-navigating robotic processing vehicle 400A (or 400B) to access both automation friendly devices (e.g., devices that have lab ware input/output positions and external control application processor interfaces (APIs) and non-automation friendly devices (such as manual devices generally operated by a human).

Each of the number of different selectable robot arm process end effectors 120, 415A, 415B, 415C have a different predetermined function characteristic defining a different predetermined processing function, corresponding to the different selectable robot arm process end effector 120, 415A, 415B, 415C, effected with the at least one degree of freedom by the robot arm end 415. For example, the automatically selectable configuration of the robot arm end 415, automatically selects one end effector 120, 415A-415C from different selectable end effectors 120, 415A-415C so as to change a robot arm predetermined processing function, effected with the at least one independent degree of freedom of the robot arm end, from a first robot arm predetermined processing function, defined by a corresponding function characteristic of a first of the selectable end effectors 120, 415A-415C, to a second robot arm predetermined processing function, defined by a corresponding function characteristic of a second of the selectable end effectors 120, 415A-415C. For example, the predetermined function characteristic, of at least one of the number of different selectable robot arm process end effectors 120, 415A, 415B, 415C, is the at least one of the number of different selectable robot arm process end effector 120, 415A, 415B, 415C configured as being at least one of the electromagnetic sensor type configuration (see, e.g., end effector or electromagnetic sensor 120), an anthropomorphic grip type configuration (see e.g., end effector 415C), a sample tray, rack and plate grip type configuration (see, e.g., end effector 415B, a suitable example of which can be found in U.S. Pat. No. 11,167,434 issued on Nov. 9, 2021, the disclosure of which is incorporated herein by reference in its entirety), and a tube grip type configuration (see, e.g., end effector 415A). The movable end effectors 110E and movable transport terminals 110T (see FIG. 1) described herein each have a reference location TRL, RFL related to the fungible laboratory device 495 or specimen holder (or other object) gripped by the movable end effector or coupled to the movable transport terminal 110T so that a specimen holder (or other object) grip location is known for effecting picking and placement of the specimen holder (or other object).

The auto-navigating robotic processing vehicle 400A, 400B is configured to access automated devices with lab ware input output positions and external control application process interfaces (APIs) as well as non-automation friendly devices that are generally accessed by humans. The different selectable robot arm process end effectors 415A, 415B, 415C allow for handling of typical life science drug discovery lab ware such as Society for Biomolecular Screening (SBS) plates and racks, burettes for aspirating and dispensing liquids, flasks, tubes, beakers, bottles, vials, lids and caps, microfluidic flow cells, petri dishes, media bags, bioreactors, etc. The electromagnetic sensor 120 effects teaching the robotic arm 410A the reference locations of the automated devices accessed by the auto-navigating robotic processing vehicle 400a, 400B to effect transfer/handling of lab ware with the different selectable robot arm process end effectors 415A, 415B, 415C. In one aspect, the anthropomorphic grip configuration of the end effector 415C provides access to or operation of non-automation friendly devices/tools such as by opening doors of processing stations, doors on vent hoods, doors on manual freezers and incubators, accessing cell counters, manipulating microscopes, shakers, Bunsen burners, hot plates, bioreactors, brushes, etc., for retrieving samples and/or tools for use in experiments or in preprocesses for experiments. The different selectable robot arm process end effectors 415A, 415B, 415C also allow for handling tools for other lab interactions (in addition to sample retrieval for experiments) that are generally handled by a human 299 (FIG. 2) laboratory technician, where such tools include any suitable sensors (e.g., imaging, temperature, humidity, potential of hydrogen (pH), thermal, optical, etc.), sprayers (e.g., for sanitizing laboratory devices with bleach, ethanol and other suitable solvents), gas delivery devices (e.g., for delivering gases such as vapor hydrogen dioxide and chlorine dioxide), pipette heads 417A-417C (such as single and multichannel pipette heads for acoustic fluid delivery-see, e.g., FIG. 4), and ultraviolet lights (e.g., for liquid and gas free sterilization of surfaces). One or more of these tools may be stored on the auto-navigating robotic processing vehicle 400A, 400B. For example, pipette heads 417A-417C may be stored at pipetting head dock location 410C. It is noted that the pipette heads described herein may be configured for pipetting fluid to 96 well, 384 well, 1536 well, or 3456 well plates (also referred to as microplates).

The at least auto-navigating robotic processing vehicle 400A, 400B services individual processing stations 210, 220, where the processing stations 210, 220 have either automatic item (e.g., tools, samples, trays, etc.) input/output or have manual processes which are carried out/effected, monitored, and/or controlled (e.g., through a user interface) by a human 299. In one aspect, the at least one auto-navigating robotic processing vehicle 400A, 400B is configured to provide all comporting (e.g., suitable) equipment (e.g., "process payloads" which may include process modules, peripherals, and/or consumables for station engagement, or "workpiece payloads" which may include samples and sample trays for station engagement) on the auto-navigating robotic processing vehicle 400A, 400B to perform the tasks at a given processing station 210, 220. As an example, an auto-navigating robotic processing vehicle 400A, 400B may be configured and loaded for an individual task such that all the comporting equipment is carried by a single auto-navigating robotic processing vehicle 400A, 400B to complete the individual task (which may be, e.g., a process station function) in full with a single auto-navigating robotic processing vehicle 400A, 400B and the items carried thereon.

Still referring to FIG. 2, the processing stations 210, 220 may be linearly arranged with one or more process tools 250-255 which may include, but are not limited to, electronic pipettes, microplate dispensers, media preparation modules (e.g., sterilization and dispensing of sample medium), environmental control modules (e.g., refrigeration, freezers, incubators, clean environments, hoods, etc.), storage modules, and centrifuges. The at least one auto-navigating robotic processing vehicle 400A, 400B may also be configured to effect one or more predetermined laboratory processing function at a processing station of an automated configurable processing tool 300 illustrated in FIG. 3. For example, the automated configurable processing tool 200A (shown for example, having a cluster configuration as described in U.S. Pat. No. 8,734,720 issued on May 27, 2014, though in other aspects the processing tool may have an enclosed cluster or enclosed linear configuration as described in U.S. Pat. No. 8,734,720, and/or a linear configuration as disclosed in U.S. Pat. No. 11,045,811 issued on Jun. 29, 2021, U.S. Pat. No. 8,795,593 issued on Aug. 5, 2014, and U.S. Pat. No. 7,560,071 issued on Jul. 14, 2009, or any other suitable configuration such as described in U.S. Pat. No. 10,583,554 issued on Mar. 10, 2020 and U.S. Pat. No. 11,045,811 issued on Jun. 29, 2021, the disclosures of which are incorporated herein by reference in their entireties), may include at least one automated unit 302A, 302B each having a multi-axis robotic arm 306 that interfaces with one or more stations 317 (in this example, mobile carts) docked with a stationary base of the multi-axis robotic arm 306 (while in other examples the auto-navigating robotic processing vehicle 400A, 400B may dock with the automated configurable processing tool 300 in the same/similar manner as the mobile cart). Each automated unit 302A, 302B may include a respective controller 330. An interface station 320 may also be provided for transferring material between the at least one automated units 302A, 302B. The at least one auto-navigating robotic processing vehicle 400A, 400B may be configured to perform a process or preprocess condition at the at least one automated unit 302A, 302B such as by providing different end effectors or grippers 370 or other tools to the multi-axis robotic arm 306, and/or performing a pre-process condition (such as those described above) at one or more of the stations 317. The auto-navigating robotic processing vehicle 400A, 400B and the automated configurable processing tool 300 are communicably connected by any suitable network (wired or wireless) to the laboratory facility 200 controller 230 that registers the configuration of the automated configurable processing tool 300, a presence and configuration of the auto-navigating robotic processing vehicle 400A, 400B at the automated configurable processing tool 300 or in motion from/to the automated configurable processing tool 300, and register a location and configuration of a human processing station 210, 220 and a status (e.g., operating, occupied, closed, etc.) thereof.

Figure 5:
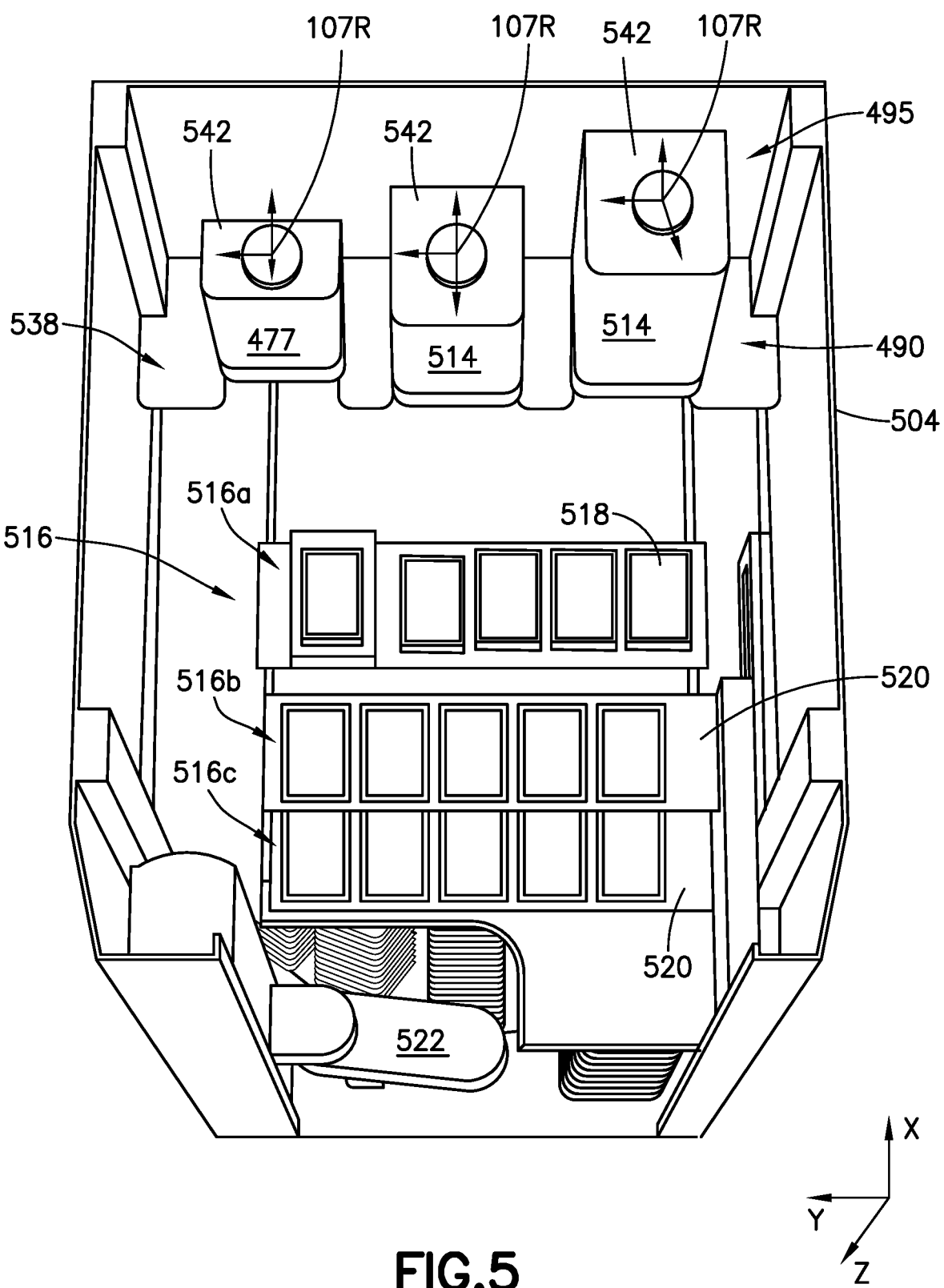
FIG. 5 is a schematic illustration of a portion of a processing apparatus, including a pipetting chamber, of FIGS. 2 and 3 in accordance with aspects of the present disclosure.

FIG. 5 shows a cut-away plan view of one configuration of an interior of pipetting chamber 504 included in one or more of the exemplary laboratory facility 200 and laboratory processing station 300. As shown, the pipetting chamber 504 can contain a set of pipettor cartridges or pipette heads 514 docked at a docking station 538 in the pipetting chamber 504 (e.g., at dock location 516, which may be similar to pipetting head dock location 410C). The pipetting chamber 504 can further include at least one tray dock 516 holding a set (at least one) of pipetting trays 518. In various aspects, as shown in FIG. 5, the tray dock 516 includes distinct tray docks 516a, 516b, 516c, which include at least one static nest position 518 (tray dock 516a at the time of this depiction), and at least one dynamic nest position 520 (tray docks 516b, 516c, at the time of this depiction). In some cases, the dynamic nest positions are at distinct heights (Z-direction) within the pipetting chamber 504, and are adjustable horizontally (X-direction) within the pipetting chamber 504. In various aspects, one tray dock 516 can be loaded/unloaded onto/off-of the static nest position 518 from one of the dynamic nest positions 520 by an arm 522 (illustrated as a SCARA arm), which is movable in the X-direction, Y-direction and Z-direction. As may be realized, the automated teaching system 100 (see FIG. 1) may be employed to teach the arm 522 the locations of each tray dock for each nest position in a manner such as described herein.

Figure 6:
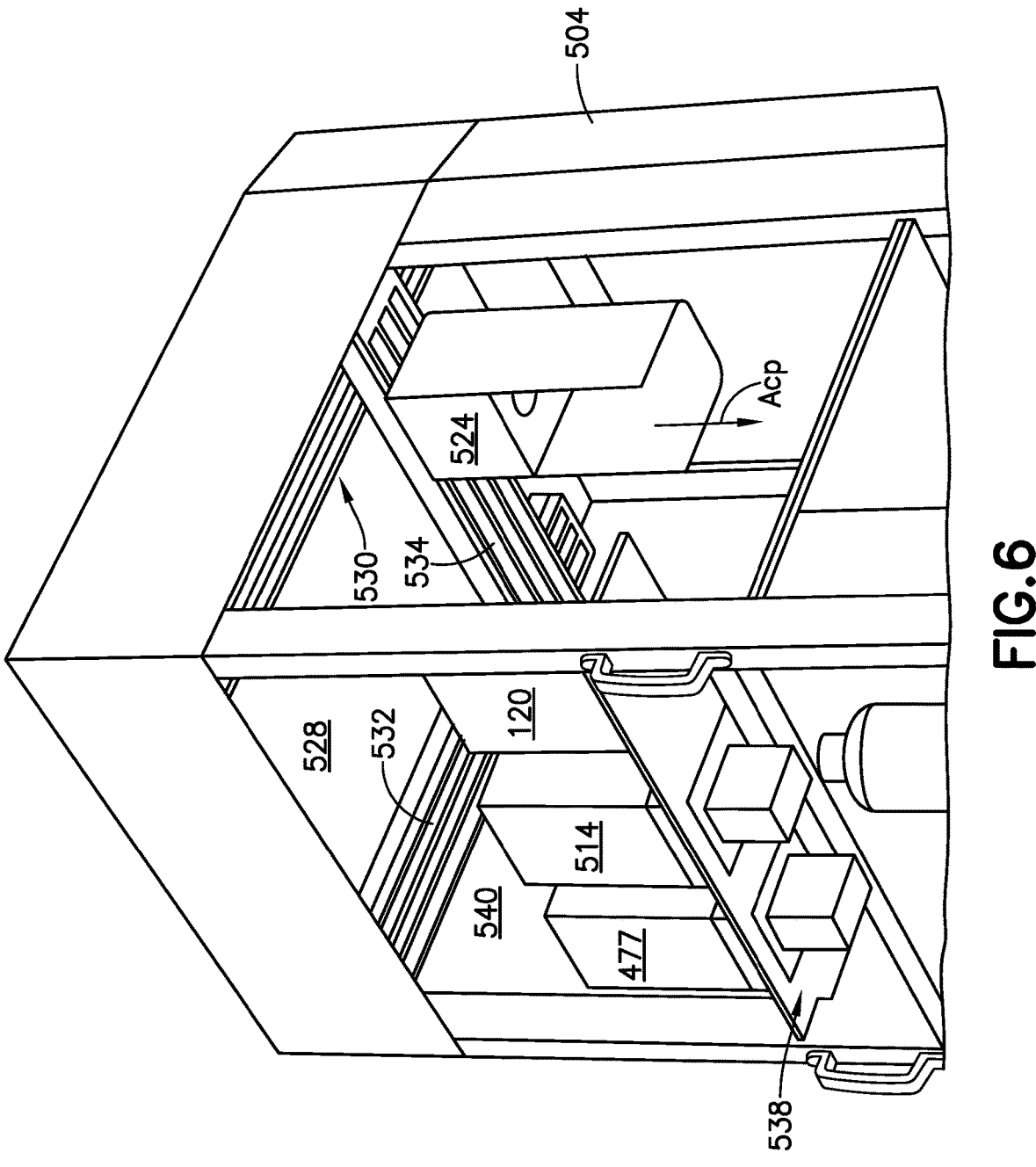
FIG. 6 is a schematic underneath perspective illustration of a portion of the processing apparats of FIG. 5 in accordance with aspects of the present disclosure.

FIG. 6 shows an underneath perspective view of a portion of the pipetting chamber 504, suitable examples of which can be found in U.S. Pat. No. 10,613,110 issued on Apr. 7, 2020, the disclosure of which is incorporated herein by reference in its entirety. As shown, in this aspect, the pipetting chamber 504 can further include a carrier 524 which in various aspects, is movably coupled to the ceiling 528 within the pipetting chamber 504, and in various aspects, is coupled to the ceiling 528 via a gantry system 530. The gantry system 530 (which may be substantially similar to gantry robot 110G in FIG. 1) can be mounted on the ceiling 528, and include at least two distinct tracks, e.g., at least one stationary track 532 (two shown) aligned in a first direction (X-direction), and a movable track 534 aligned in a second direction (Y-direction) distinct from the first direction. The movable track 534 can be coupled to the stationary track (s) 532, e.g., by complementary track integration, meaning that the movable track 534 can move within the stationary track (s) 532, such that the movable track 534 remains parallel with the stationary track (s) 532. In various aspects, the at least one stationary track 532 includes two distinct stationary tracks 532 aligned in parallel, where the two distinct stationary tracks 532 are aligned perpendicular to the movable track 534.

Still referring to FIG. 6, the carrier 524 is configured to transport each of the set of pipette heads 514 to a pipetting location, e.g., a location of at least one of the pipetting trays 518 within a tray dock 516 in the pipetting chamber 504. In various aspects, the carrier 524 can be configured to move each pipette head 514 in a third direction (Z-direction) perpendicular to both the first (X) and second (Y) directions. According to various aspects, the carrier 524 can be configured to rotate about its primary axis (Acp) such that the carrier 524 can circumferentially navigate about one or more of the pipette heads 514. Further, the carrier 524, when engaged with a pipette head 514, can rotate that pipette head 514 about the primary axis of the carrier 524 (Acp), which can facilitate in pipetting operations, as well as in loading and/or unloading of pipette heads. As may be realized, the automated teaching system 100 (see FIG. 1) may be employed to teach the carrier 524/gantry system 530 the locations of each tray dock for each nest position as well as the position of each pipette head 514 held at the docking station 538 in a manner such as described herein, where the electromagnetic sensor 120 is held by the carrier 524/gantry system 530 in a manner similar to that of the pipette heads 514.

Figure 7:
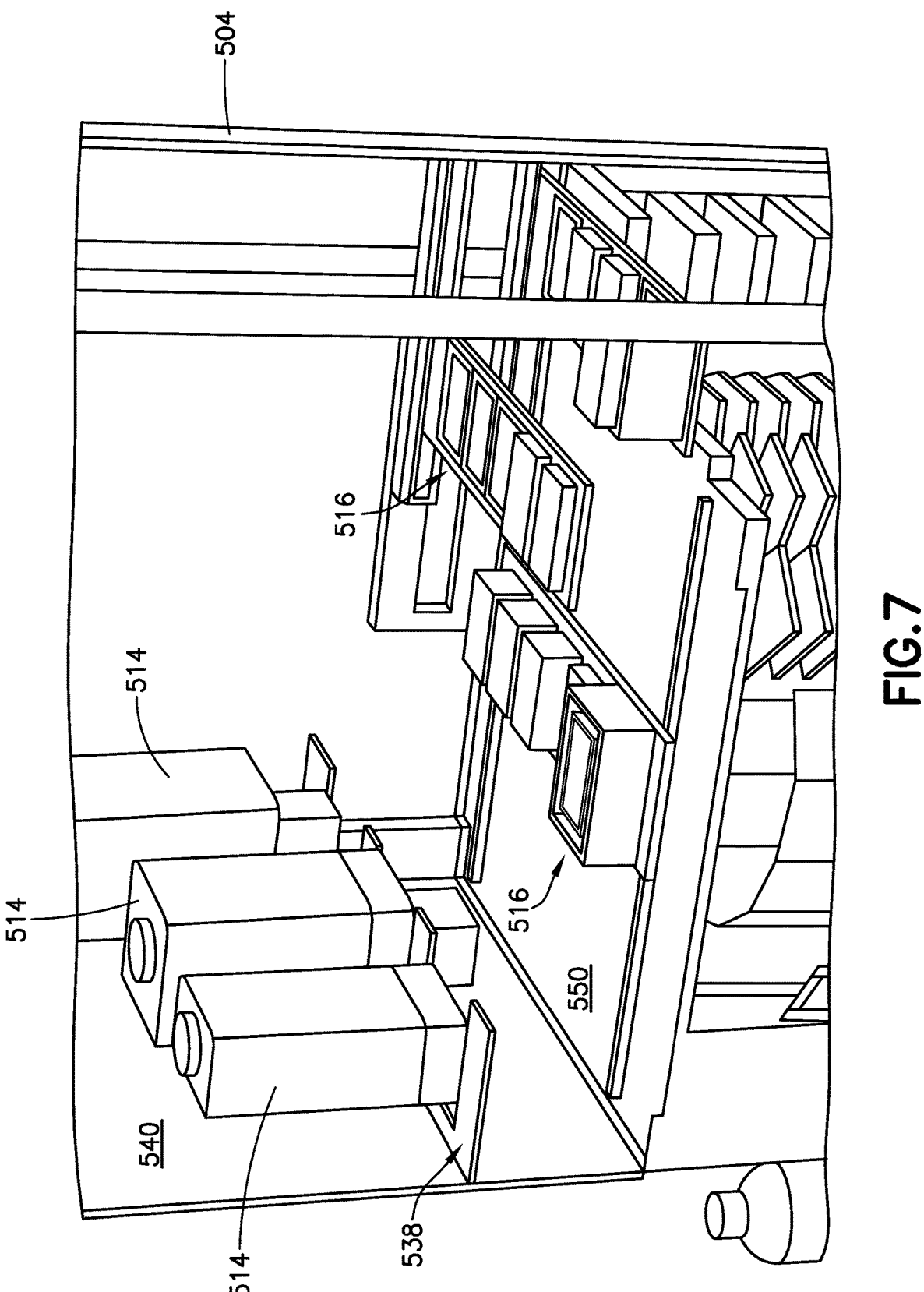
FIG. 7 is a schematic perspective illustration of a portion of the processing apparats of FIG. 5 in accordance with aspects of the present disclosure.

In some aspects, for example, as shown in FIGS. 6 and 7, the set of pipette heads 514 are docked in the docking station 538 coupled to a sidewall 540 of the interior of the pipetting chamber 504. It is noted that the electromagnetic sensor 120 may also be held at the docking station 538 (see FIG. 6) so as to be automatically coupled with the carrier 524 for teaching or verifying the locations of the pipetting trays 518 at the tray dock 516. The docking station 538 can be located in such a manner that the carrier 524 can engage the pipetting cartridges 514 (or electromagnetic sensor 120) from a top surface 542 of the pipette heads 514 (or similar surface of the electromagnetic sensor 120 or a liquid dispensing tool 477 as described herein). However, in other aspects, the set of pipetting cartridges 514 are docked in a docking station 538 coupled to the ceiling 528 of the pipetting chamber 504, such that the pipette heads 514 (and electromagnetic sensor 120) hang from overhead mounts in the pipetting chamber 504. In these aspects, the carrier 524 can be configured to engage a side of the pipette heads 514 (and electromagnetic sensor 120) and transport the pipette heads 514 (and electromagnetic sensor 120) to/from the pipetting trays 518 (or pipetting tray locations) and docking station 538.

Referring now to FIGS. 1, 8, 9, 10A-10C, and 11 the automated teaching system 100 includes a frame 106, a robot transport 110, an electromagnetic sensor 120, a fixture 130, and a controller 112. The frame 106 may be any suitable frame, such as of the automated laboratory equipment 105 (e.g., with reference to FIGS. 2 and 3, a frame of the auto-navigating robotic processing vehicle 400A, 440B, a frame of a processing tool 250-255, a frame of an automated unit 302A, 302B, a frame of a station 317, etc.), and includes a fungible laboratory device holding station 107 with a holding (or holder) station reference location 107R. The fungible laboratory device holding station 107 is at least one of a specimen holder station 107S having a respective holder (or holding) station reference location 107R and a fungible laboratory robot tool holding station 490 (see FIGS. 4 and 5) having a respective holding (or holder) station reference location 107R (noting that the holding station reference location and the holder station reference location are generally referred to herein as holding station reference locations 107R). The specimen holder station 107S may be included in a nest of specimen holder stations 107S, such as illustrated in FIGS. 4-7, where each specimen holder station 107S forms a respective tray dock configured to hold a specimen holder (e.g., a well plate having an SBS footprint or other suitable standardized or non-standardized specimen holder). The fungible laboratory robot tool holding station 490 forms one or more of a respective docking station configured to hold a pipette head 514 and a respective docking station configured to hold a robot arm process end effector 415A-415C.

The robot transport 110 is mounted to the frame 106 in any suitable manner. As described herein, the robot transport 110 may be any suitable robotic transport such as, for example, at least one of a gantry robot 110G, a SCARA robot 110S, or a multi-axis industrial robot 110M such as those described above with respect to FIGS. 2-7. The robot transport 110 includes a drive 110D with at least one degree of freedom 110F.

In one aspect, the robot transport 110 includes a movable end effector 110E with a grip 110G for holding a specimen holder (e.g., rack and plate gripper (such as end effector 415B), tube gripper (such as end effector 415A), or any other suitable specimen holder) with a grip 110G for holding a specimen holder (e.g., well plate, sample tube, etc.). Here, the electromagnetic sensor 120 is connected to the movable end effector 110E (e.g., in any suitable manner) in a predetermined location on the robot transport 110 relative to a reference base 110R (e.g., coordinate system origin) of the robot transport 110. For example, the end effector 110E may grip the electromagnetic sensor 120 such that the location of the gripped electromagnetic sensor 120 is known in the robot coordinate system; while in other aspects the electromagnetic sensor 120 may be connected to the end effector 110E through structure of the robot transport 110 where the location of the electromagnetic sensor 120 is known relative to both the end effector 110E and the robot coordinate system origin.

In another aspect, the robot transport 110 includes a movable transport terminal 110T, where the at least one degree of freedom 110F effects movement of the movable transport terminal 110T. The movable transport terminal 110E includes coupling 110C configured for holding a fungible laboratory device 495. The fungible laboratory device 495 includes one or more of an end effector 110E (e.g., rack and plate gripper (such as end effector 415B), tube gripper (such as end effector 415A), or any other suitable specimen holder) with a grip 110G for holding a specimen holder (e.g., well plate, sample tube, etc.), and a fungible laboratory robot tool, where the fungible laboratory robot tool 496 is a pipette head 417, 417A-417C, 514 or liquid dispensing tool 477. The coupling 110C provides a releasable coupling between the robot transport 110 and the fungible laboratory device 495 so that each fungible laboratory device 495 is selectable by the transport robot 110 in the manner described herein. Here, the electromagnetic sensor 120 is connected to the movable transport terminal 110T in a predetermined location on the robot transport 110 relative to the reference base 110R in a manner similar to that of the fungible laboratory robot tools 496. For example, the electromagnetic sensor 120 may couple with the coupling 110C of the movable transport terminal 110T such that the location of the coupled electromagnetic sensor 120 is known in the robot coordinate system; while in other aspects the electromagnetic sensor 120 may be connected to the movable transport terminal 110T through structure of the robot transport 110 where the location of the electromagnetic sensor 120 is known relative to both the movable transport terminal 110T and the robot coordinate system origin.

The electromagnetic sensor 120 may be any suitable microwave, infrared wave, and/or visible light wave sensor. In one aspect, the electromagnetic sensor 120 is configured as an electromagnetic distance sensor 120D configured to effect distance determination between the electromagnetic sensor 120 and a feature of at least the fixture 130 as described herein. In some aspects, the electromagnetic sensor 120 is configured as an electromagnetic beam sensor 120B configured to effect distance determination between the electromagnetic sensor 120 and a feature of at least the fixture 130 as described herein; while in other aspects, the electromagnetic beam sensor 120B is configured as a through beam sensor 120T.

The electromagnetic sensor 120, with the controller 112, effects edge sensing (e.g., of datum sets or other edges or nest (s) (where datums may be one or more of nest exterior or interior edges, and/or other datum features within the nest) of one or more of the fixture 130 and fungible laboratory device holding station 107 as described herein, where the fixture 130 may have a nest configuration (see e.g., fixtures 130A, 130B in FIG. 1) for identifying a spatial orientation of one or more of the fixture 130 and fungible laboratory device holding station 107 such where the robot transport 110 moves the electromagnetic sensor 120 along an axis until the electromagnetic wave emitted by the electromagnetic sensor 120 changes length (e.g., via an transition of the electromagnetic wave across an edge of the fixture 130 or fungible laboratory device holding station 107) and the axis position of the robot transport 110 is recorded by the controller 112. The electromagnetic sensor 120 may also be employed to verify or otherwise determine a pitch, roll, and/or yaw alignment of the labware nest positions (as described herein such as in the axes Rx, Ry, Rz) and fungible labware holding locations (as described herein) thereof, such as by comparing an output of the electromagnetic sensor 120 over various points on the labware nest (or more generally the fungible laboratory device holding station 107). The electromagnetic sensor 120 may further be employed to determine labware dimensions (such as dimensions of a well plate) and the A-1 well position of the well plate by sensing edges of the labware. The electromagnetic sensor 120 may include or be in communication (e.g., through controller 112) with any suitable teach status indicator 191. The teach status indicator may be visual (e.g., lights) and/or aural so to as provide a status/progress of the teaching described herein.

The electromagnetic sensor 120 includes a housing 121 that houses a sensor head, amplifier, and a communication unit such as an electromagnetic wave emitter 122E, electromagnetic wave receiver 122R, and a transmitter 123. In one aspect the electromagnetic wave emitter 122E and electromagnetic wave receiver 123R are configured to measure distance; while in other aspects the electromagnetic waver emitter 122E and electromagnetic wave receiver 123R are positioned relative to one another so as to have a through beam arrangement configured to detect breakage of an electromagnetic wave beam passing between the electromagnetic waver emitter 122E and electromagnetic wave receiver 123R.

The transmitter 123 is any suitable transmitter that transmits sensor signal data to the controller 112 of the robot transport 110 or to controller 230 for effecting the automatic teaching described herein. In one aspect the transmitter 123 is wireless where any suitable power supply, processors, and circuitry are provided within the housing 121 so that the sensor signal data is provided by the electromagnetic wave emitter 122E and electromagnetic wave receiver 123R to the transmitter 123, and so that the transmitter 123 communicates the sensor signal data to the controller 112, 230. In other aspects, the transmitter 123 is wired, where a sensor coupling 121C of the housing 121 includes electrical and/or communication couplings 121COM that couple with corresponding electrical and/or communication couplings 110COM of robot transport 110 (the couplings 110COM being disposed at the transport terminal 110T coupling 110C, the grip 110G of the end effector 110E or any other suitable location of the robot transport 110). The couplings 110COM, 121COM provide the electromagnetic sensor with power and communications so that the transmitter 123 communicates the sensor signal data to the controller 112, 230. Here, the sensor signal data embodies a distance measure obtained by, or a breakage/disruption of the beam between the electromagnetic wave emitter and 122E electromagnetic wave receiver 123R.

The housing 121 includes a sensor coupling 121C. The sensor coupling 121C is shaped and sized so as to mate with one or more of the transport terminal 110T coupling 110C and the grip 110G of the end effector 110E. The sensor coupling provides for gripping or coupling of the electromagnetic sensor 120 with one or more of the transport terminal 110T coupling 110C and the grip 110G of the end effector 110E so that the sensor coupling is transported by the robot transport 110.

The housing 121 is shaped and sized in a manner similar to a fungible laboratory device 495 so that the electromagnetic sensor 120 may be held at any location (such as those described herein) a correspondingly shaped and sized fungible laboratory device 495 is held. For example, where the electromagnetic sensor 120 is to be held at docking station 538 or pipetting head dock location 410C, the housing 121 has a size and shape that conforms to the holding locations of the docking station 538 or pipetting head dock location 410C (e.g., so that electromagnetic sensor 120 is held at docking station 538 or pipetting head dock location 410C in a manner similar to that of the pipette head 514 or liquid dispensing tool 477). Similarly, where the electromagnetic sensor 120 is to be held at end effector processing module 410D, the housing 121 has a size and shape that conforms to the holding locations of the end effector processing module (e.g., so that electromagnetic sensor 120 is held at the end effector processing module 410D in a manner similar to that of the end effectors 415A-415C). In this manner, the electromagnetic sensor 120 may be accessed by the robot transport 110 at any suitable time prior to, during, or after a sample processing operation.

Referring to FIGS. 1, 8, 9, 10A-10C, and 13, the fixture 130 may be provided in any of a number of fixture configurations 130A-130F, 130N that provide the automatic teaching system 100 with different teach configurations. As described herein, in aspects where the fixture 130 includes sensors, the fixture 130 may include an onboard power supply or be communicably coupled (e.g., wired or wirelessly) to any suitable power outlet/source of the automated laboratory equipment 105.

Figure 11:
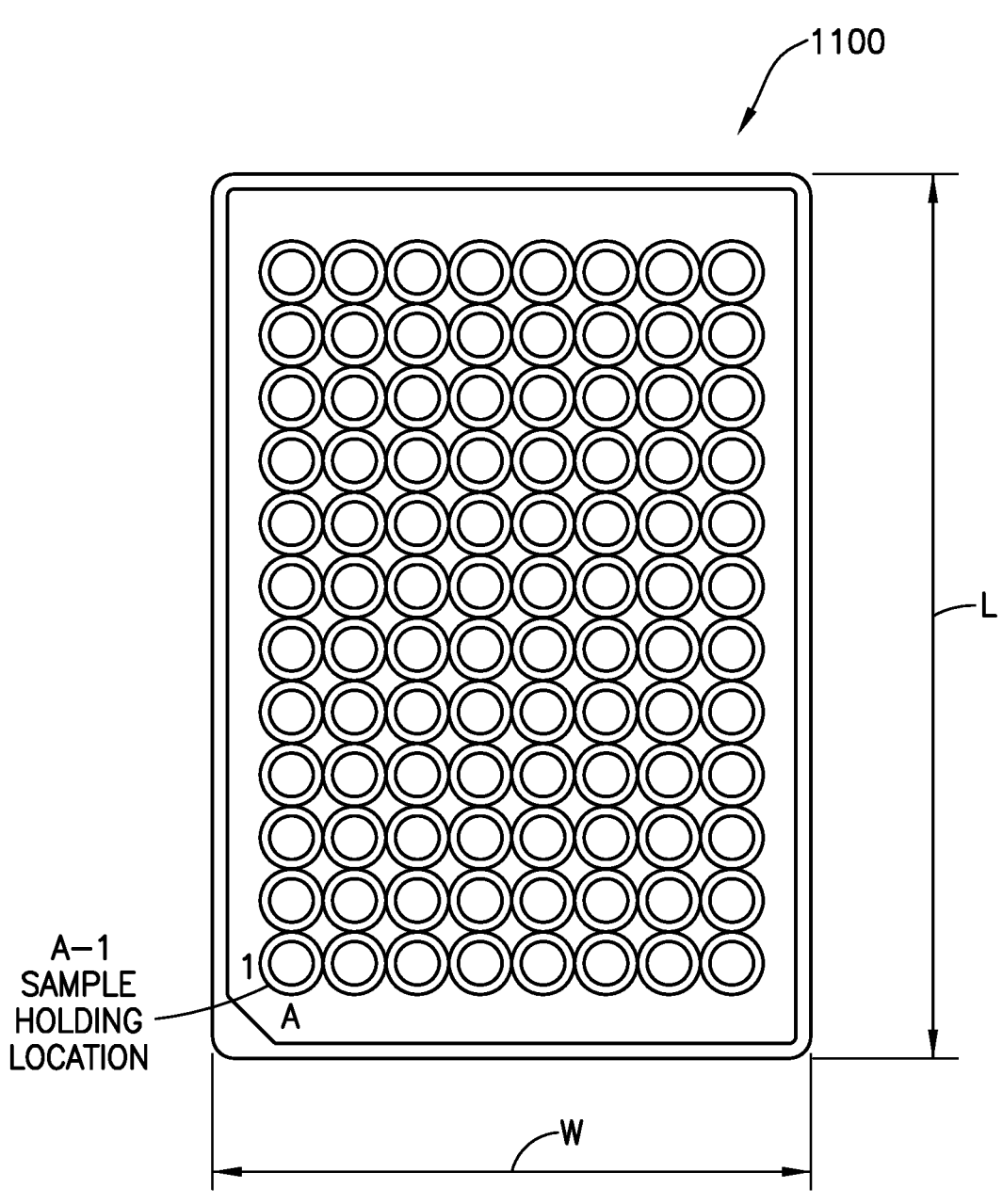
FIG. 11 is a schematic illustration of an exemplary 96 well microplate having a standardized SBS footprint in accordance with the ANSI SLAS 4-2004 (R2012) (formerly recognized as ANSI/SBS 4-2004) standard, which standard incorporated herein by reference in its entirety (which SBS footprint is also applicable for 96 well, 384 well, 1536 well, and 3456 well microplates)

In one aspect, the fixture 130 includes a plate or frame 130FR that includes a base 131 having a length L and width W that has a known relation (e.g., a predetermined fit up) with respect to a known SBS footprint of an SBS tray or well plate 1100 (an example of which is illustrated in FIG. 11) as described in the ANSI SLAS 4-2004 (R2012) (formerly recognized as ANSI/SBS 4-2004) standard so that the fixture may be placed at a tray holding location (also referred to as specimen holder station 107S) of a well plate nest, such as those nests described herein. In other aspects, where non-standard well plate sizes are employed the base 131 and/or base protrusion 131P have a length L and width W conformal with the non-standard plate sizes so that the fixture 130 may be held in the non-standard well plate holding locations.

As an example, the fixture configurations 130A, 130B, 130C have a nest arrangement having at least two teach locations 130TL, where each teach location 130TL of the nest spatially corresponds with (e.g., a known predetermined relation with respect to a respective tray holding location THL, where that predetermined relationship may even be offset from the respective tray holding location THL but known in a fixed aspect/relation to the respective tray holding location THL) a respective tray holding location THL or specimen holder station 107S of a nest of the laboratory equipment (see FIG. 1). Here the multiple teach locations 130TL of the fixture configurations 130A, 130B, 130C are placed over the entire nest or over a portion of the nest of the laboratory equipment for teaching the locations of the respective tray holding locations THL. The base 131 of fixture configurations 130A, 130B, 130C includes at least one base protrusion 131P that has the length L and width W (as described herein) so that the base protrusion may be inserted into and held by at least one tray holding location THL in a nest of tray holding locations (see FIG. 1).

The fixture configurations 130D (FIG. 9) and 130F (FIG. 13) have a single teach location 130TL arrangement. Here, the base 131 of fixture configurations 130D, 130F, having the length L and the width W conformal with the SBS footprint may be placed in any one of a number of tray holding locations THL or specimen holder stations 107S of the laboratory equipment for teaching a location of an individual tray holding location THL. It is noted that while the fixture configurations 130D and 130F are illustrated without a base protrusion 131P, in other aspects, the fixture configurations 130D and 130F may include a base protrusion 131P in a manner similar to that illustrated in FIGS. 10B and 10C.

Figure 12:
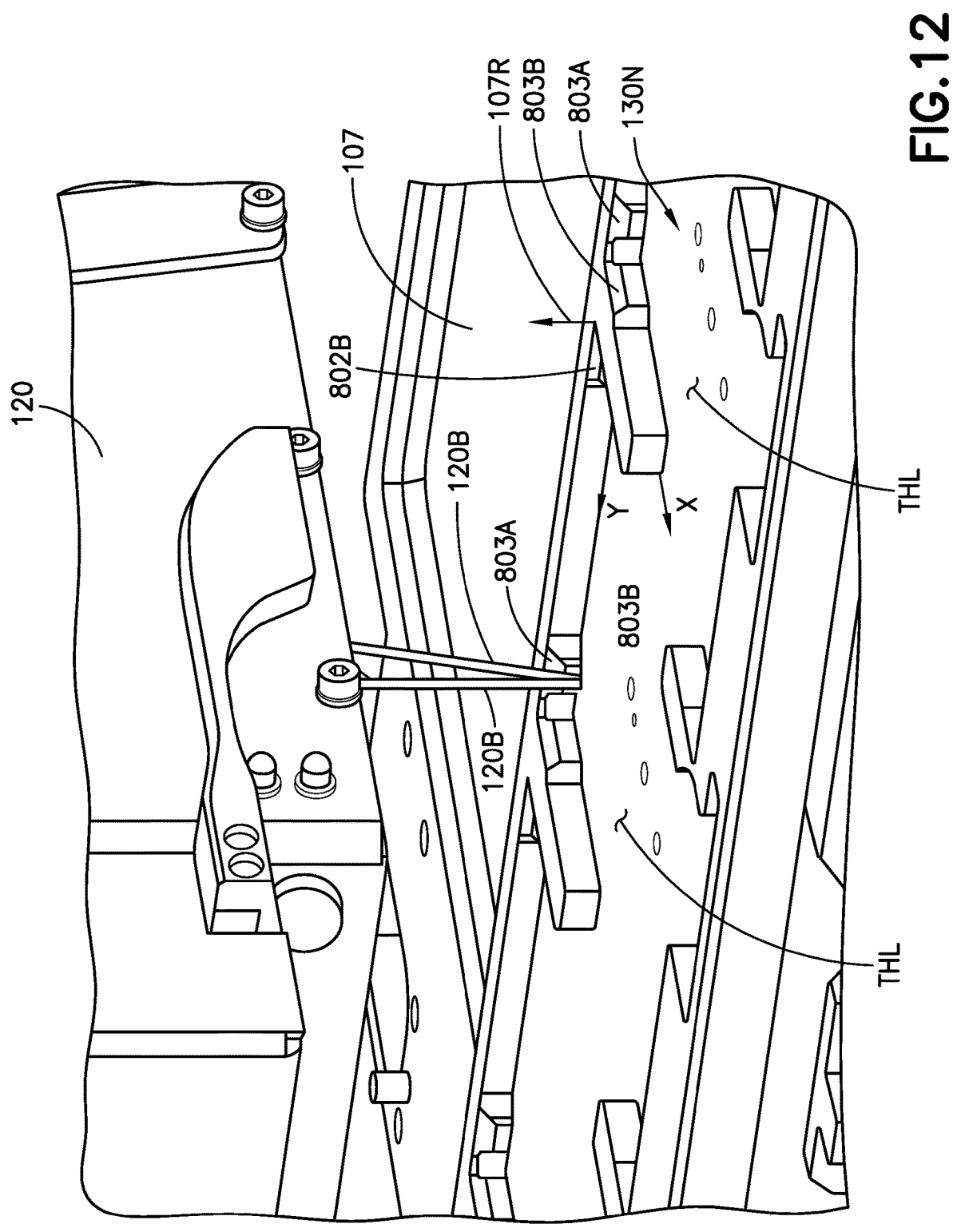
FIG. 12 is an exemplary schematic illustration of a portion of the automated teaching system of FIG. 1 in accordance with aspects of the present disclosure.
Figure 13:
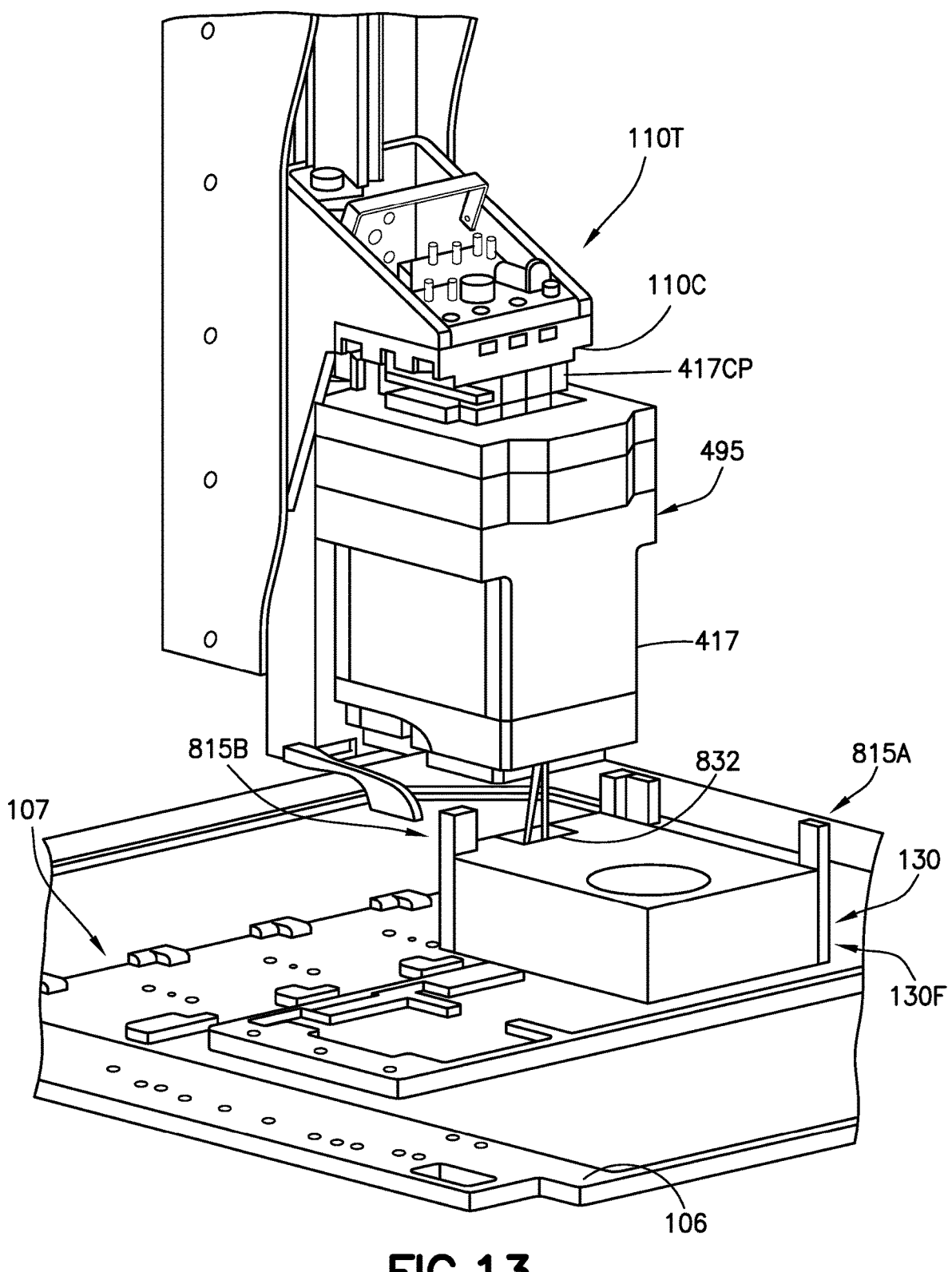
FIG. 13 is an exemplary schematic illustration of a portion of the automated teachings system of FIG. 1 in accordance with aspects of the present disclosure.

In other aspects, the fixture 130 may be integral with the tray holding locations THL or specimen holder stations 107S of the laboratory equipment. For example, FIG. 12 illustrates fixture configuration 130N which may be substantially similar to any one of fixture configurations 130A-130F. The fixture configuration 130N is configured to be coupled to the fungible laboratory device holding station 107 in any suitable manner (e.g., mechanical fasteners, chemical fasteners, etc.) where the fixture configuration 130N includes tray holding locations THL (employed for processing samples) having one or more characteristics of the teach locations 130TL described herein.

Referring to FIGS. 1, 8, 9, 10A-10C, and 12, the fixture configurations 130A-130F, 130N will be described with respect to determining a station reference location of a well-plate holding location (such as tray holding location THL or specimen holder station 107S); however, it should be understood that the fixture configurations and determination of a station reference location for any of the fungible laboratory device holding stations described herein is performed with fixtures that correspond to those fungible laboratory device holding stations in a substantially similar manner. In one or more aspects, one or more of the fixture configurations 130A-130F, 130N includes one or more of a predetermined geometric pattern 800, a radiation beam sensor 832, and one or more through beam sensor 815A, 815B (see FIG. 8), which are described below with respect to fixture configuration 130E for exemplary purposes only.

In one or more aspects, each teach location 130TL of the fixture configurations 130A-130F, 130N includes a predetermined geometric pattern 800 formed of discriminant features 801A-801B, 802A-802B, 803A-803B, 804A-804B. These discriminant features 801A-801B, 802A-802B, 803A-803B, 804A-804B are variant in at least two dimensions and characterize the predetermined geometric pattern 800. These discriminant features 801A-801B, 802A-802B, 803A-803B, 804A-804B are also registrable by the electromagnetic sensor 120. In other aspects, one or more teach locations 130TL of the fixture configurations 130A-130F, 130N includes the predetermined geometric pattern 800 where the teach locations 130TL have known spatial relationships with each other such that the teaching of one teach location 130TL to the robot transport 110 teaches the locations of all teach locations 130TL to the robot transport via the known spatial relationships between the teach locations 130TL.

The discriminant features 801A-801B, 802A-802B, 803A-803B, 804A-804B characterizing features of the predetermined geometric pattern 800 are arranged in datum sets (e.g., discriminant features 801A-801B form one datum set, discriminant features 802A-802B form one datum set, discriminant features 803A-803B form one datum set, and discriminant features 804A-804B form one datum set). The corresponding feature datums of each datum set are deterministic of a unique discrete location and orientation (e.g., datum reference frames 801A-804C) on the fixture 130 that has a predetermined relation with the holding station reference location or frame 107R, and deterministically identifies the holding station reference location 107R so that the controller 112 determines the holding station reference location 107R from scanning, with the electromagnetic sensor 120 in the at least one degree of freedom 110F, of but one datum set of the fixture 130 located at the fungible laboratory device holding station 107 (which in this example is a well plate holding location but in other aspects may be any one or more of the fungible laboratory device holding locations described herein). In other words, each datum set defines a respective reference frame 801A-804C that has a known location on the frame 130FR and is employed as a reference for determining a location of a respective holding station reference location 107R at which holding station 107 the teach location 130TL is held. Here, with the fixture 130 disposed at the holding station 107, the datum sets of the teach location 130TL have a known spatial relationship with a respective reference location 107R of the holding station 107, the known spatial location effecting determination of the respective reference location 107R through scanning (e.g., detecting characteristics of) of but one datum set with the electromagnetic sensor 120 as described herein (although in other aspects more than one datum set may be scanned).

The discriminant features 801A-801B, 802A-802B, 803A-803B, 804A-804B define variances in distance (e.g., in a direction of measure by the electromagnetic sensor), the distance variances being registrable with the electromagnetic sensor 120. Each datum set comprises a three-dimensional depth pattern on the top and/or sides of the frame 130FR with a series of neighboring predetermined heights, the neighboring heights being formed of features (e.g., planar surface registrable with the electromagnetic sensor 120) having any known shape and size. Here the three dimensional pattern is formed by recesses formed in the top and/or sides of the frame 130FR. With reference to the datum set formed by discriminant features 804A, 804B (noting the other datums sets having similar configuration), the discriminant features 804A, 804B are formed in the frame 130FR so as to form three axes of a three-dimensional reference frame 804C, where discriminant feature 804A forms one axis (e.g., X or Y axis), discriminant feature 804B forms another axis (e.g., another of the X or Y axes, and the distance measure direction forms yet another axis (e.g., Z axis).

Figure 8:
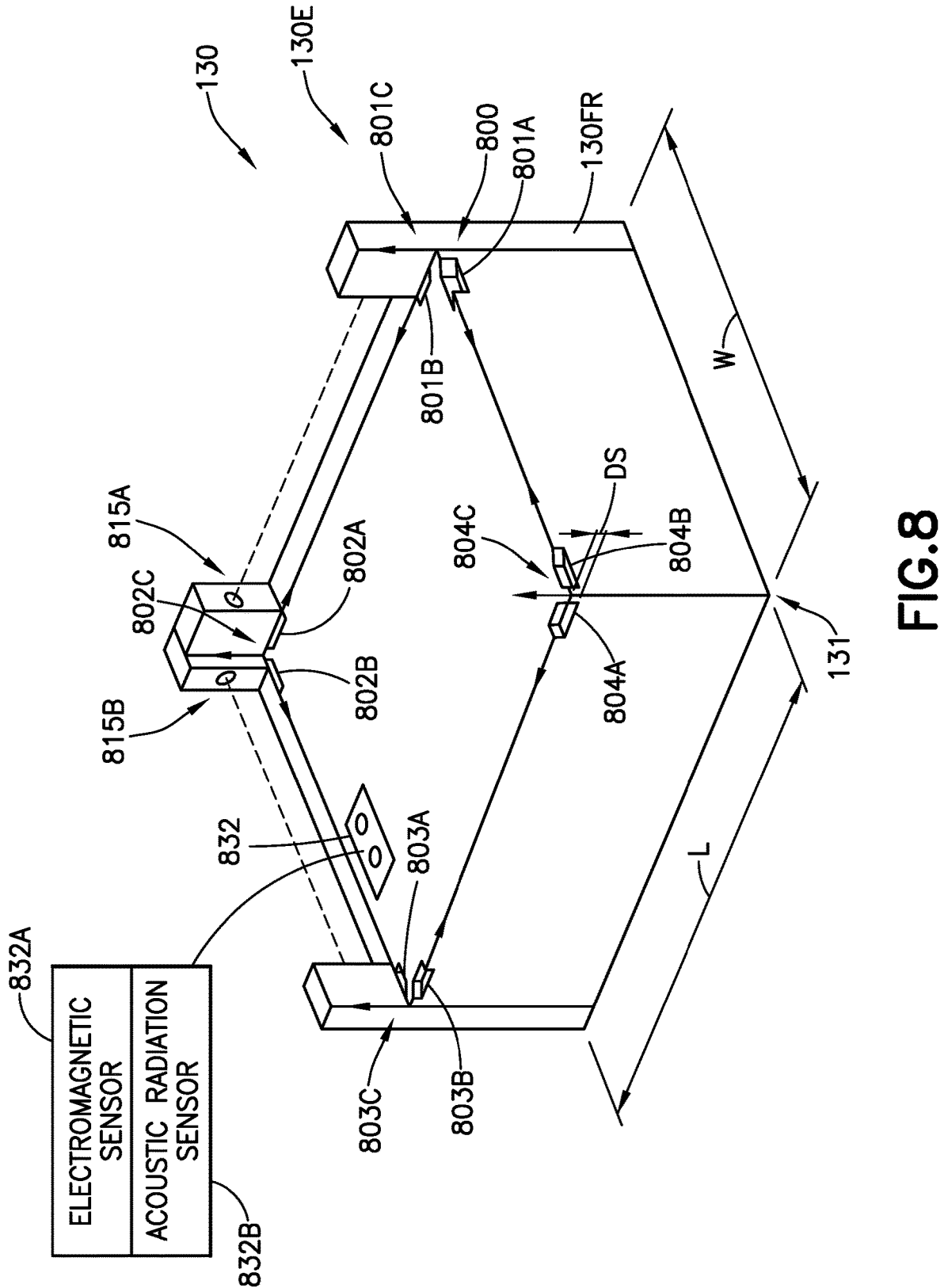
FIG. 8 is a schematic illustration of a fixture of the automated teaching system of FIG. 1 in accordance with aspects of the present disclosure.
Figure 10A:
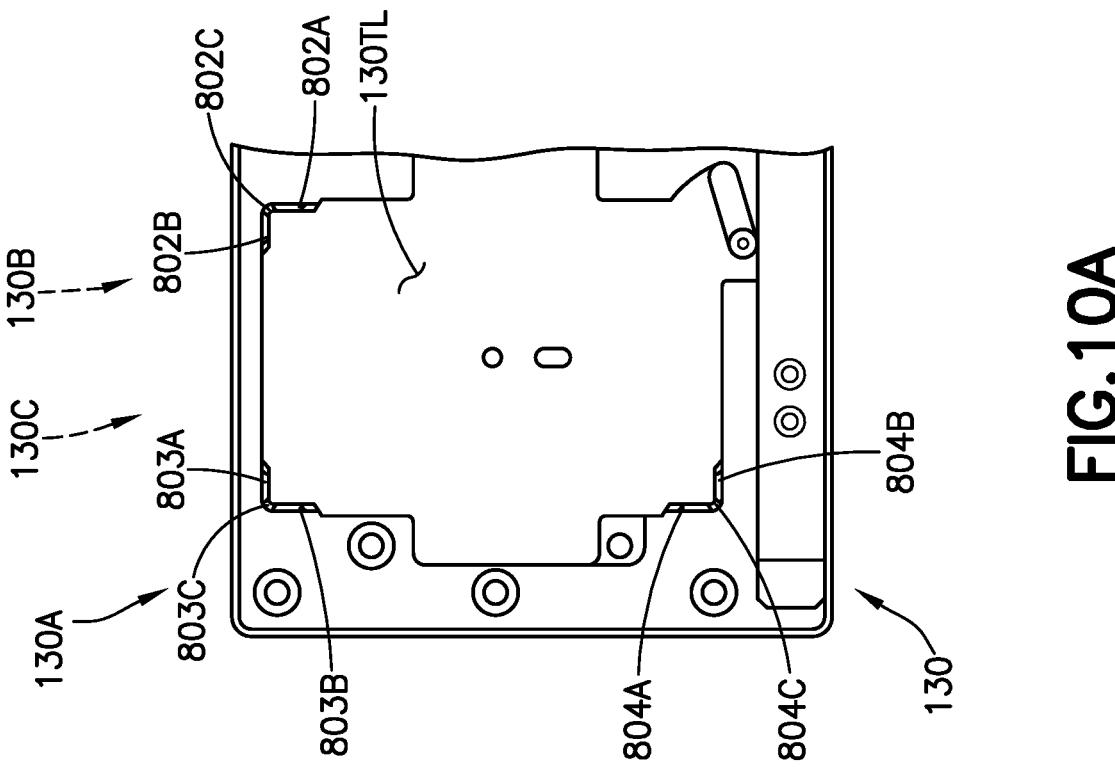
FIG. 10A is a schematic plan (top) view illustration of a portion of a fixture of the automated teaching system of FIG. 1 in accordance with aspects of the present disclosure.
Figure 9:
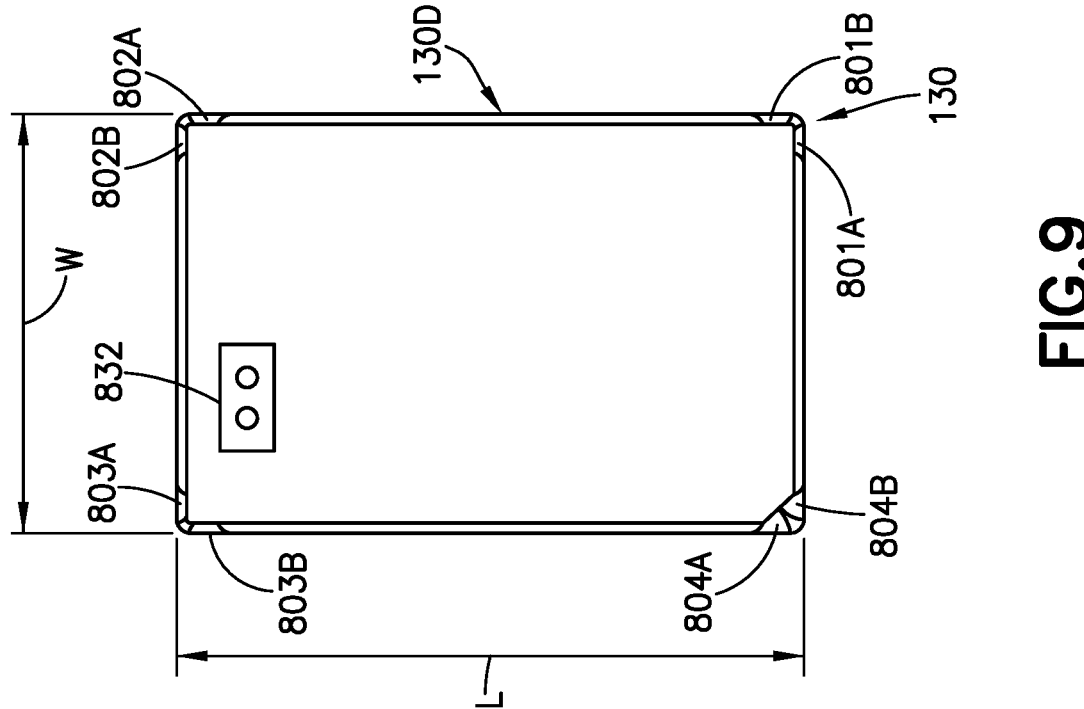
FIG. 9 is a schematic illustration of a fixture of the automated teachings system of FIG. 1 in accordance with aspects of the present disclosure.
Figure 10C:
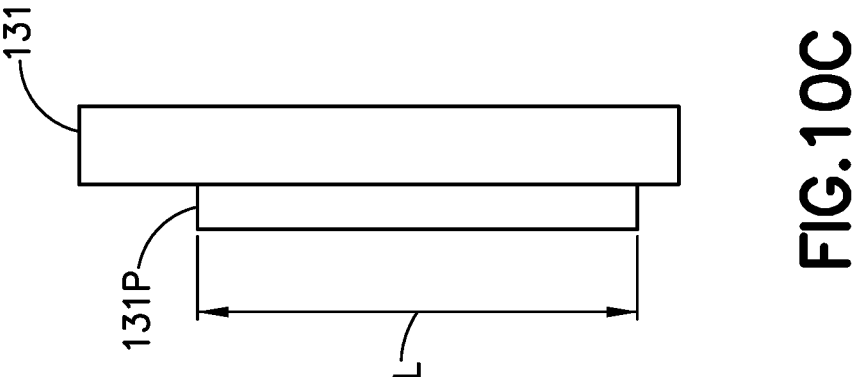
FIG. 10C is a schematic side view illustration of the portion of the fixture illustrated in FIG. 10A in accordance with aspects of the present disclosure.
Figure 10B:
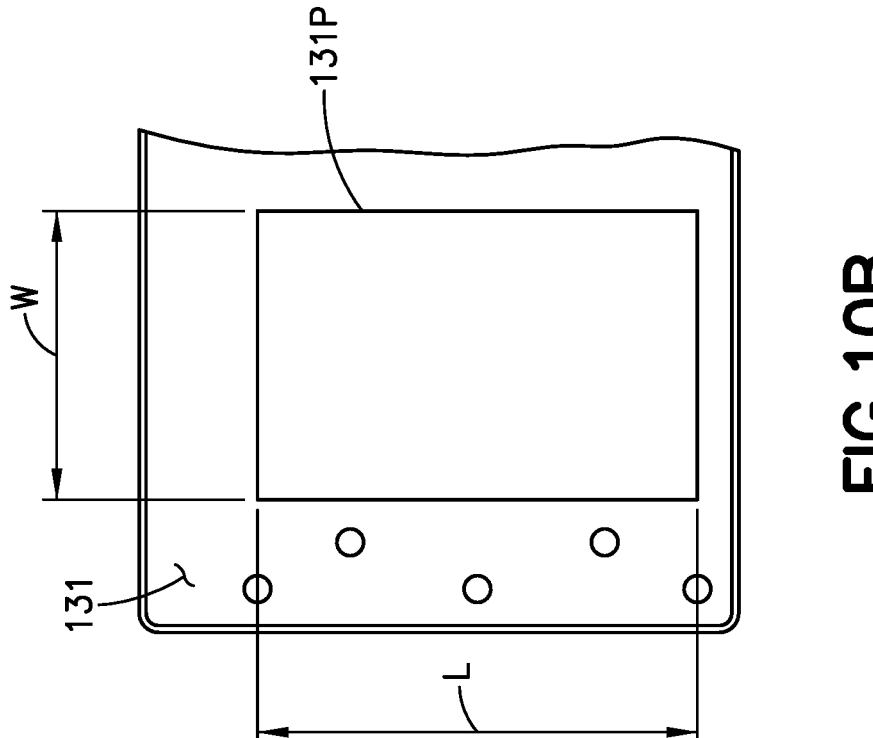
FIG. 10B is a schematic bottom view illustration of the portion of the fixture illustrated in FIG. 10A in accordance with aspects of the present disclosure.

The configuration of the datum sets is such that the neighboring heights of the discriminant features of each datum set are different (e.g., unique relative to) the neighboring heights of the discriminant features of each other datum set. For example, the difference in height DS between discriminant features 804A, 804B is different from (and unique relative to) the difference in height between discriminant features 803A, 803B, the difference in height between discriminant features 802A, 802B, and the difference in height between discriminant features 801A, 801B. Each discriminant feature 801A, 801B, 802A, 802B, 803A, 803B, 804A, 804B may also have a unique height relative to the other discriminant features 801A, 801B, 802A, 802B, 803A, 803B, 804A, 804B. It is noted that the uniqueness of the distance DS of each datum set also applies between teach locations 130TL, such as where the fixture includes a nest of teach locations 130TL (see, e.g., fixture configurations 130A, 130B, 130C, 130F, 130N) the distance DS for each datum set in the nest is unique from each other distance DS for each other datum set in the nest. As can be seen in FIG. 8, each datum set also has a unique orientation relative to the respective teach location 130TL of the fixture 130 (as described herein the uniqueness of each datum set improves (e.g., speeds up) localization where the corresponding feature datums of each datum set are deterministic of a unique discrete location and orientation (e.g., datum reference frames 801A-804C) on the fixture 130 that has a predetermined relation with the holding station reference location or frame 107R, and deterministically identifies the holding station reference location 107R so that the controller 112 determines the holding station reference location 107R from scanning, with the electromagnetic sensor 120 in the at least one degree of freedom 110F, of but one datum set of the fixture 130 located at the fungible laboratory device holding station 107). In this manner, scanning of but one datum set (where each reference frame 801C-804C of a respective datum set has a known spatial location relative to each other reference frame 801C-804C of each other datum set) provides a unique location and orientation (e.g., full localization) of the teach location 130TL (and hence the respective reference location 107R of the holding station 107), which unique location and orientation can be translated in any suitable manner into the coordinate system of the robot transport 110, as described herein, for teaching the respective reference location 107R of the holding station 107 to the robot transport 110.

It is noted that in some aspects the holding station 107 includes multiple reference locations 107R where the multiple reference locations have known spatial relationships with each other. Here teaching one of the reference locations 107R to the robotic transport 110 teaches all of the reference locations 107R to the robotic transport 110 by virtue of the known spatial relationships between the multiple reference locations 107R (e.g., all reference locations or a set of reference locations may be simultaneously taught by teaching the a location of but one datum set of but one of the reference locations 107R to the robot transport 110). As an example, where, as noted above, the teach locations 130TL are provided in a nested configuration (see, e.g., fixture configurations 130A, 130B, 130C, 130F, 130N), each reference frame 801C-804C of the respective datum set for each teach location 130TL in the nest has a known spatial location relative to each other reference frame 801C-804C of each other datum set of each other tech location 130TL such that all of the teach locations 130TL and respective reference locations 107R for the entire nest may be taught by scanning but one datum set of the fixture 130 with the electromagnetic sensor 120.

Figure 4:
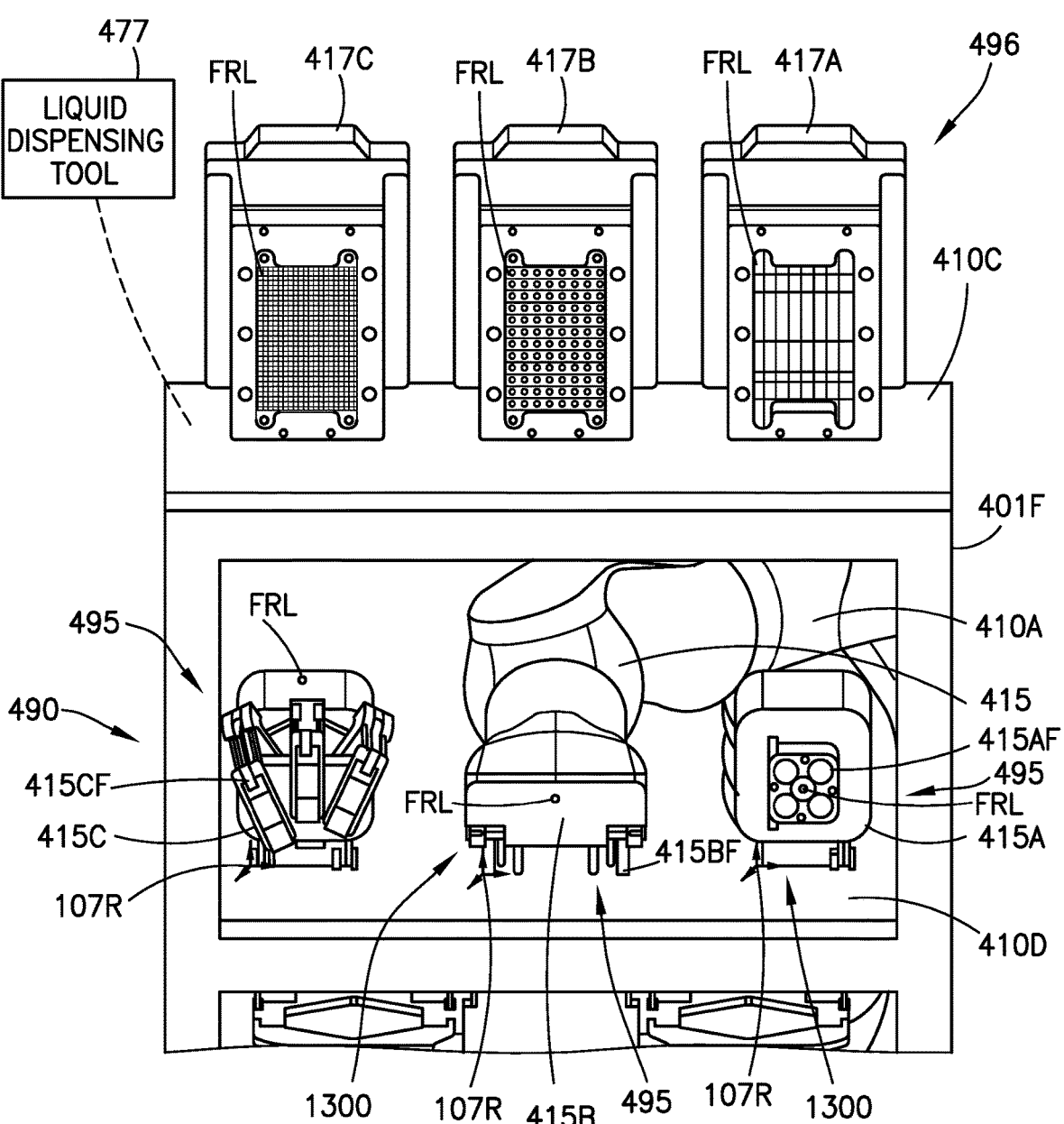
FIG. 4 is a schematic illustration of a portion of a processing apparatus of FIGS. 2 and 3 in accordance with aspects of the present disclosure.

In one or more aspects, the fixture 130 includes the radiation beam sensor 832 disposed so as to register a feature (e.g., datum feature sets similar to those of the fixture 130, edges or other registrable features of the housing 121 of the electromagnetic sensor 120, the carrier 524, gripper fingers and/or any other suitable feature) of the robot transport 110 scanning the fixture 130 located at the specimen holder station 107S or fungible laboratory robot tool holding station 490 (see FIGS. 4 and 5). The radiation beam sensor 832 may be any suitable electromagnetic sensor 832A (such as described above) or acoustic radiation sensor 832B configured to detect a distance between the fixture 130 and the robot transport 110. The radiation beam sensor 832, with the controller 112, effects resolution of an alignment between axes (e.g., X, Y, Z) of the holding station reference location (s) 107R and the axes of the reference base 110R (e.g., X, Y, Z) of the robot transport 110 by comparing outputs of the radiation beam sensor 832 over various scan points on the robot transport 110 (e.g., a continuous scan across a substantially flat horizontal surface of the robot transport 110 with resulting change in Z distance may indicate the X, Y, or Z axis of the robot transport 110 and the corresponding X, Y, or Z axis of the holder station reference location 107R are skewed/misaligned/not-level relative to each other). The radiation beam sensor 832 may also effect alignment of a pipetting head module, gripper, or any other suitable fungible laboratory device 495 or fungible laboratory robot tool 496 (such as described herein) in a manner similar to that noted above, by scanning one or more features (flat surface, edges, datum feature sets, etc.) of the fungible laboratory device 495 or fungible laboratory robot tool 496.

The controller 112 is communicably coupled to the radiation beam sensor 832 in any suitable manner (e.g., wired or wirelessly). The controller 112 is configured to receive sensor signals from the radiation beam sensor 832 and, based on the received sensor signals, determine or otherwise resolve the above-noted misalignment (e.g., angular misalignment or linear offset misalignment) between the reference base 110R (e.g., robot reference frame) of the robot transport 110 and a holder station reference location or frame 107R (e.g., origin of the holder station reference frame), where the reference base 110R contains the at least one degree of freedom 110F of the robot transport 110 (e.g., the at least one degree of freedom 110F corresponds with and provides movement along at least one axis of the reference base 110R). Here, the misalignment is determined with respect to the fungible laboratory robot tool 496 or fungible laboratory device 495, where each of the fungible laboratory robot tool 496 and fungible laboratory device 495 includes a reference location FRL (see FIG. 4) having (with the fungible laboratory robot tool coupled to the robot transport) a known spatial relationship with the reference base 110R so that scanning of the fungible laboratory robot tool effects a determination of robot transport 110 axes positions. This reference location FRL of the fungible laboratory robot tool 496 or fungible laboratory device 495 also has a known spatial relationship to a specimen holder (e.g., sample, trays, sample tubes, pipette tips, etc.) gripped by the fungible laboratory robot tool 496 or fungible laboratory device 495 so that a specimen holder grip location is known for effecting picking and placement of the specimen holder.

Figure 14:
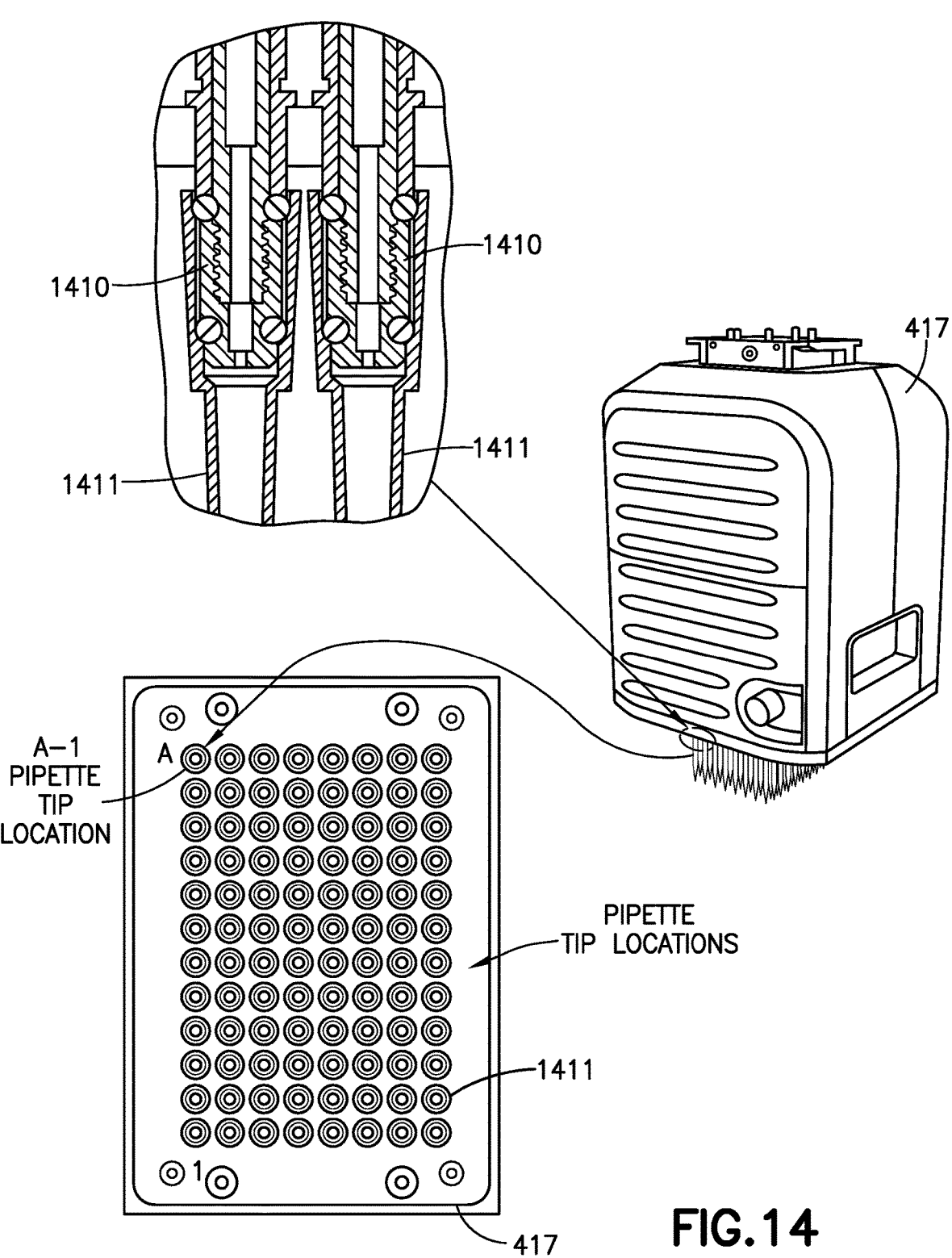
FIG. 14 is an exemplary illustration of a pipette head in accordance with aspects of the present disclosure.

In one or more aspects, the fixture 130 includes the one or more through-beam sensors 815A, 815B. For exemplary purposes, the fixture 130E is illustrated as having two through-beam sensor 815A, 815B but in other aspects there may be more or less than two through-beam sensors. The two through-beam sensors 815A, 815B are angled relative to each other. For example, the two through-beam sensors 815A, are 815B illustrated as being substantially orthogonal to each other; however, in other aspects the two through-beam sensor 815A, 815B may have any suitable angular relationship. Each of the through-beam sensors 815A, 815B is disposed to scan one or more of a mandrel 1410 and pipette tip 1411 of the pipette head 417 (see FIG. 14—which is substantially similar to one or more of the pipetting head cartridges or modules 417A-417C described herein). Each of the through-beam sensor 815A, 815B may include a beam emitter aperture and a beam receiving aperture each having a diameter of about 0.5 mm; however in other aspects the beam emitter aperture and a beam receiving aperture may have any suitable diameter that at least in part provides for the spatial positioning repeatability described herein.

Figures 15A, 15B, 15C:
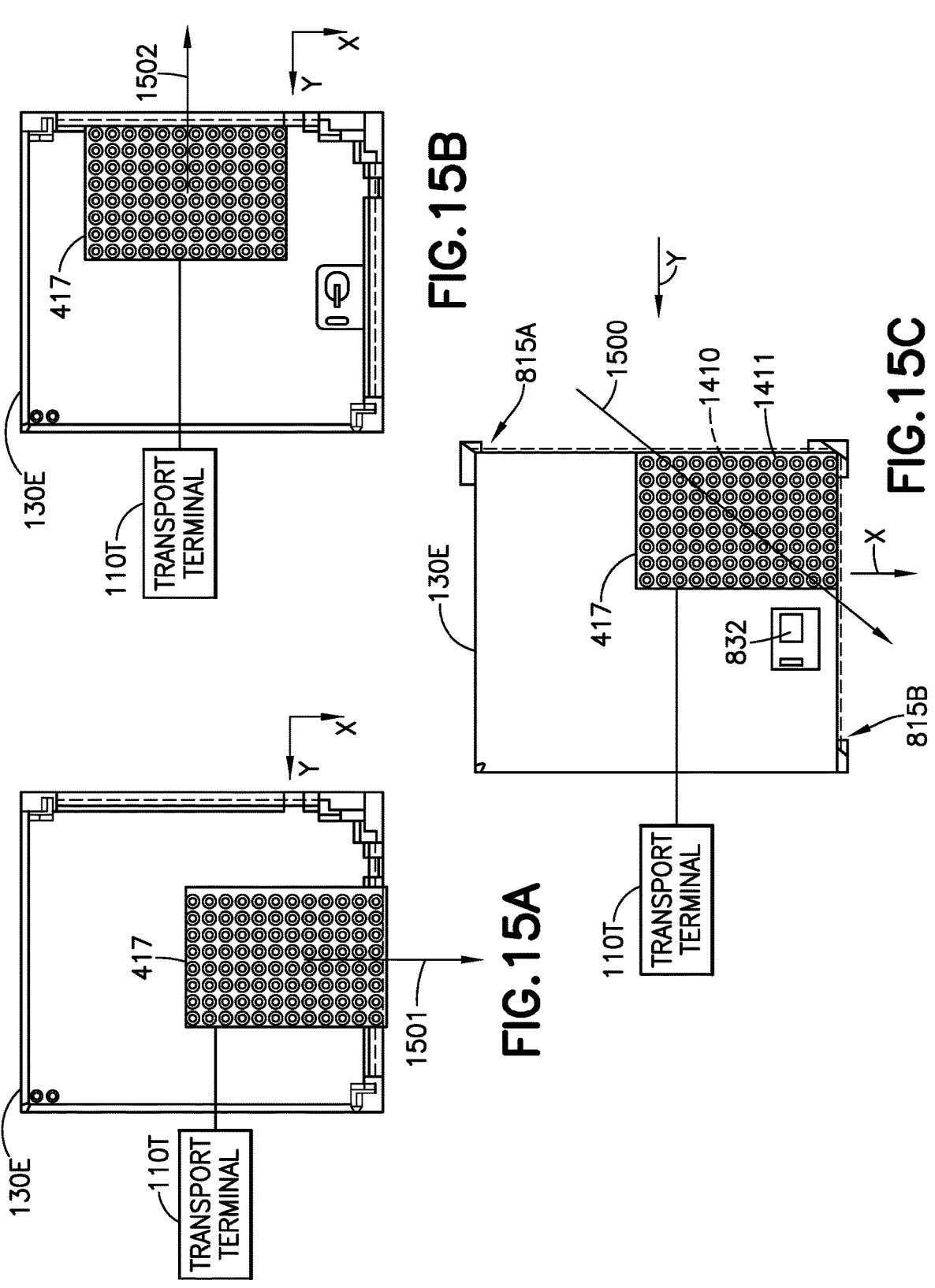
FIGS. 15A, 15B, and 15C are schematic illustrations of a portion of the automation teaching system of FIG. 1 in accordance with aspects of the present disclosure.
Figure 16:
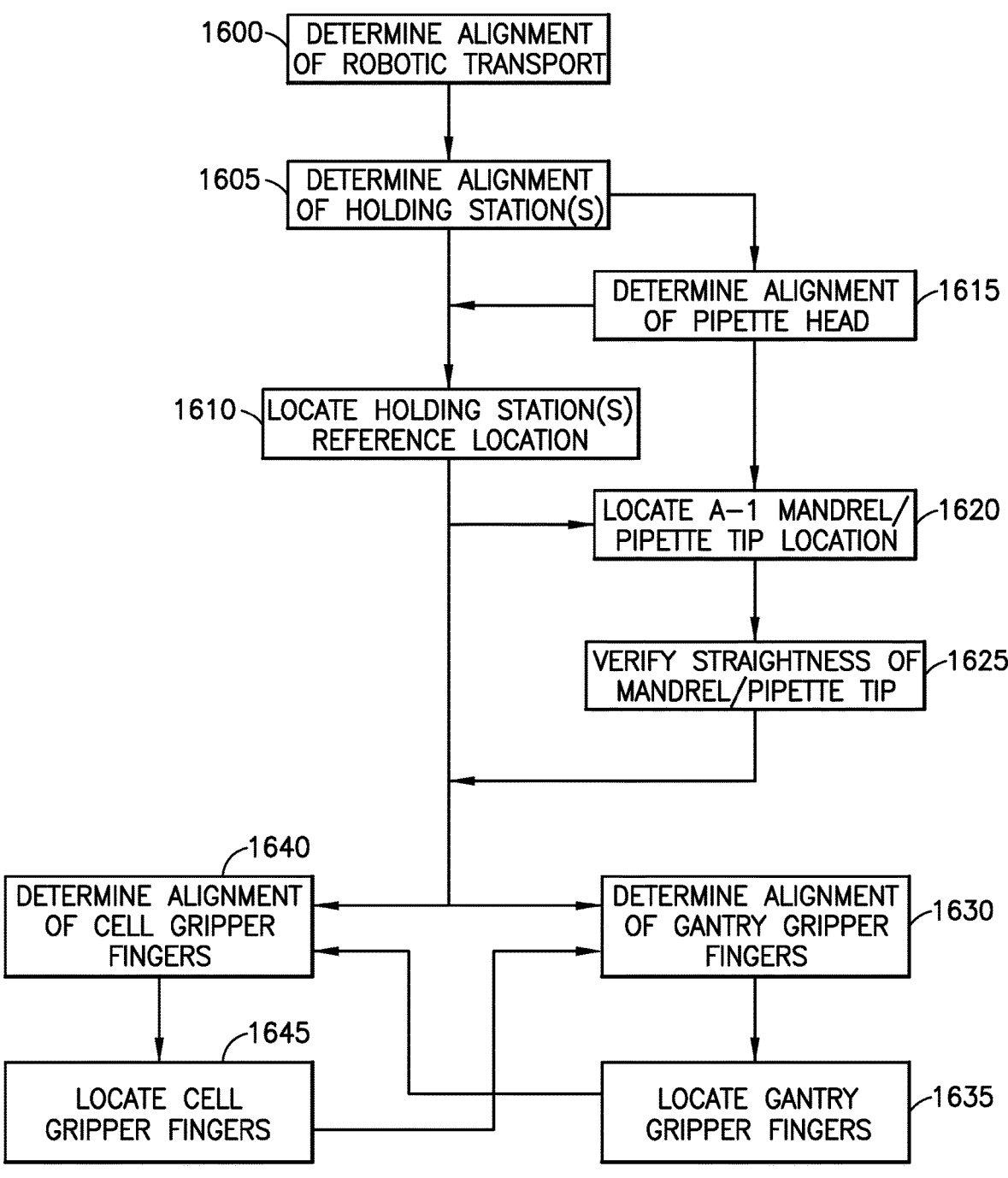
FIG. 16 is a flow diagram of an exemplary method in accordance with aspects of the present disclosure.
Figure 18:
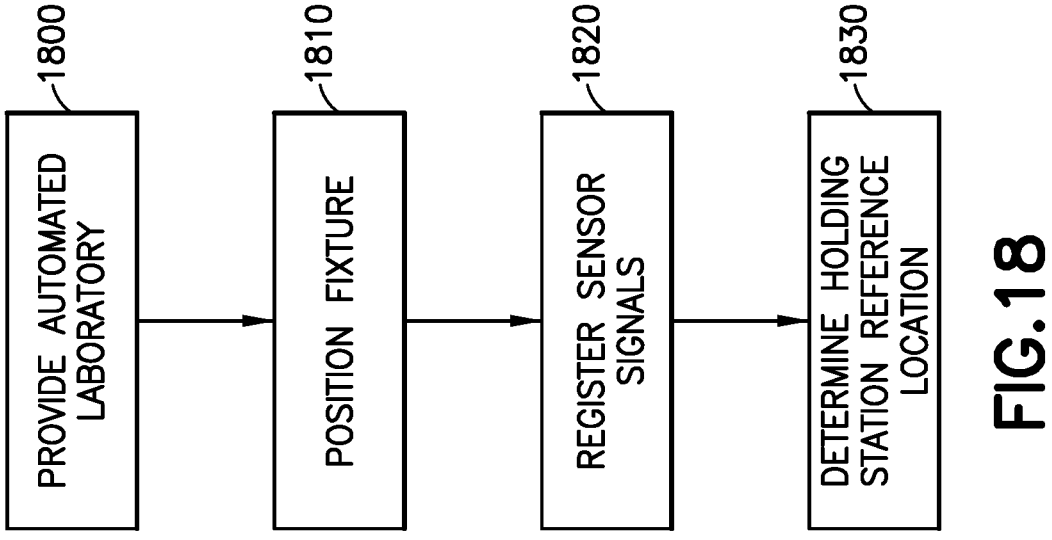
FIG. 18 is a flow diagram of an exemplary method in accordance with aspects of the present disclosure.
Figure 17:
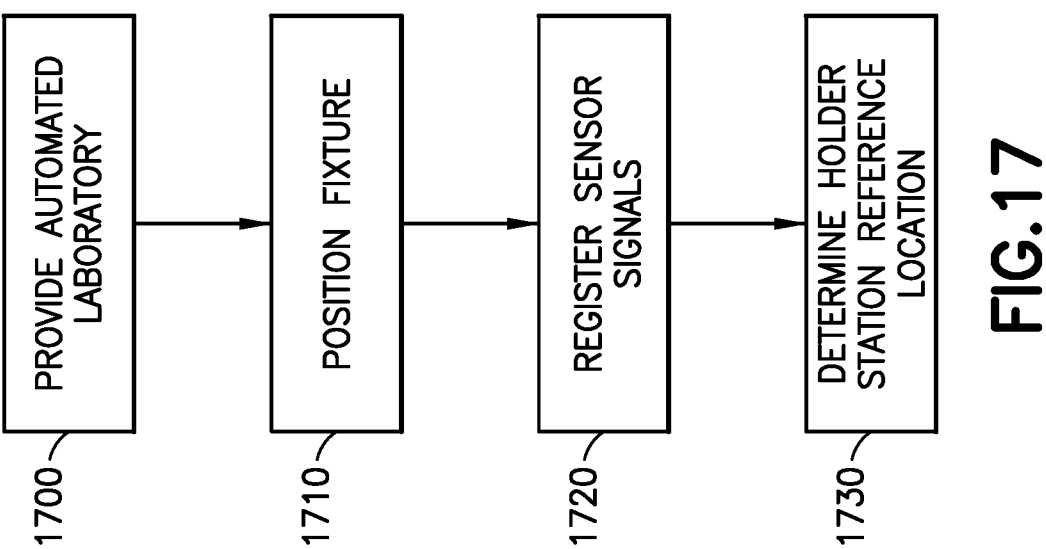
FIG. 17 is a flow diagram of an exemplary method in accordance with aspects of the present disclosure.
Figure 20:
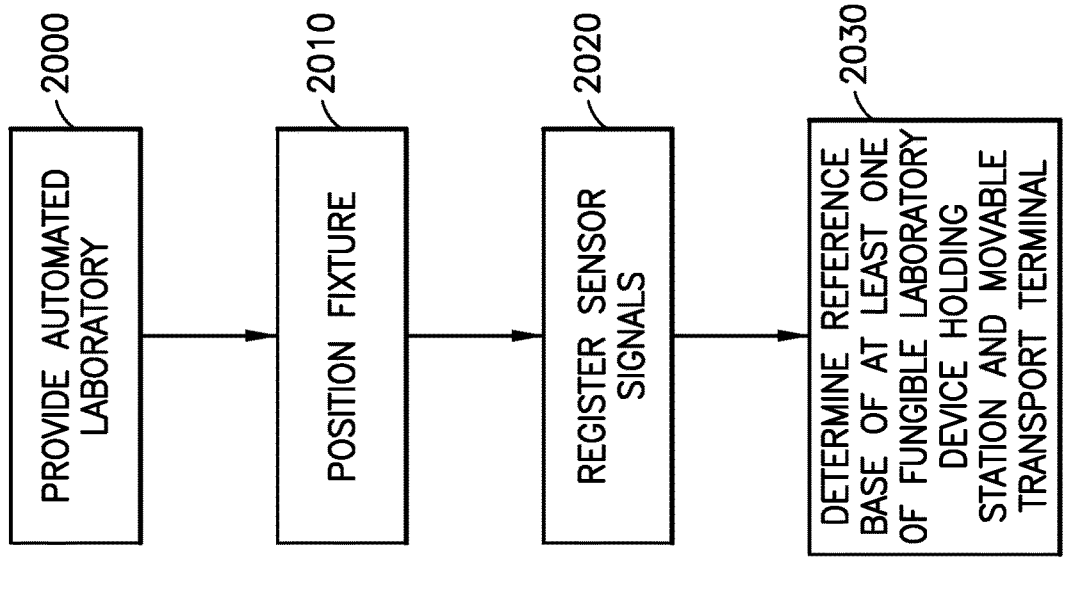
FIG. 20 is a flow diagram of an exemplary method in accordance with aspects of the present disclosure.
Figure 19:
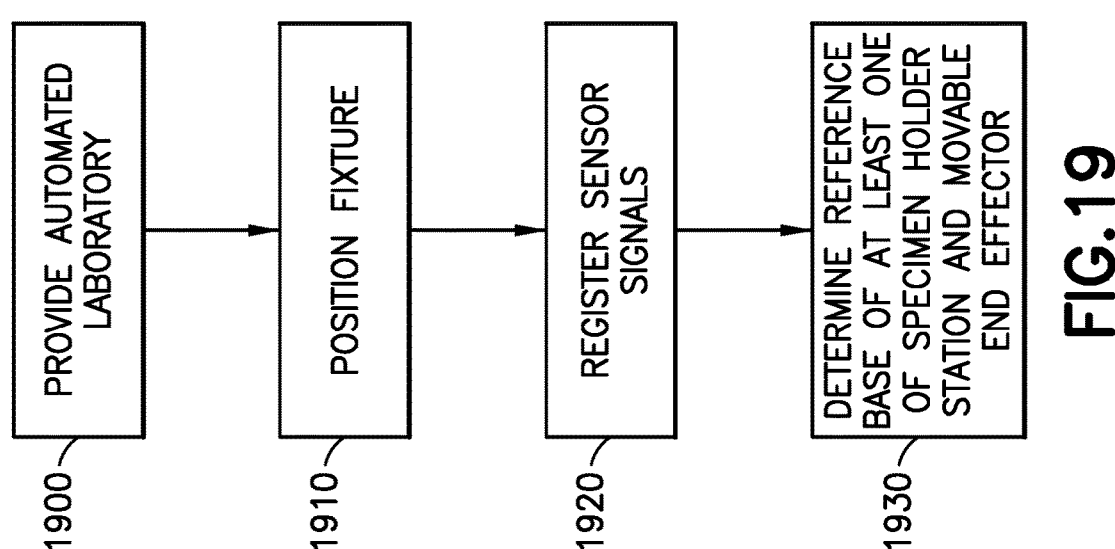
FIG. 19 is a flow diagram of an exemplary method in accordance with aspects of the present disclosure.

Referring also to FIGS. 15A-15C, the controller 112 is communicably coupled to the two through-beam sensors 815A, 815B and configured to resolve a location of each row (e.g., rows A-n, where n is a letter or series of letters denoting an upper limit to the number of rows) and column (e.g., columns 1-m, where n is a whole number denoting an upper limit to the number of columns) of pipette tip locations of the pipette head 417 relative to the reference base 110R of the robot transport 110 based on scan data of the one or more of the mandrel 1410 and the pipette tip 1411 of the pipette head 417, where one of the through-beam sensors 815A, 815B effects resolution of the location of each row and another of the through-beam sensors 815A, 815G effects resolution of each column. Determination of the rows and columns of the pipette head 417 resolves the location of the A-1 pipette location (see FIG. 14), where the A-1 pipette location corresponds with the A-1 well location when transferring sample to and from a well plate with the pipette head 417.

As an example of scanning the one or more of the mandrel 1410 and the pipette tip 1411 of the pipette head 417, the at least one degree of freedom 110F of the drive 110D comprises two degrees of freedom configured to effect, with the controller 112, movement of the movable transport terminal 110T, to which the pipette head 417 is coupled, in two directions 1501, 1502 that are angled relative to each other. Here, movement of the pipette tips 1411 and/or mandrels 1410 through the two through-beam sensors 815A, 815B in each of the two directions 1501, 1502 effects detection of each row and column of pipette tip locations of the pipette head 417 and resolution, with the controller 112, of the pipette tip locations in each of the two directions 1501, 1502 and relative to the reference base 110R. As the rows and columns of the mandrels 1410 and/or pipette tips 1411 break the beams of the through-beam sensors 815A, 815B, axis positions of the drive 110D of the robot transport 110 are recorded by the controller 112 to resolve the locations of the pipette tips 1411 and/or mandrels 1410 in the reference frame or base 110R of the robot transport 110.

As another example of scanning the one or more of the mandrel 1410 and the pipette tip 1411 of the pipette head 417, the controller 112 is configured to effect movement of the pipette head 417 so that the pipette head 417 travels along a substantially continuous path through both of the two through-beam sensors, the substantially continuous path 1500 being angled relative to both of the two through-beam sensors 815A, 815B (see FIG. 15C). Here, movement of the pipette tips 1411 and/or mandrels 1410 through the two through-beam sensors 815A, 815B along the substantially continuous path 1500 effects detection of each row and column of pipette tip locations of the pipette head 417 and resolution, with the controller 112, of the pipette tip locations relative to the reference base 110R. As noted above, as the rows and columns of the mandrels 1410 and/or pipette tips 1411 break the beams of the through-beam sensors 815A, 815B, axis positions of the drive 110D of the robot transport 110 are recorded by the controller 112 to resolve the locations of the pipette tips 1411 and/or mandrels 1410 in the reference frame or base 110R of the robot transport 110.

With respect to the through-beam sensor 815A, 815B, the controller 112 is programmed with the diameter of the pipette tips 1411 and mandrels 1410 so that as the pipette tips 1411 and mandrels 1410 pass through the through-beam sensors 815A, 815B (e.g., in one or more of the directions 1501, 1502, and along the path 1500) and break the sensor beam (e.g., in a dot-dash pattern with the beam being broken by a row or column of pipette tips 1411 and mandrels 1410 and being reestablished after passage of the row or column of pipette tips 1411 and mandrels 1410) sensor data is sent to the controller 112 and the controller 112 resolves, from the sensor data, the location of each row and column. With the rows and columns now being known, the controller 112 identifies intersections between the rows and columns to resolve the pipette tip locations. The controller 112 is configured to determine one or more of a presence of a bent mandrel 1410, a presence of a bent pipette tip 1411, an out of position mandrel 1410 or pipette tip 1411, a presence of a mandrel 1410 or pipette tip 1411, and a presence of specimen based on the scan data of the one or more of the mandrel 1410 and the pipette tip 1411 of the pipette head such as where the controller 112 resolves a diameter (e.g., row or column thickness in a direction of passage through the through-beam sensor 815A, 815B) to be greater than the programmed diameter. With the pipette tip locations known in the reference base 110R, the controller 112 resolves an offset for each pipette tip 1411 of the pipette head 417 with respect to the holding station reference location 107R so as to teach the robot transport 110 a pipette head location conformal with and disposed to pipette to the 96, 384, 1536, 3456 or any other suitable well plate.

The scan data of the mandrels 1410 and/or pipette tips 1411 may be employed to determine a misalignment between movement of the pipette head 417 in at least one direction (X, Y, Z) and a corresponding axis (X, Y, Z) of the holding station reference location 107R. For example, as described herein the at least one degree of freedom 110F of the drive 110D of the robot transport 110 effects movement of the movable transport terminal 110T (and the fungible laboratory robot tool 496 or the fungible laboratory device 495 coupled thereto) in at least one direction (e.g., such a direction corresponding to or along one of the X, Y, Z axes—see FIG. 1). The controller 112 is configured to determine a misalignment between the at least one direction and a corresponding axis (X, Y, Z, Rz, Rx, Ry of reference frame 107RF) of the holding station reference location 107R based on the scan data of the one or more of the mandrel 1411 and the pipette tip 1410 of the pipette head 417. For example, misalignment (e.g., along the X, Y, or Rz axes) may be determined based a detected dimension (e.g., diameter) of the mandrel 1411 or pipette tip 1410 being greater than a programmed dimension along one of the directions 1501, 1502 (corresponding to the X and Y axes of motion). Misalignment in at least the Z direction (or Rx or Ry directions) may be determined based on scanning along a surface of the fungible laboratory robot tool 496 or the fungible laboratory device 495 with the radiation beam sensor 832 or along a surface of the fixture 130 with the electromagnetic sensor 120, as described herein, where a difference in a scanned height indicates misalignment. The controller 112 is configured in any suitable manner to determine a drive offset 110DD based on the misalignment so as t substantially align the at least one direction of movement (see e.g., directions X, Y, Z in FIG. 15A-15C effected with the at least one degree of freedom 110F) with the corresponding axis (e.g., X, Y, Z-see FIG. 1) of the holding station reference location 107R.

As noted above, still referring to FIGS. 1, 4, 5, 8, and 12, the electromagnetic sensor 120 is employed to determine misalignment between the robotic transport 110 and the fixture 130 (and with the fixture disposed at a fungible laboratory device holding station 107 or fungible laboratory robot tool holding station 490, misalignment between the robotic transport 110 and the holding station reference location 107R). In one or more aspects, the controller 112 is configured to resolve an offset between the determined holding station reference location 107R and predetermined location of the electromagnetic sensor 120 based on scanning distances, with the electromagnetic sensor 120, from a teach position of the robot transport relative to the fixture 130 at the fungible laboratory device holding station 107.

In one or more aspects, the controller 112 is configured to move the robot transport 110 to a teach position (see FIG. 12) relative to the holding station reference location 107R and initiate scanning, of the fungible laboratory device holding station 107 (or fungible laboratory robot tool holding station 490) with the electromagnetic sensor 120 in the at least one degree of freedom 110F, distance changes defined by the discriminant features 801A-801B, 802A-802B, 803A-803B, 804A-804B characterizing the predetermined geometric pattern 800 on the fixture 130. Where the fungible laboratory device holding station 107 is a specimen holder station 107S, the controller 112 is configured to move the robot transport 110 to a teach position relative to the holder station reference location 107R and initiate scanning, of the specimen holder station 107S with the electromagnetic sensor 120 in the at least one degree of freedom 110F, distance changes defined by the discriminant features 801A-801B, 802A-802B, 803A-803B, 804A-804B characterizing the predetermined geometric pattern 800 on the fixture 130.

In one or more aspects, the controller 112 is configured to resolve an offset between the determined holding station reference location 107R and a predetermined location (e.g., reference location TRL) of the coupling 110C of the movable transport terminal 110T. In one or more aspects, where an end effector 110E is coupled to the movable transport terminal 110T, the controller 112 is configured to resolve an offset between the determined holder station reference location 107R and a predetermined location of the grip 110G of the movable end effector 110E. Resolution of the offsets is determined in any suitable manner, such as with the fixture 130 located at a fungible laboratory device holding station 107 and one or more of scanning of the fixture with the electromagnetic sensor 120 and scanning of the robotic transport 110 (and/or features of the housing 121 of the electromagnetic sensor 120) with the radiation beam sensor 832 of the fixture 130 (the radiation beam sensor 832 being disposed so as to register a feature (such as those described herein) of the robot transport 110 scanning the fixture 130 located at the fungible laboratory device holding station 107. In one or more aspects, the controller 112 is configured to resolve misalignment between the robot reference frame or base 110R containing the at least one degree of freedom (e.g., along a corresponding X, Y, Z, Rx, Ry, Rz axis of the reference base 220R) of the robot transport 110 and the holding station reference frame 107R.

Referring to FIGS. 1, 2, 3, 8, and 16, an exemplary method for automatically teaching locations in an automated laboratory (such as laboratory facility 200 and/or laboratory processing station 300) will be described. It is noted that while different teach operations are described, it should be understood that these operations may be performed in any suitable order and not necessarily in the order described herein. In addition, not all of the teach operations may be desired, where desired teach operations may depend on an operational status of the laboratory facility 200 and/or laboratory processing station 300 (e.g., whether the laboratory facility 200 and/or laboratory processing station 300 is being initially installed and set up, was previously taught the teach locations, etc.).

One or more fixtures 130 are placed (e.g., manually or in any other suitable manner) at one or more fungible laboratory device holding station 107 that are to be taught to the robotic transport 110. The robotic transport 110, via the controller 112, is provided with start locations for the automatic teaching. The start locations may be manually input to the controller such as by manually moving the robotic transport and recording the positions of the robotic transport axes at each start location or the start locations may be derived from CAD drawings of the laboratory facility 200 and/or laboratory processing station 300.

The controller operates the drive 110D (and the at least one degree of freedom 110F thereof) to move the robotic transport 110 so that a robot tool end of arm tool (such as end effector 110E, pipette head 417, 417A-417C, end effectors 415A, 415B, 415C, electromagnetic sensor 120, etc.) is positioned above the fixture 130 at the start location.

The alignment of the robotic transport 110 is determined (FIG. 16, Block 1600) by interacting one or more sensors of the fixture 130 with the robotic transport 110, such as by moving the robotic transport 110 in a predetermined scanning motion (e.g., a motion derived from the dimensions of one or more portions of the robotic transport, which in one example may be dimension of a bottom face/surfaces an end of arm tool noted above, so that one or more surfaces of the end of arm tool are scanned by the fixture 130—the scanning motion may comprise one or more motions along one or more axes). For exemplary purposes, the electromagnetic sensor 120 will be described as the end of arm tool held by the robotic transport 110 for purposes of the alignment operations described herein, unless otherwise noted. Alignment of the robotic transport 110 in one or more of the X, Y, Z directions/axes is determined by moving the electromagnetic sensor 120 relative to the fixture 130 and scanning multiple predetermined locations/points across a common surface of the robotic transport (e.g., such as one or more bottom surfaces or faces of the electromagnetic sensor 120 housing 121 or any other suitable location of the robotic transport 110) with the radiation beam sensor 832 of the fixture 130. Here, the radiation beam sensor 832, with the controller 112, determines distances at the multiple scanned predetermined locations/points and compares the distance values, where a difference between the distance values indicates misalignment between the axes of the reference base 110R of the robotic transport 110 and the holding station reference location or frame 107R. Scanning edges of the housing 121 along one or more of the X, Y, Z axes may be employed to determine parallelism and/or orthogonality of axes relative to each other; while scanning across a substantially flat surface of the bottom of the housing 121 in one or more of the X, Y, Z axes may be employed to determine rotational misalignment (e.g., levelness) about the respective axes in Rx, Ry, Rz.

Alignment of the one or more fungible laboratory device holding station 107 is determined (FIG. 16, Block 1605) by employing the sensor electromagnetic 120. Here, the electromagnetic sensor 120 is coupled to the robotic transport 110 in any suitable manner (e.g., manually, by picking of the electromagnetic sensor 120 from a suitable holding location with the robotic transport 110, etc.). As noted above, the electromagnetic sensor 120 is positioned with the robotic transport 110 above the fixture 130 at the start location so that the sensor beam emitted from the electromagnetic sensor 120 is pointed at some part of the fixture 130 (see FIG. 12). The robotic transport 110 moves the electromagnetic sensor 120 in any suitable scanning motion (e.g., similar to that noted above and based on known dimensions of the fixture 130). The scanning motion may be across one dimension (e.g., in the X or Y direction of the holding station reference location or frame 107R) of the fixture 130, where distance measurements obtained by the electromagnetic sensor 120 scanning the fixture 130 are monitored so that a distance change above a predetermined threshold is determined. The controller 112 compares the change in distance with a listing (e.g., stored in any suitable memory accessible by the controller 112) of unique predetermined height differences of the fixture 130. Where the change in distances matches a unique predetermined height difference of the fixture, the positions of the robot transport 110 axes are recorded by the controller as being at a known location of the fixture that corresponds with the unique predetermined height difference of the fixture. The controller 112 employs the known dimensions of the fixture 130 (e.g., such as of the datum sets, perimeter edges, or other known dimension), the measured distance between the electromagnetic sensor 120 (e.g., the measured height difference), and the relative distance between the sensor emitter/receiver and the sensor coupling 121C/the transport terminal 110T coupling 110C the controller 112 determines the robotic transport 110 location in at least three degrees of freedom (e.g., X, Y, Z) for the location at which the change in distance (above the predetermined threshold) is measured. The above is repeated in one or more different scanning directions (which may be orthogonal to or parallel but offset from the previous scanning direction—for example, if the previous scan direction was along the X axis, the subsequent scan direction may be along the Y axis). This, teach operation may locate the bounds (perimeter edges) of the fixture 130, where knowing the bounds narrows the scan area for determining the holding station reference location or frame 107R.

The holding station reference location or frame 107R is determined (FIG. 16, Block 1610) by employing the electromagnetic sensor 120 to scan one or more of the datum sets of the fixture 130. Here, knowing the bounds of the fixture 130 may narrow the scan area of the robotic transport 110 for detecting the discriminant features 801A-801B, 802A-802B, 803A-803B, 804A-804B characterizing features of the predetermined geometric pattern 800 of the fixture 130; while in other aspects, the scan area may be determined from the CAD drawings of the laboratory facility 200 and/or laboratory processing station 300 or manually. As noted above, each datum set defines a respective reference frame 801C-804C that has a known location on the frame 130FR and is employed as a reference for determining a location of a respective holding station reference location 107R at which holding station 107 the teach location 130TL is held. Here, with the fixture 130 disposed at the holding station 107, the datum sets of the teach location 130TL have a known spatial relationship with a respective reference location 107R of the holding station 107, the known spatial location effecting determination of the respective reference location 107R through scanning (e.g., detecting characteristics of) of but one datum set with the electromagnetic sensor 120 as described herein (although in other aspects more than one datum set may be scanned).

The robotic transport 110 moves the electromagnetic sensor 120 in any suitable scanning motion towards a datum set of discriminant features (see FIG. 12). The scanning motion may be across one dimension (e.g., in the X or Y direction of the holding station reference location or frame 107R) of the fixture 130, where distance measurements obtained by the electromagnetic sensor 120 scanning the fixture 130 are monitored so that a distance change above a predetermined threshold is determined. The controller 112 compares the change in distance with the unique predetermined height differences of the datum sets. Where the change in distances matches a unique predetermined height of one of the discriminant features 801A-801B, 802A-802B, 803A-803B, 804A-804B, the positions of the robot transport 110 axes are recorded by the controller as being at a known location of the fixture that corresponds with the detected discriminant feature 801A-801B, 802A-802B, 803A-803B, 804A-804B. As each discriminant feature has a unique height relative to the other discriminant features, the controller 112 knows which corner of the fixture 130 the discriminant feature is located and along which axis X, Y, the discriminant feature extends. For example, where a distance change is measured that is the same as a height of discriminant feature 803A (see FIG. 12) the controller 112 knows the discriminant feature extends along the Y axis. Here, the controller 112 effects movement of the electromagnetic sensor in at least the Y direction so as to scan the discriminant feature 803B so as to determine the location of the datum set reference frame 803C. With the spatial relationship between the datum set reference frame 803C and the respective reference location 107R of the holding station 107 being known, the controller 112 determines the robotic transport 110 location in at least three degrees of freedom (e.g., X, Y, Z) for the respective reference location 107R of the holding station 107 based on detection/determination of the datum set reference frame 803C location.

As described herein, the automatic teaching system 100 may be employed for alignment of a pipette head 417 (FIG. 16, Block 1615) with one or more specimen holder station 107S. Here, referring also to FIGS. 11, 13, 14, and 15A-15C, the pipette head 417 is coupled to the robotic transport 110 in any suitable manner, such as in a manner similar to that described above with respect to electromagnetic sensor 120. Here, the robotic transport 110 moves the pipette head 417 to a start location (such as above the radiation beam sensor 832) and moves the pipette head 417 in a predetermined scanning motion (e.g., a motion derived from the dimensions of the pipette head 417—the scanning motion may comprise one or more motions along one or more axes). Alignment of the pipette head 417 in one or more of the X, Y, Z directions/axes is determined by moving the pipette head 417 relative to the fixture 130 and scanning multiple predetermined locations/points across a common surface of the pipette head 417 (e.g., such as one or more bottom surfaces or faces of the pipette head or any other suitable location of the pipette head) with the radiation beam sensor 832 of the fixture 130. Here, the radiation beam sensor 832, with the controller 112, determines distances at the multiple scanned predetermined locations/points and compares the distance values, where a difference between the distance values indicates misalignment between the pipette head 417 and the axes of the holding station reference location or frame 107R. Scanning edges of the pipette head 417 along one or more of the X, Y, Z axes may be employed to determine parallelism and/or orthogonality of the pipette head 417 with the axes of the holding station reference location or frame 107R; while scanning across a substantially flat surface of the bottom of the pipette head 417 in one or more of the X, Y, Z axes may be employed to determine rotational misalignment (e.g., levelness) of the pipette head 417 relative to the holding station reference location or frame 107R about the respective axes in Rx, Ry, Rz. The controller 112 is configured to determine drive offsets so that, with the pipette head 417 coupled to the robotic transport 110, the pipette head is held in alignment with respect to the holding station reference location or frame 107R. As may be realized, each pipette head may have respective offsets determined as noted above, and employed by the controller when that pipette head is coupled to the robotic transport 110. Alignment of the other fungible laboratory devices 495 described herein may be performed in a similar manner.

The fixture 130 may be employed to locate the A-1 mandrel/pipette tip location (FIG. 16, Block 1620) of the pipette head 417 (see FIG. 14) in the manner described herein with respect to FIGS. 15A-15C. The fixture 130 may be employed to determined/verify the straightness of the mandrels/pipette tips (FIG. 16, Block 1625) of the pipette head 417 (see FIG. 14) in the manner described herein with respect to FIGS. 15A-15C.

The fixture 130 may be employed to align the fingers of a gripper (e.g., such as the grippers of a work cell robot-see grippers 370 in FIG. 3 or of robotic transport 110 of a mobile cart or stationary processing station of a collaborative work environment of FIG. 2). For example, to determine the alignment of robotic transport gripper fingers 415AF-415CF (FIG. 16, Block 1630), such as of end effectors 415A-415C (see FIG. 4), with respect to a holder station reference location 107R, the fixture is placed on at the specimen holder station 107S and the radiation beam sensor 832 is employed as described above to scan, e.g., one or more bottom surfaces of the end effector 415A-415C. Here, the robotic transport 110 moves the end effector 415A-415C relative to the fixture 130 so that multiple predetermined locations/points across a common surface of the fingers or other surface of the end effector 415A-415C is scanned with the radiation beam sensor 832 of the fixture 130. Here, the radiation beam sensor 832, with the controller 112, determines distances at the multiple scanned predetermined locations/points and compares the distance values, where a difference between the distance values indicates misalignment between the end effector fingers 415AF-415CF and the axes of the holding station reference location or frame 107R. Scanning edges of the end effector 415A-415C or end effector fingers 415AF-415CF along one or more of the X, Y, Z axes may be employed to determine parallelism and/or orthogonality of the end effector fingers 415AF-415CF relative to the axes of the holding station reference location or frame 107R; while scanning across a substantially flat surface of the bottom of the end effector 415A-415C or end effector fingers 415AF-415CF in one or more of the X, Y, Z axes may be employed to determine rotational misalignment (e.g., levelness) of the end effector fingers 415AF-415CF about the respective axes in Rx, Ry, Rz.

The alignment of the fingers 370F of the work cell gripper 370 (FIG. 16, Block 1640) is effected in a manner similar to that described above with respect to the end effectors 415A-415C (see FIG. 4). Here, the fixture 130 is placed at a specimen holding station 107S of one or more of the stations 317 interfaced with the automated unit 302A, 302B to effect alignment.

The fixture 130 may be employed to locate the fingers of a gripper (e.g., such as the grippers of a work cell robot-see grippers 370 in FIG. 3 or of robotic transport 110 of a mobile cart or stationary processing station of a collaborative work environment of FIG. 2). For example, to determine the location of robotic transport gripper fingers 415AF-415CF (FIG. 16, Block 1635), such as of end effectors 415A-415C (see FIG. 4), with respect to a holder station reference location 107R, the fixture is placed on at the specimen holder station 107S and the through-beam sensors 815A, 815B are employed to detect a Z-axis location (either through-beam sensor 815A, 815B may be employed for the Z-axis location), the X-axis location (as illustrated in FIGS. 15A-15C the through-beam sensor 815B may be employed for X-axis location determination), and the Y-axis location (as illustrated in FIGS. 15A-15C the through-beam sensor 815A may be employed for Y-axis location determination). Here, the end effector 415A-415F is positioned over the fixture 130 at a start location (the start location being determined in a manner similar to that described above) so that the gripper fingers 415AF-415CF are located above a beam of one or more of the through-beam sensors 815A, 815B. The controller 112 effects movement of the end effector 415A-415C along the Z axis until the gripper fingers 415AF-415CF break the beam of the one or more of the through-beam sensors 815A, 815B and the controller registers (e.g., in any suitable memory) the Z axis position of the drive 110D. The registered Z axis position of the drive 110D effects determination of the Z axis location of the holding (or holder) station reference location 107R due to a known spatial relationship between the through-beam sensors 815A, 815B and the holding (or holder) station reference location 107R with the fixture 130 located at the specimen holder station 107S. In a manner similar to that described with respect to FIGS. 15A and 15B, the controller moves the end effector 415A-415C along each of the X and Y axes so that the gripper fingers 415AF-415CF breaks the beam of the respective through-beam sensor 815A, 815B and each of the X and Y axis drive positions is registered by the controller 112 to effect determination of the X and Y axis positions of the holding (or holder) station reference location 107R due to a known spatial relationship between the through-beam sensors 815A, 815B and the holding (or holder) station reference location 107R with the fixture 130 located at the specimen holder station 107S. As noted herein, the location of the fingers 415AF-415CF and end effectors 415A-415C generally are known in the robot transport reference base 110R due to known dimensions of the end effectors 415A-415C and the known locations of respective laboratory device coupling 415CP (see FIG. 13, which laboratory device coupling 415CP of the end effectors 415A-415C (and other fungible laboratory devices 495 described herein) is substantially similar to, e.g., coupling 121C of the electromagnetic sensor 120) and the transport terminal 110T coupling 110C so as to translate the holding (or holder) station reference location 107R into the reference base 110R of the robot transport 110.

The location of the fingers 370F of the work cell gripper 370 (FIG. 16, Block 1645) is effected in a manner similar to that described above with respect to the end effectors 415A-

415C (see FIG. 4). Here, the fixture 130 is placed at a specimen holding station 107S of one or more of the stations 317 interfaced with the automated unit 302A, 302B to effect location determination.

As described herein, each tool of the robotic transport 110, a multi-axis robotic arm 306, and other robotic transports described herein have respective offsets that are determined by one or more of the teach operations described above. These offsets facilitate a single/common reference point (e.g., an origin of the reference base 110R of the respective robotic transport) for positioning the tool relative to a sample or sample holder regardless of the tool being held by the robotic transport.

Referring to FIGS. 1, 2, 3, 8, and 17, an exemplary method for automatically teaching locations in an automated laboratory (such as laboratory facility 200 and/or laboratory processing station 300) will be described. The method includes providing an automated laboratory (FIG. 17, Block 1700) having the frame 106, the robot transport 110, and the electromagnetic sensor 120 described herein. The fixture 130 is positioned (e.g., manually or in any other suitable manner-FIG. 17, Block 1710) at the specimen holder station 107S relative to the holder station reference location 107R. Sensors signals (such as from the electromagnetic sensor 120) are registered (FIG. 17, Block 1720) with the controller 112, where the sensor signals embody distances sensed by the electromagnetic sensor 120. The controller 112 determines (FIG. 17, Block 1730) the holder station reference location 107R from scanning, with the electromagnetic sensor 120 in the at least one degree of freedom 110F, of but one datum set (e.g., discriminant features 801A-801B form one datum set, discriminant features 802A-802B form one datum set, discriminant features 803A-803B form one datum set, and discriminant features 804A-804B form one datum set) of the fixture 130 located at the specimen holder station 107S.

Referring to FIGS. 1, 2, 3, 8, and 18, an exemplary method for automatically teaching locations in an automated laboratory (such as laboratory facility 200 and/or laboratory processing station 300) will be described. The method includes providing an automated laboratory (FIG. 18, Block 1800) having the frame 106, the robot transport 110, and the electromagnetic sensor 120 described herein. The fixture 130 is positioned (e.g., manually or in any other suitable manner-FIG. 18, Block 1810) at the fungible laboratory device holding station 107 relative to the holding station reference location 107R. Sensors signals (such as from the electromagnetic sensor 120) are registered (FIG. 18, Block 1820) with the controller 112, where the sensor signals embody distances sensed by the electromagnetic sensor 120. The controller 112 determines (FIG. 18, Block 1830) the holding station reference location 107R from scanning, with the electromagnetic sensor 120 in the at least one degree of freedom 110F, of but one datum set (e.g., discriminant features 801A-801B form one datum set, discriminant features 802A-802B form one datum set, discriminant features 803A-803B form one datum set, and discriminant features 804A-804B form one datum set) of the fixture 130 located at the fungible laboratory device holding station 107S.

Referring to FIGS. 1, 2, 3, 8, 12, 13, and 19, an exemplary method for automatically teaching locations in an automated laboratory (such as laboratory facility 200 and/or laboratory processing station 300) will be described. The method includes providing an automated laboratory (FIG. 19, Block 1900) having the frame 106 and the robot transport 110, wherein at least one of the specimen holder station 107S and the movable end effector 110E have a reference base 110R, 107R, as described herein. A radiation beam (distance) sensor (such as sensors 120, 832, as described herein) is also connected to the movable end effector 110E in a predetermined location on at least one of the robot transport 110 and the specimen holder station 107S relative to the reference base 110R as described herein. A fixture 130 is positioned (e.g., manually or in any other suitable manner-FIG. 19, Block 1910) relative to the specimen holder station 107, where the fixture 130 is as described herein. The controller 112 registers sensor signals (such as those from the distance sensors 120, 832-FIG. 19, Block 1920) embodying distances sensed by the distance sensor 120, 832. The controller 112 determines the reference base 110R, 107R (FIG. 19, Block 1930), on the at least one of the specimen holder station 107S and the movable end effector 110E, from scanning, with the distance sensor 120, 832 in the at least one degree of freedom, at least one of the movable end effector 110E and but one datum set (e.g., discriminant features 801A-801B form one datum set, discriminant features 802A-802B form one datum set, discriminant features 803A-803B form one datum set, and discriminant features 804A-804B form one datum set) of the fixture 130 located opposite the distance sensor 120, 832.

Referring to FIGS. 1, 2, 3, 8, 12, 13, and 20, an exemplary method for automatically teaching locations in an automated laboratory (such as laboratory facility 200 and/or laboratory processing station 300) will be described. The method includes providing an automated laboratory (FIG. 20, Block 2000) having the frame 106 and the robot transport 110, wherein at least one of the fungible laboratory device holding station 107 and the movable transport terminal 110T have a reference base 110R, 107R, as described herein. A radiation beam (distance) sensor (such as sensors 120, 832, as described herein) is also connected to the movable end effector 110E in a predetermined location on at least one of the robot transport 110 and the fungible laboratory device holding station 107 relative to the reference base 110R, 107R as described herein. The fixture 130 is positioned (e.g., manually or in any other suitable manner-FIG. 20, Block 2010) relative to the fungible laboratory device holding station 107, where the fixture 130 is as described herein. The controller 112 registers sensor signals (FIG. 20, Block 2020) embodying distances sensed by the distance sensor 120, 832. The controller 112 determines the reference base 110R, 107R (FIG. 20, Block 2030), of the at least one of the fungible laboratory device holding station 107 and the movable transport terminal 110T, from scanning, with the sensor 120, 832 in the at least one degree of freedom, of at least one of the movable transport terminal 110T and but one datum set (e.g., discriminant features 801A-801B form one datum set, discriminant features 802A-802B form one datum set, discriminant features 803A-803B form one datum set, and discriminant features 804A-804B form one datum set) of the fixture 130 located opposite the sensor 120, 832.

Figure 21:
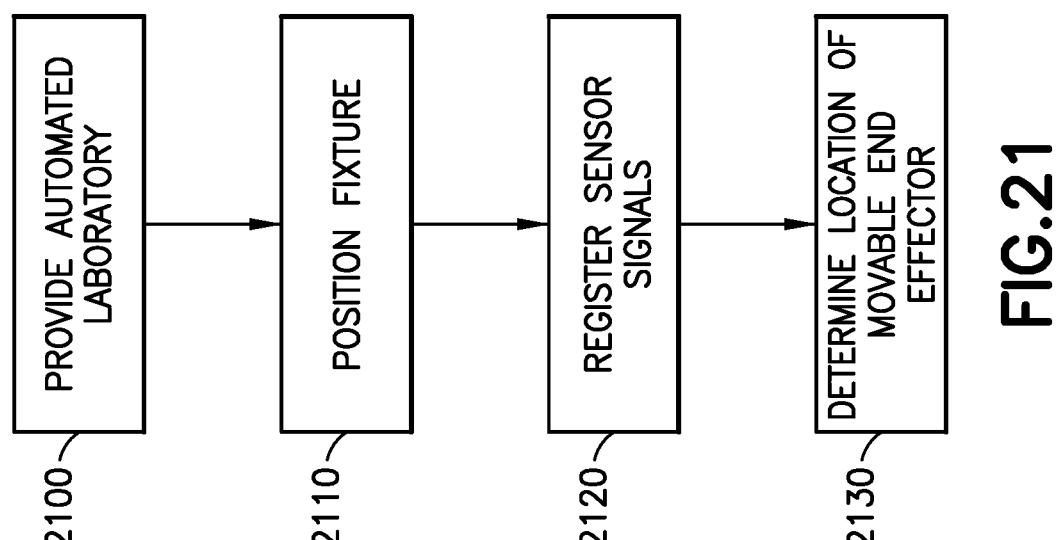
FIG. 21 is a flow diagram of an exemplary method in accordance with aspects of the present disclosure.

Referring to FIGS. 1, 2, 3, 8, 12, 13, and 21, an exemplary method for automatically teaching locations in an automated laboratory (such as laboratory facility 200 and/or laboratory processing station 300) will be described. In accordance with the method, an automated laboratory is provided (FIG. 21, Block 2100). In one aspect, the automated laboratory has the frame 106 having the specimen holder station 107S with the holder station reference location THL, the robot transport 110 mounted to the frame 106 and having a drive 110D with at least one degree of freedom 110F and the movable end effector 110E with the grip 110G for holding the specimen holder, and a distance sensor 832 (as described herein) connected to the frame 106 in a predetermined location on the frame 106 relative to a reference base 107RF, 110R. In another aspect, the automated laboratory has the frame 106 having the specimen holder station 107S with the holder station reference location THL, and a robot transport 110 mounted to the frame 106 and having the drive 110D with at least one degree of freedom 110F and the movable end effector 110E with the grip 110G for holding the specimen holder.

The fixture 130 is position (e.g., manually, with automation, or in any other suitable manner-FIG. 21, Block 2110) relative to the holder station reference location THL. In one aspect, the fixture 130 has the predetermined geometric pattern 800 formed of discriminant features 801A-801B, 802A-802B, 803A-803B, 804A-804B, variant in at least two dimensions, characterizing the predetermined geometric pattern 800 and registrable by the distance sensor 832. In another aspect, the fixture 130 has the predetermined geometric pattern 800 formed of discriminant features 801A-801B, 802A-802B, 803A-803B, 804A-804B, variant in least at dimensions, characterizing the two predetermined geometric pattern 800, and the distance sensor 832 (as described herein) connected to the fixture in a predetermined location on the fixture 130 relative to a reference base 107R, where the predetermined geometric pattern 800 is registrable by the distance sensor 832.

The controller 112 registers the sensor signals (FIG. 21, Block 2120) embodying distances sensed by the distance sensor 832. The controller 112 determines the location of the movable end effector (FIG. 21, Block 2130) relative to the holder station reference location 107R rom scanning, with the distance sensor 832 in the at least one degree of freedom, the movable end effector 110E.

In accordance with one or more aspects of the present disclosure, an automatic teaching system for an automated laboratory is provided. The automatic teaching system comprises: a frame having a specimen holder station with a holder station reference location; a robot transport mounted to the frame and having a drive with at least one degree of freedom and a movable end effector with a grip for holding a specimen holder; an electromagnetic distance sensor connected to the movable end effector in a predetermined location on the robot transport relative to a reference base; a fixture with a predetermined geometric pattern formed of discriminant features, variant in at least two dimensions, characterizing the predetermined geometric pattern and registrable by the electromagnetic distance sensor; and a controller operably coupled to the robot transport and communicably connected to the electromagnetic distance sensor to register sensor signals embodying distances sensed by the electromagnetic distance sensor; wherein the discriminant features characterizing the predetermined geometric pattern are arranged in datum sets, each of corresponding feature datums, arrayed on the fixture, the corresponding feature datums of each datum set being deterministic of a unique discrete location and orientation on the fixture that has a predetermined relation with the holder station reference location, and deterministically identifies the holder station reference location so that the controller determines the holder station reference location from scanning, with the electromagnetic distance sensor in the at least one degree of freedom, of but one datum set of the fixture located at the specimen holder station.

In accordance with one or more aspects of the present disclosure, the discriminant features define variances in distance, the distance variances being registrable with the electromagnetic distance sensor.

In accordance with one or more aspects of the present disclosure, the movable end effector has a reference location related to the specimen holder gripped by the movable end effector.

In accordance with one or more aspects of the present disclosure, the controller is configured to resolve an offset between the determined holder station reference location and predetermined location of the electromagnetic distance sensor based on scanning distances, with the electromagnetic distance sensor, from a teach position of the robot transport relative to the fixture at the specimen holder station.

In accordance with one or more aspects of the present disclosure, the controller is configured to move the robot transport to a teach position relative to the holder station reference location and initiate scanning, of the specimen holder station with the electromagnetic distance sensor in the at least one degree of freedom, distance changes defined by the discriminant features characterizing the predetermined geometric pattern on the fixture.

In accordance with one or more aspects of the present disclosure, the controller is configured to resolve an offset between the determined holder station reference location and a predetermined location of the grip of the movable end effector.

In accordance with one or more aspects of the present disclosure, the robot transport is at least one of a gantry robot, a multi-axis industrial robot, and a SCARA robot transport arm.

In accordance with one or more aspects of the present disclosure, the controller is configured to resolve angular orientation of the at least one degree of freedom with respect to the holder station reference location and a holder station reference frame.

In accordance with one or more aspects of the present disclosure, the controller is configured to resolve misalignment between a robot reference frame containing the at least one degree of freedom of the robot transport and the holder station reference frame.

In accordance with one or more aspects of the present disclosure, the fixture has a radiation beam sensor disposed so as to register a feature of the robot transport scanning the fixture located at the specimen holder station.

In accordance with one or more aspects of the present disclosure, the controller is configured to resolve angular orientation of the at least one degree of freedom with respect to the holder station reference location and a holder station reference frame.

In accordance with one or more aspects of the present disclosure, an automatic teaching system for an automated laboratory is provided. The automatic teaching system comprises: a frame having a specimen holder station; a robot transport mounted to the frame and having a drive with at least one degree of freedom and a movable end effector for action with a specimen holder, wherein at least one of the specimen holder station and the movable end effector have a reference base; an electromagnetic distance sensor connected to the movable end effector in a predetermined location on at least one of the robot transport and the specimen holder station relative to the reference base; a fixture with a predetermined geometric pattern formed of discriminant features, variant in at least two dimensions, characterizing the predetermined geometric pattern and registrable by the electromagnetic distance sensor; and a controller operably coupled to the robot transport and communicably connected to the electromagnetic distance sensor to register sensor signals embodying distances sensed by the electromagnetic distance sensor; wherein the discriminant features characterizing the predetermined geometric pattern are arranged in datum sets, each of corresponding feature datums, arrayed on the fixture, the corresponding feature datums of each datum set being deterministic of a unique discrete location and orientation on the fixture that has a predetermined relation with the reference base, and deterministically identifies the reference base so that the controller determines the reference base, on the at least one of the specimen holder station and the movable end effector, from scanning, with the electromagnetic distance sensor in the at least one degree of freedom, of at least one of the movable end effector and but one datum set of the fixture located opposite the electromagnetic distance sensor.

In accordance with one or more aspects of the present disclosure, the discriminant features define variances in distance, the distance variances being registrable with the electromagnetic distance sensor.

In accordance with one or more aspects of the present disclosure, the reference base of the movable end effector is related to the specimen holder gripped by the movable end effector.

In accordance with one or more aspects of the present disclosure, the controller is configured to resolve an offset between a determined holder station reference and predetermined location of the electromagnetic distance sensor based on scanning distances, with the electromagnetic distance sensor, from a teach position of the robot transport relative to the fixture at the specimen holder station.

In accordance with one or more aspects of the present disclosure, the controller is configured to move the robot transport to a teach position relative to the specimen holder station reference base and initiate scanning, of the specimen holder station with the electromagnetic distance sensor in the at least one degree of freedom, distance changes defined by the discriminant features characterizing the predetermined geometric pattern on the fixture.

In accordance with one or more aspects of the present disclosure, the controller is configured to resolve an offset between a determined holder station reference base and a predetermined location of the grip of the movable end effector.

In accordance with one or more aspects of the present disclosure, the robot transport is at least one of a gantry robot, a multi-axis industrial robot, and a SCARA robot transport arm.

In accordance with one or more aspects of the present disclosure, the controller is configured to resolve angular orientation of the at least one degree of freedom with respect to the specimen holder station reference base and a holder station reference frame.

In accordance with one or more aspects of the present disclosure, the controller is configured to resolve misalignment between a robot reference frame containing the at least one degree of freedom of the robot transport and the holder station reference frame.

In accordance with one or more aspects of the present disclosure, the fixture has a radiation beam sensor disposed so as to register a feature of the robot transport scanning the fixture located at the specimen holder station.

In accordance with one or more aspects of the present disclosure, the movable end effector has a grip for holding the specimen holder.

In accordance with one or more aspects of the present disclosure, the controller is configured to resolve angular orientation of the at least one degree of freedom with respect to the holder station reference base and a holder station reference frame.

In accordance with one or more aspects of the present disclosure, an automatic teaching system for an automated laboratory is provided. The automatic teaching system comprises: a frame having a fungible laboratory device holding station with a holding station reference location; a robot transport mounted to the frame and having a drive with at least one degree of freedom and a movable transport terminal with a coupling configured so as to couple a fungible laboratory device to the movable transport terminal; an electromagnetic beam sensor connected to the movable transport terminal in a predetermined location on the robot transport relative to a reference base; a fixture with a predetermined geometric pattern formed of discriminant features, variant in at least two dimensions, characterizing the predetermined geometric pattern and registrable by the electromagnetic beam sensor; and a controller operably coupled to the robot transport and communicably connected to the electromagnetic beam sensor to register sensor signals embodying distances sensed by the electromagnetic beam sensor; wherein the discriminant features characterizing the predetermined geometric pattern are arranged in datum sets, each of corresponding feature datums, arrayed on the fixture, the corresponding feature datums of each datum set being deterministic of a unique discrete location and orientation on the fixture that has a predetermined relation with the holding station reference location, and deterministically identifies the holding station reference location so that the controller determines the holding station reference location from scanning, with the electromagnetic beam sensor in the at least one degree of freedom, of but one datum set of the fixture located at the fungible laboratory device holding station.

In accordance with one or more aspects of the present disclosure, the electromagnetic beam sensor is a distance sensor or a through beam sensor.

In accordance with one or more aspects of the present disclosure, the fungible laboratory device holding station is at least one of: a specimen holder station, and a fungible laboratory robot tool holding station, wherein the robot transport automatically engages the fungible laboratory device with the movable transport terminal coupling at the fungible laboratory device holding station.

In accordance with one or more aspects of the present disclosure, the fungible laboratory device is at least one of: an end effector, with a grip for holding a specimen holder, and a fungible laboratory robot tool, wherein the fungible laboratory robot tool is a pipette head or liquid dispensing tool.

In accordance with one or more aspects of the present disclosure, the pipette head is configured for pipetting fluid to a 96 well plate, a 384 well plate, a 1536 well plate or a 3456 well plate.

In accordance with one or more aspects of the present disclosure, the controller resolves an offset for each pipette of the pipette head with respect to the holding station reference location so as to teach the robot transport a pipette head location conformal with and disposed to pipette to the 96, 384, 1536 or the 3456 well plate.

In accordance with one or more aspects of the present disclosure, the fixture comprises at least one radiation beam sensor configured to register a feature of the robot transport.

In accordance with one or more aspects of the present disclosure, the fungible laboratory device comprises a pipette head; the fixture comprises two through-beam sensors that are angled relative to each other, each of the through-beam sensors being disposed to scan one or more of a mandrel and pipette tip of the pipette head; and the controller is communicably coupled to the two through-beam sensors and configured to resolve a location of each row and column of pipette tip locations of the pipette head relative to the reference base based on scan data of the one or more of the mandrel and the pipette tip of the pipette head, where one of the through-beam sensors effects resolution of the location of each row and another of the through-beam sensors effects resolution of each column.

In accordance with one or more aspects of the present disclosure, the pipette head travels along a substantially continuous path through both of the two through-beam sensors, the substantially continuous path being angled relative to both of the two through-beam sensors.

In accordance with one or more aspects of the present disclosure, the at least one degree of freedom of the drive comprises two degrees of freedom configured to effect movement of the movable transport terminal in two directions that are angled relative to each other; and the location of each row and column of pipette tip locations is resolved in the each of the two directions.

In accordance with one or more aspects of the present disclosure, the controller is configured to determine one or more of a presence of a bent mandrel, a presence of a bent pipette tip, an out of position mandrel or pipette tip, a presence of a mandrel or pipette tip, and a presence of specimen based on the scan data of the one or more of the mandrel and the pipette tip of the pipette head.

In accordance with one or more aspects of the present disclosure, the at least one degree of freedom effects movement of the movable transport terminal in at least one direction; and the controller is configured to determine a misalignment between the at least one direction and a corresponding axis of the holding station reference location based on the scan data of the one or more of the mandrel and the pipette tip of the pipette head.

In accordance with one or more aspects of the present disclosure, the controller is configured to determine a drive offset based on the misalignment so as to substantially align the at least one direction with the corresponding axis.

In accordance with one or more aspects of the present disclosure, the discriminant features define variances in distance, the distance variances being registrable with the electromagnetic distance sensor.

In accordance with one or more aspects of the present disclosure, the movable transport terminal has a reference location related to the fungible laboratory device coupled to the movable transport terminal.

In accordance with one or more aspects of the present disclosure, the controller is configured to resolve an offset between the determined holding station reference location and predetermined location of the electromagnetic beam sensor based on scanning distances, with the electromagnetic beam sensor, from a teach position of the robot transport relative to the fixture at the fungible laboratory device holding station.

In accordance with one or more aspects of the present disclosure, the controller is configured to move the robot transport to a teach position relative to the holding station reference location and initiate scanning, of the fungible laboratory device holding station with the electromagnetic beam sensor in the at least one degree of freedom, distance changes defined by the discriminant features characterizing the predetermined geometric pattern on the fixture.

In accordance with one or more aspects of the present disclosure, the controller is configured to resolve an offset between the determined holding station reference location and a predetermined location of the coupling of the movable transport terminal.

In accordance with one or more aspects of the present disclosure, the robot transport is at least one of a gantry robot, a multi-axis industrial robot, and a SCARA robot transport arm.

In accordance with one or more aspects of the present disclosure, the controller is configured to resolve angular orientation of the at least one degree of freedom with respect to the holding station reference location and a holding station reference frame.

In accordance with one or more aspects of the present disclosure, the controller is configured to resolve misalignment between a robot reference frame containing the at least one degree of freedom of the robot transport and the holding station reference frame.

In accordance with one or more aspects of the present disclosure, the fixture has a radiation beam sensor disposed so as to register a feature of the robot transport scanning the fixture located at the fungible laboratory device holding station.

In accordance with one or more aspects of the present disclosure, an automatic teaching system for an automated laboratory is provided. The automatic teaching system comprising: a frame having a fungible laboratory device holding station; a robot transport mounted to the frame and having a drive with at least one degree of freedom and a movable transport terminal for action with a fungible laboratory device, wherein at least one of the fungible laboratory device holding station and the movable transport terminal have a reference base; an electromagnetic beam sensor connected to the movable transport terminal in a predetermined location on at least one of the robot transport and the fungible laboratory device holding station relative to the reference base; a fixture with a predetermined geometric pattern formed of discriminant features, variant in at least two dimensions, characterizing the predetermined geometric pattern and registrable by the electromagnetic beam sensor; and a controller operably coupled to the robot transport and communicably connected to the electromagnetic beam sensor to register sensor signals embodying distances sensed by the electromagnetic beam sensor; wherein the discriminant features characterizing the predetermined geometric pattern are arranged in datum sets, each of corresponding feature datums, arrayed on the fixture, the corresponding feature datums of each datum set being deterministic of a unique discrete location and orientation on the fixture that has a predetermined relation with the reference base, and deterministically identifies the reference base so that the controller determines the reference base, of the at least one of the fungible laboratory device holding station and the movable transport terminal, from scanning, with the electromagnetic beam sensor in the at least one degree of freedom, of at least one of the movable transport terminal and but one datum set of the fixture located opposite the electromagnetic distance sensor.

In accordance with one or more aspects of the present disclosure, the electromagnetic beam sensor is a distance sensor or a through beam sensor.

In accordance with one or more aspects of the present disclosure, the fungible laboratory device holding station is at least one of: a specimen holder station, and a fungible laboratory robot tool holding station, wherein the robot transport automatically engages the fungible laboratory device with the movable transport terminal coupling at the fungible laboratory device holding station.

In accordance with one or more aspects of the present disclosure, the fungible laboratory device is at least one of: an end effector, with a grip for holding a specimen holder, and a fungible laboratory robot tool, wherein the fungible laboratory robot tool is a pipette head or liquid dispensing tool.

In accordance with one or more aspects of the present disclosure, the pipette head is configured for pipetting fluid to a 96 well plate, a 384 well plate, a 1536 well plate, or a 3456 well plate.

In accordance with one or more aspects of the present disclosure, the controller resolves an offset for each pipette of the pipette head with respect to the fungible laboratory device holding station reference base so as to teach the robot transport a pipette head location conformal with and disposed to pipette to the 96, 384, 1536 or the 3456 well plate.

In accordance with one or more aspects of the present disclosure, the fixture comprises at least one radiation beam sensor configured to register a feature of the robot transport.

In accordance with one or more aspects of the present disclosure, the fungible laboratory device comprises a pipette head; the fixture comprises two through-beam sensors that are angled relative to each other, each of the through-beam sensors being disposed to scan one or more of a mandrel and pipette tip of the pipette head; and the controller is communicably coupled to the two through-beam sensors and configured to resolve a location of each row and column of pipette tip locations of the pipette head relative to the reference base based on scan data of the one or more of the mandrel and the pipette tip of the pipette head, where one of the through-beam sensors effects resolution of the location of each row and another of the through-beam sensors effects resolution of each column.

In accordance with one or more aspects of the present disclosure, the pipette head travels along a substantially continuous path through both of the two through-beam sensors, the substantially continuous path being angled relative to both of the two through-beam sensors.

In accordance with one or more aspects of the present disclosure, the at least one degree of freedom of the drive comprises two degrees of freedom configured to effect movement of the movable transport terminal in two directions that are angled relative to each other; and the location of each row and column of pipette tip locations is resolved in the each of the two directions.

In accordance with one or more aspects of the present disclosure, the controller is configured to determine one or more of a presence of a bent mandrel, a presence of a bent pipette tip, an out of position mandrel or pipette tip, a presence of a mandrel or pipette tip, and a presence of specimen based on the scan data of the one or more of the mandrel and the pipette tip of the pipette head.

In accordance with one or more aspects of the present disclosure, the at least one degree of freedom effects movement of the movable transport terminal in at least one direction; and the controller is configured to determine a misalignment between the at least one direction and a corresponding axis of the fungible laboratory device holding station reference base based on the scan data of the one or more of the mandrel and the pipette tip of the pipette head.

In accordance with one or more aspects of the present disclosure, the controller is configured to determine a drive offset based on the misalignment so as to substantially align the at least one direction with the corresponding axis.

In accordance with one or more aspects of the present disclosure, the discriminant features define variances in distance, the distance variances being registrable with the electromagnetic distance sensor.

In accordance with one or more aspects of the present disclosure, the reference base of the movable transport terminal is related to the fungible laboratory device coupled to the movable transport terminal.

In accordance with one or more aspects of the present disclosure, the controller is configured to resolve an offset between a determined holding station reference location and predetermined location of the electromagnetic beam sensor based on scanning distances, with the electromagnetic beam sensor, from a teach position of the robot transport relative to the fixture at the fungible laboratory device holding station.

In accordance with one or more aspects of the present disclosure, the controller is configured to move the robot transport to a teach position relative to the fungible laboratory device holding station reference base and initiate scanning, of the fungible laboratory device holding station with the electromagnetic beam sensor in the at least one degree of freedom, distance changes defined by the discriminant features characterizing the predetermined geometric pattern on the fixture.

In accordance with one or more aspects of the present disclosure, the controller is configured to resolve an offset between a determined holding station reference location and a predetermined location of the coupling of the movable transport terminal.

In accordance with one or more aspects of the present disclosure, the robot transport is at least one of a gantry robot, a multi-axis industrial robot, and a SCARA robot transport arm.

In accordance with one or more aspects of the present disclosure, the controller is configured to resolve angular orientation of the at least one degree of freedom with respect to the fungible laboratory device holding station reference base and a holding station reference frame.

In accordance with one or more aspects of the present disclosure, the controller is configured to resolve misalignment between a robot reference frame containing the at least one degree of freedom of the robot transport and the holding station reference frame.

In accordance with one or more aspects of the present disclosure, the fixture has a radiation beam sensor disposed so as to register a feature of the robot transport scanning the fixture located at the fungible laboratory device holding station.

In accordance with one or more aspects of the present disclosure, the movable transport terminal has a coupling configured so as to couple the fungible laboratory device to the movable transport terminal.

In accordance with one or more aspects of the present disclosure, a method for automatically teaching locations in an automated laboratory is provided. The method comprises: providing an automated laboratory having: a frame having a specimen holder station with a holder station reference location, a robot transport mounted to the frame and having a drive with at least one degree of freedom and a movable end effector with a grip for holding a specimen holder, and an electromagnetic distance sensor connected to the movable end effector in a predetermined location on the robot transport relative to a reference base; positioning a fixture relative to the holder station reference location, where: the fixture has a predetermined geometric pattern formed of discriminant features, variant in at least two dimensions, characterizing the predetermined geometric pattern and registrable by the electromagnetic distance sensor, and the discriminant features characterizing the predetermined geometric pattern are arranged in datum sets, each of corresponding feature datums, arrayed on the fixture, the corresponding feature datums of each datum set being deterministic of a unique discrete location and orientation on the fixture that has a predetermined relation with the holder station reference location and deterministically identifying the holder station reference location; registering, with a controller, sensor signals embodying distances sensed by the electromagnetic distance sensor, where the controller is operably coupled to the robot transport and communicably connected to the electromagnetic distance sensor; and determining, with the controller, the holder station reference location from scanning, with the electromagnetic distance sensor in the at least one degree of freedom, of but one datum set of the fixture located at the specimen holder station.

In accordance with one or more aspects of the present disclosure, the discriminant features define variances in distance, the distance variances being registrable with the electromagnetic distance sensor.

In accordance with one or more aspects of the present disclosure, the movable end effector has a reference location related to the specimen holder gripped by the movable end effector.

In accordance with one or more aspects of the present disclosure, the method further comprises resolving, with the controller, an offset between the determined station reference location and predetermined location of the electromagnetic distance sensor based scanning on distances, with the electromagnetic distance sensor, from a teach position of the robot transport relative to the fixture at the specimen holder station.

In accordance with one or more aspects of the present disclosure, the method further comprises: moving, with the controller, the robot transport to a teach position relative to the holder station reference location; and initiating scanning of the specimen holder station, with the electromagnetic distance sensor in the at least one degree of freedom, distance changes defined by the discriminant features characterizing the predetermined geometric pattern on the fixture.

In accordance with one or more aspects of the present disclosure, the method further comprises resolving, with the controller, an offset between the determined holder station reference location and a predetermined location of the grip of the movable end effector.

In accordance with one or more aspects of the present disclosure, the robot transport is at least one of a gantry robot, a multi-axis industrial robot, and a SCARA robot transport arm.

In accordance with one or more aspects of the present disclosure, the method further comprises, with the controller, angular orientation of the at least one degree of freedom with respect to the holder station reference location and a holder station reference frame.

In accordance with one or more aspects of the present disclosure, the method further comprises resolving, with the controller, misalignment between a robot reference frame containing the at least one degree of freedom of the robot transport and the holder station reference frame.

In accordance with one or more aspects of the present disclosure, the method further comprises registering, with a radiation beam sensor of the fixture, a feature of the robot transport scanning the fixture located at the specimen holder station.

In accordance with one or more aspects of the present disclosure, a method for automatically teaching locations in an automated laboratory is provided. The method comprising: providing an automated laboratory having: a frame having a specimen holder station, a robot transport mounted to the frame and having a drive with at least one degree of freedom and a movable end effector for action with a specimen holder, wherein at least one of the specimen holder station and the movable end effector have a reference base, and an electromagnetic distance sensor connected to the movable end effector in a predetermined location on at least one of the robot transport and the specimen holder station relative to the reference base; positioning a fixture relative to the specimen holder station, where: the fixture has a predetermined geometric pattern formed of discriminant features, variant in at least two dimensions, characterizing the predetermined geometric pattern and registrable by the electromagnetic distance sensor, and the discriminant features characterizing the predetermined geometric pattern are arranged in datum sets, each of corresponding feature datums, arrayed on the fixture, the corresponding feature datums of each datum set being deterministic of a unique discrete location and orientation on the fixture that has a predetermined relation with the reference base and deterministically identifying the reference base; registering, with a controller, sensor signals embodying distances sensed by the electromagnetic distance sensor, where the controller is operably coupled to the robot transport and communicably connected to the electromagnetic distance sensor; and determining, with the controller, the reference base, on the at least one of the specimen holder station and the movable end effector, from scanning, with the electromagnetic distance sensor in the at least one degree of freedom, of at least one of the movable end effector and but one datum set of the fixture located opposite the electromagnetic distance sensor.

In accordance with one or more aspects of the present disclosure, the discriminant features define variances in distance, the distance variances being registrable with the electromagnetic distance sensor.

In accordance with one or more aspects of the present disclosure, the reference base of the movable end effector is related to the specimen holder gripped by a grip of the movable end effector.

In accordance with one or more aspects of the present disclosure, the method further comprises resolving, with the controller, an offset between a determined station reference base and predetermined location of the electromagnetic distance sensor based on scanning distances, with the electromagnetic distance sensor, from a teach position of the robot transport relative to the fixture at the specimen holder station.

In accordance with one or more aspects of the present disclosure, the method further comprises: moving, with the controller, the robot transport to a teach position relative to the specimen holder station reference base; and initiating scanning of the specimen holder station, with the electromagnetic distance sensor in the at least one degree of freedom, distance changes defined by the discriminant features characterizing the predetermined geometric pattern on the fixture.

In accordance with one or more aspects of the present disclosure, the method further comprises resolving, with the controller, an offset between a determined holder station reference base and a predetermined location of the grip of the movable end effector.

In accordance with one or more aspects of the present disclosure, the robot transport is at least one of a gantry robot, a multi-axis industrial robot, and a SCARA robot transport arm.

In accordance with one or more aspects of the present disclosure, the method further comprises, with the controller, angular orientation of the at least one degree of freedom with respect to the specimen holder station reference base and a holder station reference frame.

In accordance with one or more aspects of the present disclosure, the method further comprises resolving, with the controller, misalignment between a robot reference frame containing the at least one degree of freedom of the robot transport and the holder station reference frame.

In accordance with one or more aspects of the present disclosure, the method further comprises registering, with a radiation beam sensor of the fixture, a feature of the robot transport scanning the fixture located at the specimen holder station.

In accordance with one or more aspects of the present disclosure, the movable end effector has a grip for holding the specimen holder.

In accordance with one or more aspects of the present disclosure, a method for automatically teaching locations in an automated laboratory is provided. The method comprises: providing an automated laboratory having: a frame having a fungible laboratory device holding station with a holding station reference location; a robot transport mounted to the frame and having a drive with at least one degree of freedom and a movable transport terminal with a coupling configured so as to couple a fungible laboratory device to the movable transport terminal; an electromagnetic beam sensor connected to the movable transport terminal in a predetermined location on the robot transport relative to a reference base; positioning a fixture relative to the holding station reference location, where: the fixture has a predetermined geometric pattern formed of discriminant features, variant in at least two dimensions, characterizing the predetermined geometric pattern and registrable by the electromagnetic beam sensor, and the discriminant features characterizing the predetermined geometric pattern are arranged in datum sets, each of corresponding feature datums, arrayed on the fixture, the corresponding feature datums of each datum set being deterministic of a unique discrete location and orientation on the fixture that has a predetermined relation with the holding station reference location, and deterministically identifies the holding station reference location; registering, with a controller, sensor signals embodying distances sensed by the electromagnetic beam sensor, where the controller is operably coupled to the robot transport and communicably connected to the electromagnetic beam sensor; and determining, with the controller, the holding station reference location from scanning, with the electromagnetic beam sensor in the at least one degree of freedom, of but one datum set of the fixture located at the fungible laboratory device holding station.

In accordance with one or more aspects of the present disclosure, the electromagnetic beam sensor is a distance sensor or a through beam sensor.

In accordance with one or more aspects of the present disclosure, the fungible laboratory device holding station is at least one of: a specimen holder station, and a fungible laboratory robot tool station, the holding wherein robot transport automatically engages the fungible laboratory device with the movable transport terminal coupling at the fungible laboratory device holding station.

In accordance with one or more aspects of the present disclosure, the fungible laboratory device is at least one of: an end effector, with a grip for holding a specimen holder, and a fungible laboratory robot tool, wherein the fungible laboratory robot tool is a pipette head or liquid dispensing tool.

In accordance with one or more aspects of the present disclosure, the pipette head is configured for pipetting fluid to a 96 well plate, a 384 well plate, a 1536 well plate or a 3456 well plate.

In accordance with one or more aspects of the present disclosure, the method further comprises, with the controller, resolving an offset for each pipette of the pipette head with respect to the holding station reference location so as to teach the robot transport a pipette head location conformal with and disposed to pipette to the 96, 384, 1536 or the 3456 well plate.

In accordance with one or more aspects of the present disclosure, the fixture comprises at least one radiation beam sensor configured to register a feature of the robot transport.

In accordance with one or more aspects of the present disclosure, the fungible laboratory device comprises a pipette head; the fixture comprises two through-beam sensors that are angled relative to each other, each of the through-beam sensors being disposed to scan one or more of a mandrel and pipette tip of the pipette head; and the controller is communicably coupled to the two through-beam sensors; wherein the method further comprises resolving, with the controller, a location of each row and column of pipette tip locations of the pipette head relative to the reference base based on scan data of the one or more of the mandrel and the pipette tip of the pipette head, where one of the through-beam sensors effects resolution of the location of each row and another of the through-beam sensors effects resolution of each column.

In accordance with one or more aspects of the present disclosure, the pipette head travels along a substantially continuous path through both of the two through-beam sensors, the substantially continuous path being angled relative to both of the two through-beam sensors.

In accordance with one or more aspects of the present disclosure, the method comprises the movable transport terminal is moved, by the two degrees of freedom of the at least one degree of freedom of the drive, in two directions that are angled relative to each other; and the location of each row and column of pipette tip locations is resolved in the each of the two directions.

In accordance with one or more aspects of the present disclosure, the method further comprises, with the controller, determining one or more of a presence of a bent mandrel, a presence of a bent pipette tip, an out of position mandrel or pipette tip, a presence of a mandrel or pipette tip, and a presence of specimen based on the scan data of the one or more of the mandrel and the pipette tip of the pipette head.

In accordance with one or more aspects of the present disclosure, the at least one degree of freedom effects movement of the movable transport terminal in at least one direction; and the method further comprises determining, with the controller, a misalignment between the at least one direction and a corresponding axis of the holding station reference location based on the scan data of the one or more of the mandrel and the pipette tip of the pipette head.

In accordance with one or more aspects of the present disclosure, the method further comprises, with the controller, determining a drive offset based on the misalignment so as to substantially align the at least one direction with the corresponding axis.

In accordance with one or more aspects of the present disclosure, the discriminant features define variances in distance, the distance variances being registrable with the electromagnetic distance sensor.

In accordance with one or more aspects of the present disclosure, the movable transport terminal has a reference location related to the fungible laboratory device coupled to the movable transport terminal.

In accordance with one or more aspects of the present disclosure, the method further comprises, with the controller, resolving an offset between the determined holding station reference location and predetermined location of the electromagnetic beam sensor based on scanning distances, with the electromagnetic beam sensor, from a teach position of the robot transport relative to the fixture at the fungible laboratory device holding station.

In accordance with one or more aspects of the present disclosure, the method further comprises, with the controller, moving the robot transport to a teach position relative to the holding station reference location and initiating scanning of the fungible laboratory device holding station, with the electromagnetic beam sensor in the at least one degree of freedom, distance changes by defined the discriminant features characterizing the predetermined geometric pattern on the fixture.

In accordance with one or more aspects of the present disclosure, the method further comprises, with the controller, resolving an offset between the determined holding station reference location and a predetermined location of the coupling of the movable transport terminal.

In accordance with one or more aspects of the present disclosure, the robot transport is at least one of a gantry robot, a multi-axis industrial robot, and a SCARA robot transport arm.

In accordance with one or more aspects of the present disclosure, the method further comprises, with the controller, resolving angular orientation of the at least one degree of freedom with respect to the holding station reference location and a holding station reference frame.

In accordance with one or more aspects of the present disclosure, the method further comprises, with the controller, resolving misalignment between a robot reference frame containing the at least one degree of freedom of the robot transport and the holding station reference frame.

In accordance with one or more aspects of the present disclosure, the fixture has a radiation beam sensor disposed so as to register a feature of the robot transport scanning the fixture located at the fungible laboratory device holding station.

In accordance with one or more aspects of the present disclosure, a method for automatically teaching locations in an automated laboratory is provided. The method comprising: providing an automated laboratory having: a frame having a fungible laboratory device holding station; a robot transport mounted to the frame and having a drive with at least one degree of freedom and a movable transport terminal for action with a fungible laboratory device, wherein at least one of the fungible laboratory device holding station and the movable transport terminal have a reference base; an electromagnetic beam sensor connected to the movable transport terminal in a predetermined location on at least one of the robot transport and the fungible laboratory device holding station relative to the reference base; positioning a fixture relative to the fungible laboratory device holding station, where: the fixture has a predetermined geometric pattern formed of discriminant features, variant in at least two dimensions, characterizing the predetermined geometric pattern and registrable by the electromagnetic beam sensor, and the discriminant features characterizing the predetermined geometric pattern are arranged in datum sets, each of corresponding feature datums, arrayed on the fixture, the corresponding feature datums of each datum set being deterministic of a unique discrete location and orientation on the fixture that has a predetermined relation with the reference base, and deterministically identifies the reference base; registering, with a controller, sensor signals embodying distances sensed by the electromagnetic beam sensor, where the controller is operably coupled to the robot transport and communicably connected to the electromagnetic beam sensor; and determining, with the controller, the reference base, of the at least one of the fungible laboratory device holding station and the movable transport terminal, from scanning, with the electromagnetic beam sensor in the at least one degree of freedom, of at least one of the movable transport terminal and but one datum set of the fixture located opposite the electromagnetic distance sensor.

In accordance with one or more aspects of the present disclosure, the electromagnetic beam sensor is a distance sensor or a through beam sensor.

In accordance with one or more aspects of the present disclosure, the fungible laboratory device holding station is at least one of: a specimen holder station, and a fungible laboratory robot tool station, the holding wherein robot transport automatically engages the fungible laboratory device with the movable transport terminal coupling at the fungible laboratory device holding station.

In accordance with one or more aspects of the present disclosure, the fungible laboratory device is at least one of: an end effector, with a grip for holding a specimen holder, and a fungible laboratory robot tool, wherein the fungible laboratory robot tool is a pipette head or liquid dispensing tool.

In accordance with one or more aspects of the present disclosure, the pipette head is configured for pipetting fluid to a 96 well plate, a 384 well plate, a 1536 well plate or a 3456 well plate.

In accordance with one or more aspects of the present disclosure, the method further comprises, with the controller, resolving an offset for each pipette of the pipette head with respect to the fungible laboratory device holding station reference base so as to teach the robot transport a pipette head location conformal with and disposed to pipette to the 96, 384, 1536 or the 3456 well plate.

In accordance with one or more aspects of the present disclosure, the fixture comprises at least one radiation beam sensor configured to register a feature of the robot transport.

In accordance with one or more aspects of the present disclosure, the fungible laboratory device comprises a pipette head; the fixture comprises two through-beam sensors that are angled relative to each other, each of the through-beam sensors being disposed to scan one or more of a mandrel and pipette tip of the pipette head; and the controller is communicably coupled to the two through-beam sensors; wherein the method further comprises resolving, with the controller, a location of each row and column of pipette tip locations of the pipette head relative to the reference base based on scan data of the one or more of the mandrel and the pipette tip of the pipette head, where one of the through-beam sensors effects resolution of the location of each row and another of the through-beam sensors effects resolution of each column.

In accordance with one or more aspects of the present disclosure, the pipette head travels along a substantially continuous path through both of the two through-beam sensors, the substantially continuous path being angled relative to both of the two through-beam sensors.

In accordance with one or more aspects of the present disclosure, the movable transport terminal is moved, by the two degrees of freedom of the at least one degree of freedom of the drive, in two directions that are angled relative to each other; and the location of each row and column of pipette tip locations is resolved in the each of the two directions.

In accordance with one or more aspects of the present disclosure, the method further comprises, with the controller, determining one or more of a presence of a bent mandrel, a presence of a bent pipette tip, an out of position mandrel or pipette tip, a presence of a mandrel or pipette tip, and a presence of specimen based on the scan data of the one or more of the mandrel and the pipette tip of the pipette head.

In accordance with one or more aspects of the present disclosure, the at least one degree of freedom effects movement of the movable transport terminal in at least one direction; and the method further comprises determining, with the controller, a misalignment between the at least one direction and a corresponding axis of the fungible laboratory device holding station reference base based on the scan data of the one or more of the mandrel and the pipette tip of the pipette head.

In accordance with one or more aspects of the present disclosure, the method further comprises, with the controller, determining a drive offset based on the misalignment so as to substantially align the at least one direction with the corresponding axis.

In accordance with one or more aspects of the present disclosure, the discriminant features define variances in distance, the distance variances being registrable with the electromagnetic distance sensor.

In accordance with one or more aspects of the present disclosure, the reference base of the movable transport terminal is related to the fungible laboratory device coupled to the movable transport terminal.

In accordance with one or more aspects of the present disclosure, the method further comprises, with the controller, resolving an offset between the determined holding station reference location and predetermined location of the electromagnetic beam sensor based on scanning distances, with the electromagnetic beam sensor, from a teach position of the robot transport relative to the fixture at the fungible laboratory device holding station.

In accordance with one or more aspects of the present disclosure, the method further comprises, with the controller, moving the robot transport to a teach position relative to the fungible laboratory device holding station reference base and initiating scanning of the fungible laboratory device holding station, with the electromagnetic beam sensor in the at least one degree of freedom, distance changes defined by the discriminant features characterizing the predetermined geometric pattern on the fixture.

In accordance with one or more aspects of the present disclosure, the method further comprises, with the controller, resolving an offset between a determined holding station reference location and a predetermined location of the coupling of the movable transport terminal.

In accordance with one or more aspects of the present disclosure, the robot transport is at least one of a gantry robot, a multi-axis industrial robot, and a SCARA robot transport arm.

In accordance with one or more aspects of the present disclosure, the method further comprises, with the controller, resolving angular orientation of the at least one degree of freedom with respect to the fungible laboratory device holding station reference base and a holding station reference frame.

In accordance with one or more aspects of the present disclosure, the method further comprises, with the controller, resolving misalignment between a robot reference frame containing the at least one degree of freedom of the robot transport and the holding station reference frame.

In accordance with one or more aspects of the present disclosure, the fixture has a radiation beam sensor disposed so as to register a feature of the robot transport scanning the fixture located at the fungible laboratory device holding station.

In accordance with one or more aspects of the present disclosure, the movable transport terminal has a coupling configured so as to couple the fungible laboratory device to the movable transport terminal.

In accordance with one or more aspects of the present disclosure, an automatic teaching system for an automated laboratory is provided. The automatic teaching system comprises: a frame having a specimen holder station with a holder station reference location; a robot transport mounted to the frame and having a drive with at least one degree of freedom and a movable end effector with a grip for holding a specimen holder; an electromagnetic distance sensor connected to the frame in a predetermined location on the frame relative to a reference base; a fixture with a predetermined geometric pattern formed of discriminant features, variant in at least two dimensions, characterizing the predetermined geometric pattern and registrable by the electromagnetic distance sensor; and a controller operably coupled to the robot transport and communicably connected to the electromagnetic distance sensor to register sensor signals embodying distances sensed by the electromagnetic distance sensor; wherein the discriminant features characterizing the predetermined geometric pattern are arranged in datum sets, each of corresponding feature datums, arrayed on the fixture, the corresponding feature datums of each datum set being deterministic of a unique discrete location and orientation on the fixture that has a predetermined relation with the holder station reference location, and deterministically identifies the holder station reference location, where the controller determines a location of the movable end effector relative to the holder station reference location from scanning, with the electromagnetic distance sensor in the at least one degree of freedom, the movable end effector.

In accordance with one or more aspects of the present disclosure, the movable end effector has a reference location related to the specimen holder gripped by the movable end effector.

In accordance with one or more aspects of the present disclosure, the controller is configured to resolve an offset between the determined holder station reference location and predetermined location of the movable end effector based on scanning distances, with the electromagnetic distance sensor, from a teach position of the robot transport relative to the fixture at the specimen holder station.

In accordance with one or more aspects of the present disclosure, the controller is configured to move the robot transport to a teach position relative to the holder station reference location and initiate scanning of the movable end effector with the electromagnetic distance sensor in the at least one degree of freedom.

In accordance with one or more aspects of the present disclosure, the controller is configured to resolve an offset between the determined holder station reference location and a predetermined location of the grip of the movable end effector.

In accordance with one or more aspects of the present disclosure, the robot transport is at least one of a gantry robot, a multi-axis industrial robot, and a SCARA robot transport arm.

In accordance with one or more aspects of the present disclosure, the controller is configured to resolve angular orientation of the at least one degree of freedom with respect to the holder station reference location and a holder station reference frame.

In accordance with one or more aspects of the present disclosure, the controller is configured to resolve misalignment between a robot reference frame containing the at least one degree of freedom of the robot transport and the holder station reference frame.

In accordance with one or more aspects of the present disclosure, the fixture has a radiation beam sensor disposed so as to register a feature of the robot transport.

In accordance with one or more aspects of the present disclosure, the controller is configured to resolve angular orientation of the at least one degree of freedom with respect to the holder station reference location and a holder station reference frame.

In accordance with one or more aspects of the present disclosure, a method for automatically teaching locations in an automated laboratory is provided. The method includes: providing an automated laboratory having: a frame having a specimen holder station with a holder station reference location; a robot transport mounted to the frame and having a drive with at least one degree of freedom and a movable end effector with a grip for holding a specimen holder; and an electromagnetic distance sensor connected to the frame in a predetermined location on the frame relative to a reference base; positioning a fixture relative to the holder station reference location, where the fixture has a predetermined geometric pattern formed of discriminant features, variant in at least two dimensions, characterizing the predetermined geometric pattern and registrable by the electromagnetic distance sensor; and registering, with a controller, signals embodying distances sensed by the electromagnetic distance sensor, where: the controller is operably coupled to the robot transport and communicably connected to the electromagnetic distance sensor; the discriminant features characterizing the predetermined geometric pattern are arranged in datum sets, each of corresponding feature datums, arrayed on the fixture, the corresponding feature datums of each datum set being deterministic of a unique discrete location and orientation on the fixture that has a predetermined relation with the holder station reference location, and deterministically identifies the holder station reference location; and determining, with the controller, a location of the movable end effector relative to the holder station reference location from scanning, with the electromagnetic distance sensor in the at least one degree of freedom, the movable end effector.

In accordance with one or more aspects of the present disclosure, the movable end effector has a reference location related to the specimen holder gripped by the movable end effector.

In accordance with one or more aspects of the present disclosure, the method further comprises resolving, with the controller, an offset between the determined holder station reference location and predetermined location of the movable end effector based on scanning distances, with the electromagnetic distance sensor, from a teach position of the robot transport relative to the fixture at the specimen holder station.

In accordance with one or more aspects of the present disclosure, the method further comprises moving, with the controller, the robot transport to a teach position relative to the holder station reference location and initiating scanning of the movable end effector with the electromagnetic distance sensor in the at least one degree of freedom.

In accordance with one or more aspects of the present disclosure, the method further comprises resolving, with the controller, an offset between the determined holder station reference location and a predetermined location of the grip of the movable end effector.

In accordance with one or more aspects of the present disclosure, the robot transport is at least one of a gantry robot, a multi-axis industrial robot, and a SCARA robot transport arm.

In accordance with one or more aspects of the present disclosure, the method further comprises resolving, with the controller, angular orientation of the at least one degree of freedom with respect to the holder station reference location and a holder station reference frame.

In accordance with one or more aspects of the present disclosure, the method further comprises resolving, with the controller, misalignment between a robot reference frame containing the at least one degree of freedom of the robot transport and the holder station reference frame.

In accordance with one or more aspects of the present disclosure, the fixture has a radiation beam sensor disposed so as to register a feature of the robot transport.

In accordance with one or more aspects of the present disclosure, the method further comprises resolving, with the controller, angular orientation of the at least one degree of freedom with respect to the holder station reference location and a holder station reference frame.

In accordance with one or more aspects of the present disclosure, an automatic teaching system for an automated laboratory is provided. The automatic teaching system comprises: a frame having a specimen holder station with a holder station reference location; a robot transport mounted to the frame and having a drive with at least one degree of freedom and a movable end effector with a grip for holding a specimen holder; a fixture with a predetermined geometric pattern formed of discriminant features, variant in at least two dimensions, characterizing the predetermined geometric pattern and registrable by the electromagnetic distance sensor; an electromagnetic distance sensor connected to the fixture in a predetermined location on the fixture relative to a reference base; and a controller operably coupled to the robot transport and communicably connected to the electromagnetic distance sensor to register sensor signals embodying distances sensed by the electromagnetic distance sensor; wherein the discriminant features characterizing the predetermined geometric pattern are arranged in datum sets, each of corresponding feature datums, arrayed on the fixture, the corresponding feature datums of each datum set being deterministic of a unique discrete location and orientation on the fixture that has a predetermined relation with the holder station reference location, and deterministically identifies the holder station reference location, where the controller determines a location of the movable end effector relative to the holder station reference location from scanning, with the electromagnetic distance sensor in the at least one degree of freedom, the movable end effector.

In accordance with one or more aspects of the present disclosure, the movable end effector has a reference location related to the specimen holder gripped by the movable end effector.

In accordance with one or more aspects of the present disclosure, the controller is configured to resolve an offset between the determined holder station reference location and predetermined location of the movable end effector based on scanning distances, with the electromagnetic distance sensor, from a teach position of the robot transport relative to the fixture at the specimen holder station.

In accordance with one or more aspects of the present disclosure, the controller is configured to move the robot transport to a teach position relative to the holder station reference location and initiate scanning, of the movable end effector with the electromagnetic distance sensor in the at least one degree of freedom.

In accordance with one or more aspects of the present disclosure, the controller is configured to resolve an offset between the determined holder station reference location and a predetermined location of the grip of the movable end effector.

In accordance with one or more aspects of the present disclosure, the robot transport is at least one of a gantry robot, a multi-axis industrial robot, and a SCARA robot transport arm.

In accordance with one or more aspects of the present disclosure, the controller is configured to resolve angular orientation of the at least one degree of freedom with respect to the holder station reference location and a holder station reference frame.

In accordance with one or more aspects of the present disclosure, the controller is configured to resolve misalignment between a robot reference frame containing the at least one degree of freedom of the robot transport and the holder station reference frame.

In accordance with one or more aspects of the present disclosure, the frame has a radiation beam sensor disposed so as to register a feature of the robot transport.

In accordance with one or more aspects of the present disclosure, the controller is configured to resolve angular orientation of the at least one degree of freedom with respect to the holder station reference location and a holder station reference frame.

In accordance with one or more aspects of the present disclosure, a method for automatically teaching locations in an automated laboratory is provided. The method includes: providing an automated laboratory having: a frame having a specimen holder station with a holder station reference location; and a robot transport mounted to the frame and having a drive with at least one degree of freedom and a movable end effector with a grip for holding a specimen holder; positioning a fixture relative to the holder station reference location, where the fixture has: a predetermined geometric pattern formed of discriminant features, variant in at least two dimensions, characterizing the predetermined geometric pattern; and an electromagnetic distance sensor connected to the fixture in a predetermined location on the fixture relative to a reference base, where the predetermined geometric pattern is registrable by the electromagnetic distance sensor; and registering, with a controller, sensor signals embodying distances sensed by the electromagnetic distance sensor, where: the controller is operably coupled to the robot transport and communicably connected to the electromagnetic distance sensor; and the discriminant features characterizing the predetermined geometric pattern are arranged in datum sets, each of corresponding feature datums, arrayed on the fixture, the corresponding feature datums of each datum set being deterministic of a unique discrete location and orientation on the fixture that has a predetermined relation the holder station reference location, and deterministically identifies the holder station reference location; and determining, with the controller, a location of the movable end effector relative to the holder station reference location from scanning, with the electromagnetic distance sensor in the at least one degree of freedom, the movable end effector.

In accordance with one or more aspects of the present disclosure, the movable end effector has a reference location related to the specimen holder gripped by the movable end effector.

In accordance with one or more aspects of the present disclosure, the method further comprises resolving, with the controller, an offset between the determined holder station reference location and predetermined location of the movable end effector based on scanning distances, with the electromagnetic distance sensor, from a teach position of the robot transport relative to the fixture at the specimen holder station.

In accordance with one or more aspects of the present disclosure, the method further comprises moving, with the controller, the robot transport to a teach position relative to the holder station reference location and initiating scanning, of the movable end effector with the electromagnetic distance sensor in the at least one degree of freedom.

In accordance with one or more aspects of the present disclosure, the method further comprises resolving, with the controller, an offset between the determined holder station reference location and a predetermined location of the grip of the movable end effector.

In accordance with one or more aspects of the present disclosure, the robot transport is at least one of a gantry robot, a multi-axis industrial robot, and a SCARA robot transport arm.

In accordance with one or more aspects of the present disclosure, the method further comprises resolving, with the controller, angular orientation of the at least one degree of freedom with respect to the holder station reference location and a holder station reference frame.

In accordance with one or more aspects of the present disclosure, the method further comprises resolving, with the controller, misalignment between a robot reference frame containing the at least one degree of freedom of the robot transport and the holder station reference frame.

In accordance with one or more aspects of the present disclosure, the frame has a radiation beam sensor disposed so as to register a feature of the robot transport.

In accordance with one or more aspects of the present disclosure, the method further comprises resolving, with the controller, angular orientation of the at least one degree of freedom with respect to the holder station reference location and a holder station reference frame.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims that may be appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. An automatic teaching system for an automated laboratory, the automatic teaching system comprising:
a frame having a specimen holder station;
a robot transport mounted to the frame, the robot transport having:
a drive with at least one degree of freedom, and
a movable end effector for action with a specimen holder,
wherein at least one of the specimen holder station and the movable end effector have a reference base;
an electromagnetic distance sensor connected to the movable end effector in a predetermined location on at least one of the robot transport and the specimen holder station, the predetermined location being relative to the reference base;
a fixture with a predetermined geometric pattern formed of discriminant features, the discriminant features:
are variant in at least two dimensions,
characterize the predetermined geometric pattern, and
are registrable by the electromagnetic distance sensor; and
a controller operably coupled to the robot transport and communicably connected to the electromagnetic distance sensor to register sensor signals embodying distances sensed by the electromagnetic distance sensor;
wherein;
the discriminant features characterizing the predetermined geometric pattern are arranged in datum sets that are arrayed on the fixture, each datum set having corresponding feature datums,
the corresponding feature datums of each datum set being deterministic of a unique discrete location and orientation on the fixture, where the unique discrete location and orientation:
has a predetermined relation with the reference base, and
deterministically identifies the reference base so that the controller determines the reference base from scanning, with the electromagnetic distance sensor in the at least one degree of freedom, of at least one of the movable end effector and but one datum set of the fixture located opposite the electromagnetic distance sensor.

2. The automatic teaching system of claim 1, wherein the discriminant features define variances in distance, the distance variances being registrable with the electromagnetic distance sensor.

3. The automatic teaching system of claim 1, wherein the reference base of the movable end effector is related to the specimen holder gripped by a grip of the movable end effector.

4. The automatic teaching system of claim 1, wherein the controller is configured to resolve an offset between a determined holder station reference location and predetermined location of the electromagnetic distance sensor based on scanning distances, with the electromagnetic distance sensor, from a teach position of the robot transport relative to the fixture at the specimen holder station.

5. The automatic teaching system of claim 1, wherein the controller is configured to:
move the robot transport to a teach position relative to the reference base of the specimen holder station, and
initiate scanning of the specimen holder station with the electromagnetic distance sensor in the at least one degree of freedom, where the scanning effects determination of distance changes defined by the discriminant features characterizing the predetermined geometric pattern on the fixture.

6. The automatic teaching system of claim 1, wherein the controller is configured to resolve an offset between a determined holder station reference base and a predetermined location of the grip of the movable end effector.

7. The automatic teaching system of claim 1, wherein the robot transport is at least one of a gantry robot, a multi-axis industrial robot, and a Selective Compliance Articulated Robot Arm (SCARA) robot transport arm.

8. The automatic teaching system of claim 1, wherein the controller is configured to resolve angular orientation of the at least one degree of freedom with respect to the specimen holder station reference base and a holder station reference frame.

9. The automatic teaching system of claim 8, wherein the controller is configured to resolve misalignment between a robot reference frame containing the at least one degree of freedom of the robot transport and the holder station reference frame.

10. The automatic teaching system of claim 1, wherein the fixture has a radiation beam sensor disposed so as to register a feature of the robot transport scanning the fixture located at the specimen holder station.

11. The automatic teaching system of claim 1, wherein the movable end effector has a grip for holding the specimen holder.

12. The automatic teaching system of claim 1, wherein the controller is configured to resolve angular orientation of the at least one degree of freedom with respect to the specimen holder station reference base and a holder station reference frame.

13. An automatic teaching system for an automated laboratory, the automatic teaching system comprising:

a frame having a fungible laboratory device holding station;

a robot transport mounted to the frame, the robot transport having:

a drive with at least one degree of freedom, and a movable transport terminal for action with a fungible laboratory device, wherein at least one of the fungible laboratory device holding station and the movable transport terminal have a reference base;

an electromagnetic beam sensor connected to the movable transport terminal in a predetermined location on at least one of the robot transport and the fungible laboratory device holding station, the predetermined location being relative to the reference base;

a fixture with a predetermined geometric pattern formed of discriminant features, the discriminant features:

are variant in at least two dimensions, characterize the predetermined geometric pattern, and are registrable by the electromagnetic beam sensor; and a controller operably coupled to the robot transport and communicably connected to the electromagnetic beam sensor to register sensor signals embodying distances sensed by the electromagnetic beam sensor;

wherein:

the discriminant features characterizing the predetermined geometric pattern are arranged in datum sets that are arrayed on the fixture, each datum set having corresponding feature datums, the corresponding feature datums of each datum set being deterministic of a unique discrete location and orientation on the fixture, where the unique discrete location and orientation:

has a predetermined relation with the reference base, and deterministically identifies the reference base so that the controller determines the reference base from scanning, with the electromagnetic beam sensor in the at least one degree of freedom, of at least one of the movable transport terminal and but one datum set of the fixture located opposite the electromagnetic distance sensor.

14. The automatic teaching system of claim 13, wherein the electromagnetic beam sensor is a distance sensor or a through beam sensor.

15. The automatic teaching system of claim 13, wherein the fungible laboratory device holding station is at least one of:

a specimen holder station, and a fungible laboratory robot tool holding station, wherein the robot transport automatically engages the fungible laboratory device with the movable transport terminal coupling at the fungible laboratory device holding station.

16. The automatic teaching system of claim 13, wherein the fungible laboratory device is at least one of:

an end effector, with a grip for holding a specimen holder, and a fungible laboratory robot tool, wherein the fungible laboratory robot tool is a pipette head or liquid dispensing tool.

17. The automatic teaching system of claim 16, wherein the pipette head is configured for pipetting fluid to a 96 well plate, a 384 well plate, a 1536 well plate, or a 3456 well plate.

18. The automatic teaching system of claim 17, wherein the controller resolves an offset for each pipette of the pipette head with respect to the fungible laboratory device holding station reference base so as to teach the robot transport a pipette head location conformal with and disposed to pipette to the 96, 384, 1536 or the 3456 well plate.

19. The automatic teaching system of claim 13, wherein the fixture comprises at least one radiation beam sensor configured to register a feature of the robot transport.

20. The automatic teaching system of claim 19, wherein:

the fungible laboratory device comprises a pipette head;

the fixture comprises two through-beam sensors that are angled relative to each other, each of the through-beam sensors being disposed to scan one or more of a mandrel and pipette tip of the pipette head; and the controller is communicably coupled to the two through-beam sensors and configured to resolve a location of each row and column of pipette tip locations of the pipette head relative to the reference base based on scan data of the one or more of the mandrel and the pipette tip of the pipette head, where one of the through-beam sensors effects resolution of the location of each row and another of the through-beam sensors effects resolution of each column.

21. A method for automatically teaching locations in an automated laboratory, the method comprising:

providing an automated laboratory having:

a frame having a specimen holder station, a robot transport mounted to the frame, the robot transport having:

a drive with at least one degree of freedom, and a movable end effector for action with a specimen holder, wherein at least one of the specimen holder station and the movable end effector have a reference base, and an electromagnetic distance sensor connected to the movable end effector in a predetermined location on at least one of the robot transport and the specimen holder station, the predetermined location being relative to the reference base;

positioning a fixture relative to the specimen holder station, where:

the fixture has a predetermined geometric pattern formed of discriminant features, the discriminant features:

are variant in at least two dimensions, characterize the predetermined geometric pattern, and are registrable by the electromagnetic distance sensor, and the discriminant features characterizing the predetermined geometric pattern are arranged in datum sets that are arrayed on the fixture, each datum set having corresponding feature datums, the corresponding feature datums of each datum set being deterministic of a unique discrete location and orientation on the fixture, where the unique discrete location and orientation:

has a predetermined relation with the reference base, and deterministically identifies the reference base;

registering, with a controller, sensor signals embodying distances sensed by the electromagnetic distance sensor, where the controller is operably coupled to the robot transport and communicably connected to the electromagnetic distance sensor; and determining, with the controller, the reference base from scanning, with the electromagnetic distance sensor in the at least one degree of freedom, of at least one of the movable end effector and but one datum set of the fixture located opposite the electromagnetic distance sensor.

22. The method of claim 21, wherein the discriminant features define variances in distance, the distance variances being registrable with the electromagnetic distance sensor.

23. The method of claim 21, wherein the reference base of the movable end effector is related to the specimen holder gripped by a grip of the movable end effector.

24. The method claim 21, further comprising resolving, with the controller, an offset between a determined station reference base and predetermined location of the electromagnetic distance sensor based on scanning distances, with the electromagnetic distance sensor, from a teach position of the robot transport relative to the fixture at the specimen holder station.

25. The method of claim 21, further comprising:

moving, with the controller, the robot transport to a teach position relative to the reference base of the specimen holder station; and initiating scanning of the specimen holder station, with the electromagnetic distance sensor in the at least one degree of freedom, where the scanning effects determination of distance changes defined by the discriminant features characterizing the predetermined geometric pattern on the fixture.

26. The method of claim 21, further comprising registering, with a radiation beam sensor of the fixture, a feature of the robot transport scanning the fixture located at the specimen holder station.

* * * * *